United States Patent
Shirasawa et al.

(10) Patent No.: US 6,535,971 B1
(45) Date of Patent: Mar. 18, 2003

(54) DATA PROCESSING SYSTEM HAVING PLURALITY OF PROCESSORS AND EXECUTING SERIES OF PROCESSINGS IN PRESCRIBED ORDER

(75) Inventors: Toshiya Shirasawa, Toyokawa (JP); Kenichi Sawada, Toyohashi (JP); Atsushi Ishikawa, Okazaki (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/447,263

(22) Filed: Nov. 23, 1999

(30) Foreign Application Priority Data

Nov. 24, 1998 (JP) ............................. 10-333039
Dec. 16, 1998 (JP) ............................. 10-357732

(51) Int. Cl.$^7$ ..................... G06F 15/163; G06F 9/52; G06F 9/54
(52) U.S. Cl. ..................... 712/34; 712/245; 712/228; 712/35; 709/102; 709/107; 709/108; 709/105
(58) Field of Search .................. 712/245, 244, 712/246, 247, 11, 18, 24, 21, 28, 29, 30, 31, 34, 36, 201, 225, 228, 227, 20, 22, 35; 358/468, 1.15, 443, 448, 514; 709/203, 209, 210, 100, 104, 201, 102, 103, 105, 106, 107, 108; 713/401; 370/360

(56) References Cited

U.S. PATENT DOCUMENTS 5,390,171 A * 2/1995 Storm ........................ 370/360
5,701,505 A * 12/1997 Yamashita et al. ............ 712/11
5,715,070 A * 2/1998 Tone et al. .................. 358/468

FOREIGN PATENT DOCUMENTS

| EP | 0743617 A2 | 11/1996 |
| JP | 61028164 | 2/1986 |
| JP | 06125411 | 5/1994 |
| JP | 09114969 | 5/1997 |

* cited by examiner

Primary Examiner—Daniel H. Pan
(74) Attorney, Agent, or Firm—Burns, Doane, Swecker & Mathis, LLP

(57) ABSTRACT

In order to provide a data processing system processing data at a high speed and having a high performance, the data processing system has the following construction. The data processing system includes a plurality of MPUs which execute a series of processings to data to be processed in a prescribed order, and a data flow control portion which determines the progress of a processing in each of the plurality of processings and changes the processings executed by each of the plurality of processors if there is a delayed processing, and processings by the plurality of MPUs are executed asynchronously. If the loads of the plurality of MPUs change based on difference in data, the loads of the plurality of MPUs are equalized.

27 Claims, 43 Drawing Sheets

FIG. 5A
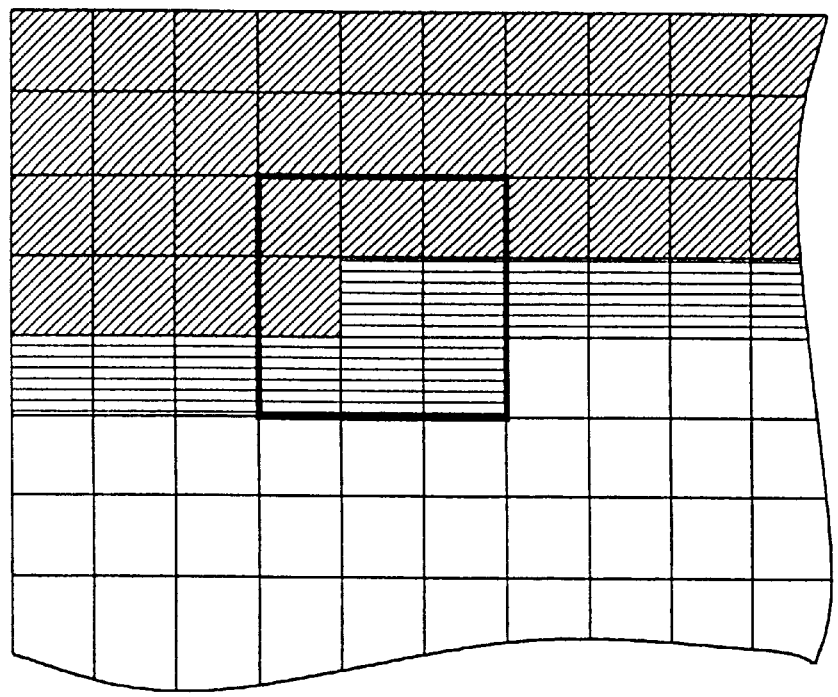
 PIXEL AFTER Log CONVERSION
 PIXEL AFTER MTF CORRECTION
FIG. 5B
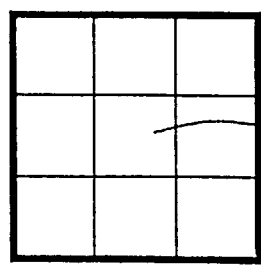
PIXEL FOR MTF CORRECTION
3 × 3 MATRIX

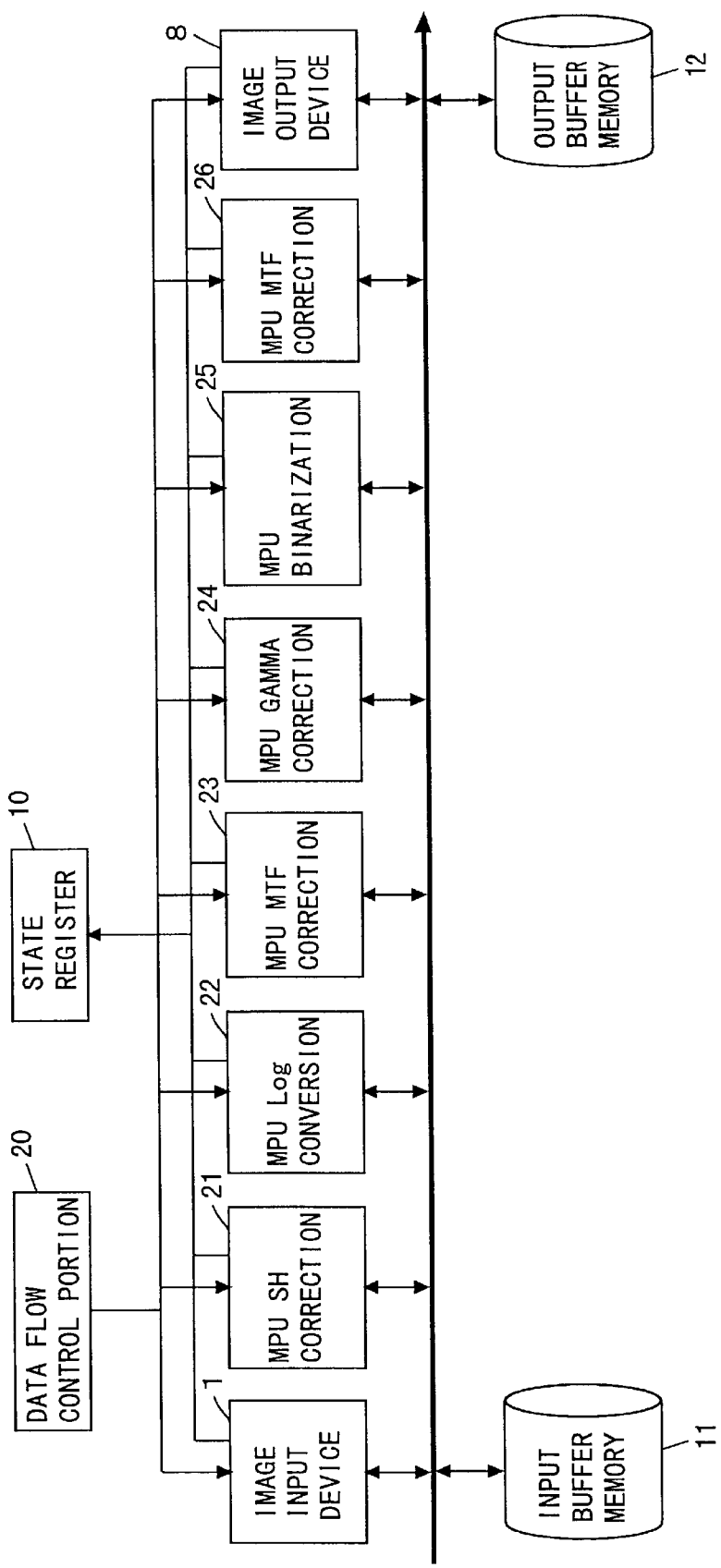
F I G. 1 2

F I G. 2 9
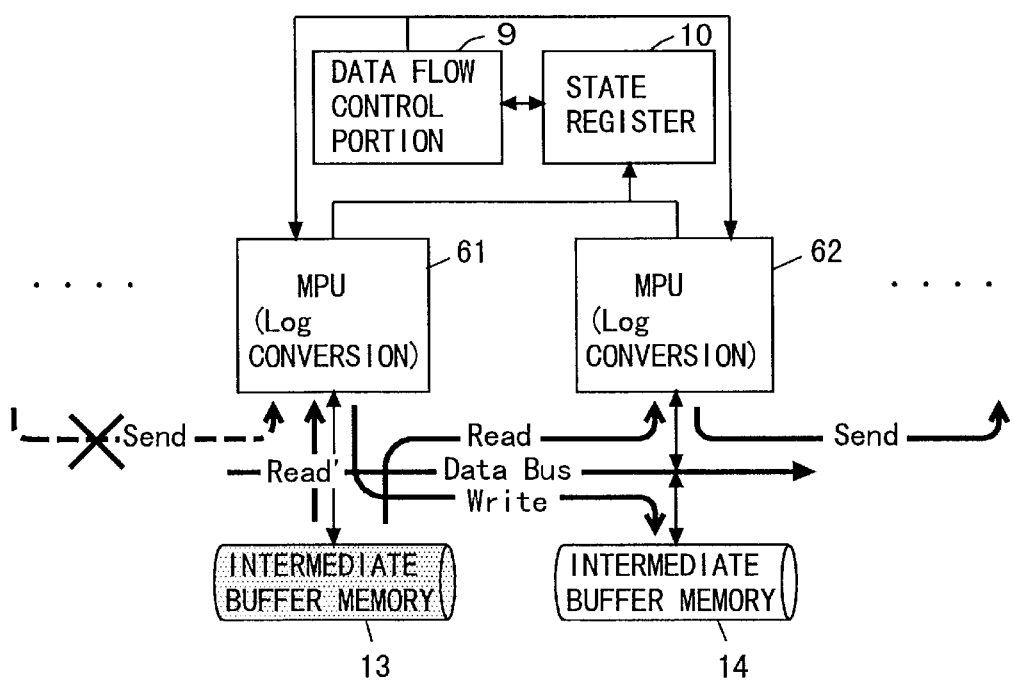

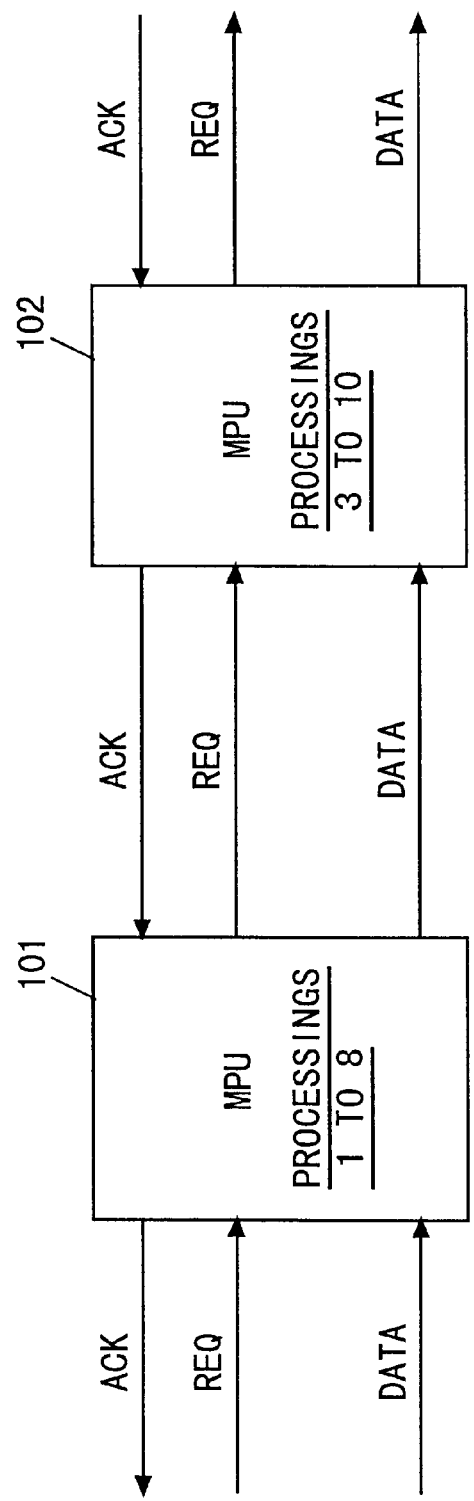

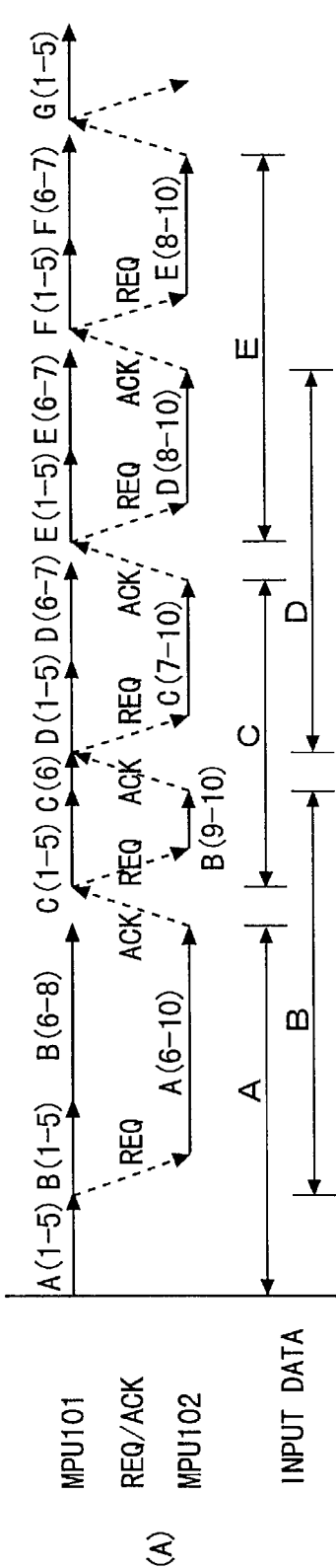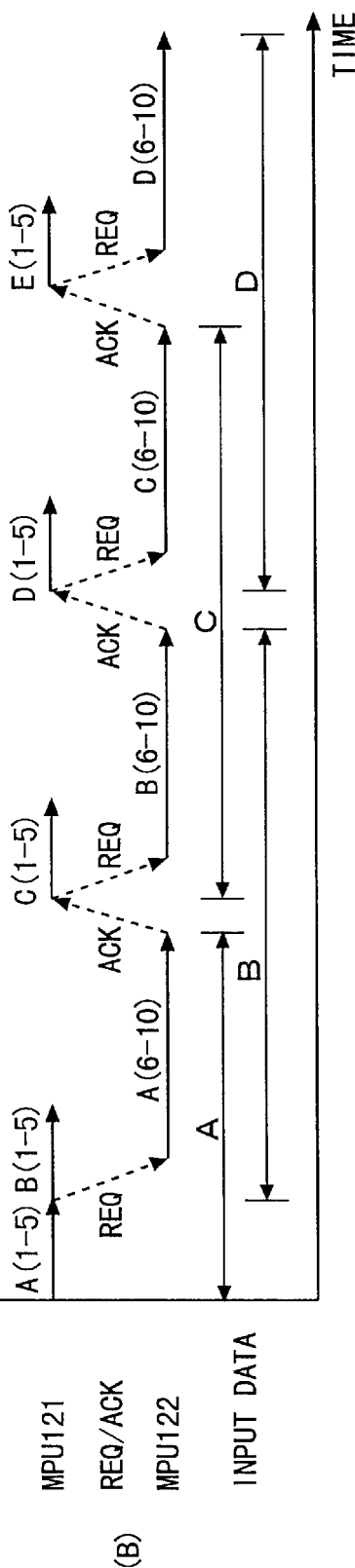
FIG. 34 PATTERN 1 (WHEN TIME FOR PROCESSINGS 1 TO 5 IS ALWAYS SHORTER THAN TIME FOR PROCESSINGS 6 TO 10)

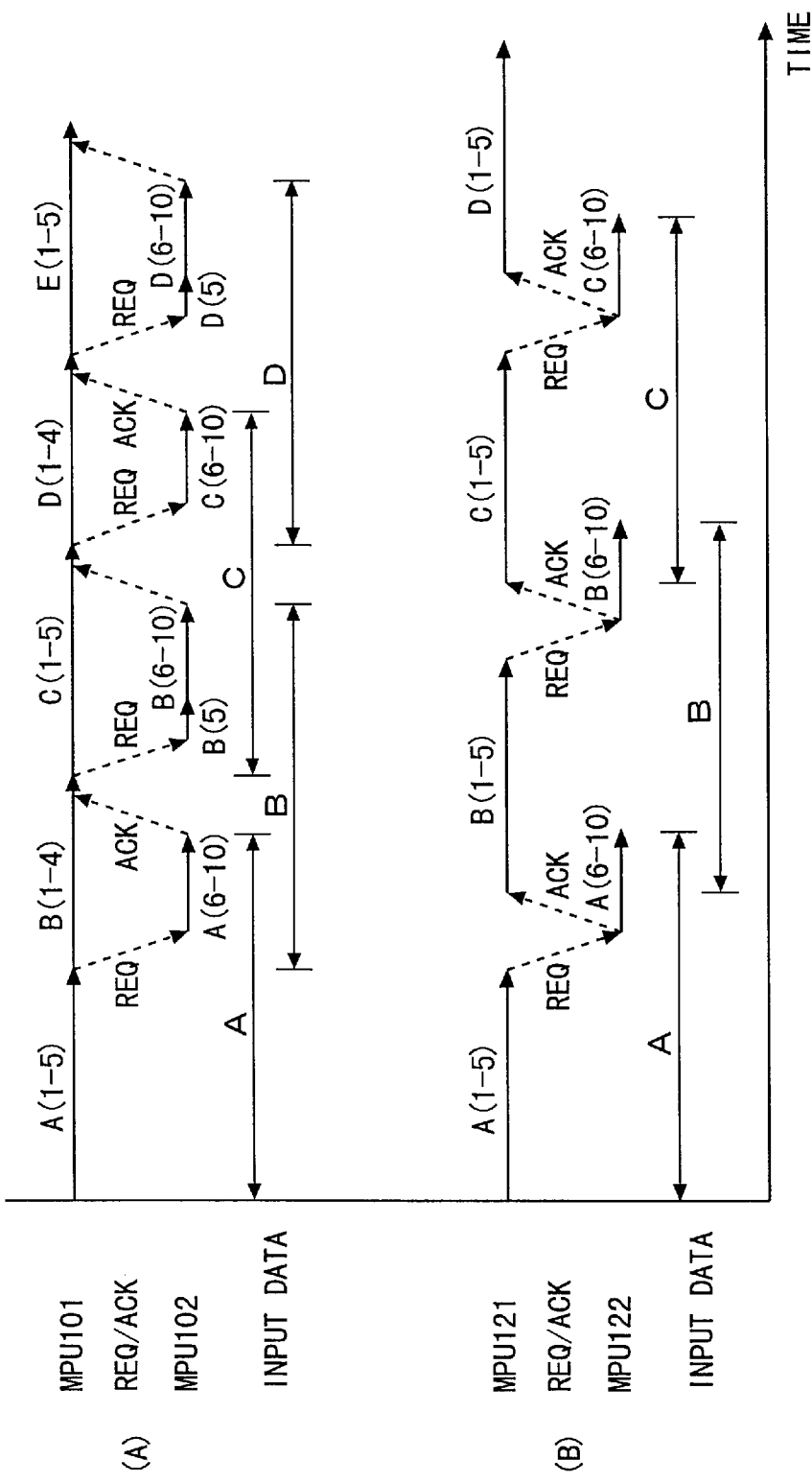
FIG. 35 PATTERN 2 (WHEN TIME FOR PROCESSINGS 1 TO 5 IS ALWAYS LONGER THAN TIME FOR PROCESSINGS 6 TO 10)

FIG. 36

| PATTERN | MAGNIFICATION | ATTRIBUTE | PROCESSING 1 SH | PROCESSING 2 Log | PROCESSING 3 MAGNIFICATION-CHANGE | PROCESSING 4 MTF | PROCESSING 5 γ | PROCESSING 6 BINARIZATION |
|---|---|---|---|---|---|---|---|---|
| A | 1 | CHARACTER | 1 | 1 | 0 | 3 | 1 | 1 |
| B | 4 | CHARACTER | 1 | 1 | 2 | 3 | 1 | 1 |
| C | 1 | PHOTO | 1 | 1 | 0 | 1 | 1 | 3 |
| D | 4 | PHOTO | 1 | 1 | 2 | 1 | 1 | 3 |

| KIND | SPECIFIED PROCESSING (S~E) | LOAD | | |
|---|---|---|---|---|
| | | PRECEDING PROCESSING | SPECIFIED PROCESSING | SUCCEEDING PROCESSING |
| 1 | 3~5 | 2 | 4~ | 2 |
| 2 | 3~6 | 2 | 0~ | 1 |
| 3 | 4~6 | 3 | 2~ | 3 |
| 4 | 3~6 | 2 | 0~ | 3 |

F I G. 40

| KIND | BACKGROUND | ATTRIBUTE | PROCESSING 1 SH | PROCESSING 2 KIND DETERMINING | PROCESSING 3 Log | PROCESSING 4 MAGNIFICATION-CHANGE | PROCESSING 5 MTF | PROCESSING 6 γ | PROCESSING 7 BINARIZATION |
|---|---|---|---|---|---|---|---|---|---|
| 1 | IMAGE | CHARACTER | 1 | 1 | 1 | 0 | 3 | 1 | 1 |
| 2 | PLAIN | CHARACTER | 1 | 1 | 0 | 0 | 0 | 0 | 1 |
| 3 | IMAGE | PHOTO | 1 | 1 | 1 | 0 | 1 | 1 | 3 |
| 4 | PLAIN | PHOTO | 1 | 1 | 0 | 0 | 0 | 0 | 3 |

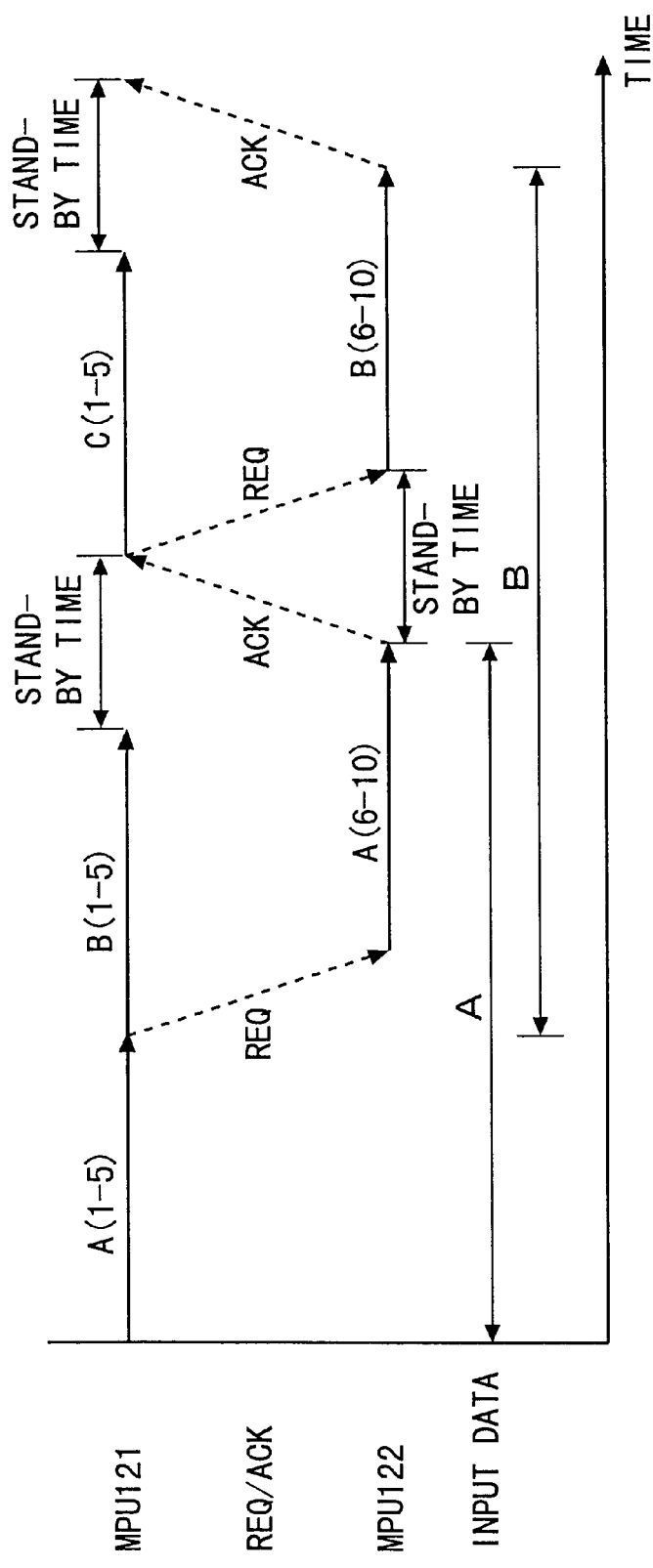

DATA PROCESSING SYSTEM HAVING PLURALITY OF PROCESSORS AND EXECUTING SERIES OF PROCESSINGS IN PRESCRIBED ORDER

The present application is based on application Nos. 10-333039 and 10-357732 filed in Japan, the contents of which are hereby incorporated by reference.

BACKGROUND OF THE INVENTION

1. Field of the Invention

The present invention relates generally to a data processing system, and more particularly, to a data processing system in which a plurality of serially connected processing portions execute respective parts of a series of processings asynchronously to input data.

2. Description of the Related Art

FIG. 44 is a block diagram showing the general configuration of a synchronous pipeline type data processing apparatus as a first conventional technique. The conventional data processing apparatus includes an MPU 70, an image input device 71, processing portions 72 to 76 to execute five processings, SH correction, Log conversion, MTF correction, gamma correction and binarization, respectively and an image output device 77. Image input device 71 includes a photoelectric conversion element such as CCD, a driving system operating the same, and an A/D converter, scans a document for example including both a continuous tone image and line drawing to generate a sampled analog signal, and quantizes the sampled analog signal using the A/D converter into continuous tone reflectivity data in which each pixel has 8 bits (256 tones), for output as a digital signal.

Processing portion 72 performs SH correction processing. The SH correction is also called "shading correction", and is a correction processing to remove reading variations (shading variations) caused by variations in the performance in the photoelectric conversion element such as CCD in image input device 71.

Processing portion 73 performs Log conversion processing. The Log conversion is a processing to calculate and output 8-bit continuous tone density data in the Log relation with the continuous tone reflectivity data after the SH correction.

Processing portion 74 performs MTF correction processing. The MTF correction is performed to correct sharpness, and the sharpness of the 8-bit continuous tone density data obtained by executing the Log conversion to image data at processing portion 73 is corrected using a digital filter such as a Laplacian filter.

Processing portion 75 performs gamma correction processing. The gamma correction is performed to correct the difference in the tone curve between image input device 71 and image output device 77 so as to realize a desired gamma characteristic for the entire data processing apparatus. For example, using an LUT (Look Up Table) of 256 words, 8 bits, non-linear gamma correction data is output. The gamma correction may be also performed to set a desired gamma characteristic for the operator.

Processing portion 76 performs binarizing processing. The binarizing is performed to convert 8-bit continuous tone density data subjected to the gamma correction into 1-bit binary data corresponding to the brightness. The binarizing processing employs area-type tone binarizing such as error diffusion binarizing.

Image output device 77 is a printer such as an electrophotographic printer or ink jet printer, and prints the 1-bit binary data formed by binarization at processing portion 76 onto an output medium such as paper.

Image input device 71, processing portions 72 to 76 and image output device 77 are connected through an image data bus, and process data input in synchronization with a pixel clock common to them.

Thus, in the synchronous pipeline type data processing apparatus described in conjunction with the first conventional technique, image data input from image input device 71 is sequentially processed by processing portions 72 to 76 on a pixel data piece basis. In order to achieve synchronism in exchange of the pixel data among image input device 71, processing portions 72 to 76, and image output device 77, a pixel clock corresponding to each piece of pixel data is generated by a clock generator (not shown), and image input device 71, processing portions 72 to 76, and image output device 77 operate in synchronization with the pixel clock.

As a second conventional technique, the five processings described in conjunction with the first conventional technique are executed asynchronously. FIG. 45 is a block diagram showing the asynchronous processing method. Referring to FIG. 45, processing blocks 80, 81 and 82 can perform processings in response to clocks 85, 86 and 87 specific to them. However, since the processing blocks operate without synchronization, data cannot be exchanged directly among the processing blocks. Thus, buffer memories 83 and 84 having a prescribed capacity are necessary among the blocks. This is because buffer memories 83 and 84 can absorb the difference in the processing speeds of processing blocks 80, 81 and 82.

Furthermore, as a third conventional technique, there is a parallel processing method in which the same processings are performed in parallel. For example, according to a technique disclosed by Japanese Patent Laying-Open No. 61-28164, provided is a pipeline processor having a plurality of image pipeline processors which are connected in a ring for parallel processing and task (image data), an object program for each task, and a table for each task are loaded from the memory to the pipeline processor. The pipeline processor processes prescribed tasks in parallel.

In the synchronous pipeline type data processing apparatus described in conjunction with the first conventional technique, image input device 71, processing blocks 72 to 76 and image output device 77 operate in synchronization with a pixel clock, and the pixel clock must be generated based on any element having the lowest operating speed among image input device 71, processing portions 72 to 76, and image output device 77. As a result, the circuit must be constructed according to a processing portion forming a bottleneck (having the lowest operating speed), which makes difficult the circuit design.

Furthermore, in the asynchronous processing type data processing apparatus described in conjunction with the second conventional technique, a processing block forming a bottleneck would not determine the processing speed of the data processing apparatus unlike the case of the synchronous pipeline method described in conjunction with the first conventional technique, but buffer memories are necessary, which pushes up the cost. In addition, since data is written/read to/from the buffer memory by two processing blocks, each block must accommodate such that one of the blocks can access a buffer memory, or such an arbitration processing must be performed by a controller provided for each of the buffer memories.

Furthermore, in the parallel processing method described in conjunction with the third conventional technique, a processing with a large processing load is processed by a plurality of processing blocks connected in parallel, and therefore high speed processing can be performed, but excess processing blocks to execute a processing with a large load are previously added. As a result, if the load of a processing block changes based on input data, one of processing blocks connected in parallel is not used when the load is small, which lowers the performance of the apparatus.

Also as a fourth conventional technique, an asynchronous type data processing apparatus to sequentially execute a plurality of processings to input data using a plurality of MPUs (micro processing units) is known. In the conventional data processing apparatus, the plurality of MPUs execute respective parts of the plurality of processings for asynchronous data processing, and data is exchanged among the MPUs to execute the series of processings to the input data.

FIG. 46 is a block diagram for use in illustration of data input/output between MPUs in the conventional data processing apparatus. The figure shows data input/output in executing 10 processings, processings 1 to 10 by two MPUs, MPUs 121 and 122. MPU 121 executes 5 processings, processings 1 to 5, while MPU 122 executes the succeeding 5 processings, processings 6 to 10. Therefore, data input to MPU 121 is subjected to the five processings, processings 1 to 5, and then transmitted to MPU 122, and MPU 122 executes processings 6 to 10 to the data processed by MPU 121.

Two control signals, request signal ACK and transmission signal REQ are transmitted/received between MPUs 121 and 122 to transmit data DATA. Request signal ACK is a signal to request data DATA, and transmitted from MPU 122 to MPU 121. Transmission signal REQ is a signal to transmit data DATA, and transmitted from MPU 121 to MPU 122.

When request signal ACK is transmitted from MPU 122 to MPU 121, the state of MPU 122 is that execution of processings 6 to 10 by MPU 122 to the previous data has been completed. When transmission signal REQ is transmitted from MPU 121 to MPU 122, the state of MPU 121 is that request signal ACK has been received from MPU 122, and that execution of processings 1 to 5 to data DATA to be transmitted has been completed.

Therefore, MPU 121 can transmit transmission signal REQ to MPU 122 on the condition that request signal ACK is received from MPU 122 and execution of processings 1 to 5 has been completed. Meanwhile, MPU 122 can transmit request signal ACK on the condition that execution of processings 6 to 10 by MPU 122 has been completed. Data DATA will be transmitted from MPU 121 to MPU 122 only if both conditions for MPUs 121 and 122 are satisfied.

FIG. 47 is a chart for use in illustration of change with time in the operation states of MPUs 121 and 122. In FIG. 47, the horizontal direction represents time, and the time elapses to the right in the figure. From the top, the state of MPU 121 and then the state of MPU 122 are shown. In the lowermost part, time for executing all the processings, processings 1 to 10 to input data A and input data B is shown.

MPU 121 executes processings 1 to 5 to input data A (A (1 to 5)), transmits transmission signal REQ to MPU 122, then immediately executes processings 1 to 5 to input data B (B (1 to 5)), and stands by until request signal ACK is received from MPU 122. When request signal ACK is received from MPU 122, MPU 121 transmits transmission signal REQ and transmits the processed input data B to MPU 122. Then, MPU 121 executes processings 1 to 5 to input data C.

After receiving transmission signal REQ from MPU 121, MPU 122 executes processings 6 to 10 to input data A (A (6 to 10) processed by MPU 121. When the processings to input data A is completed, MPU 122 transmits request signal ACK to MPU 121, and stands by until transmission signal REQ is received from MPU 121. Then, after receiving transmission signal REQ from MPU 121, MPU 122 receives input data B processed by MPU 121 and executes processings 6 to 10 to the received input data B (B (6 to 10)).

Since MPUs 121 and 122 thus execute respective processings, input data A and input data B are subjected to processings 1 to 10 in different time periods as shown in the figure.

In image processing to execute a plurality of processings to image data, loads for respective processings vary if pixel data in the image data varies. This is because difference in pixel data necessitates difference in the contents of processings. For example, in the image processing of executing 6 processings, i.e., shading correction, Log conversion, magnification changing, MTF correction, γ correction, and binarization to image data including characters and photographs, the content of processing is different and therefore the load is different between the case in which pixel data to be processed belongs to the region of characters and the case in which it belongs to the region of photographs. Regarding MTF correction, if the load necessary for processing pixel data belonging to the character region is "3", the load necessary for processing pixel data belonging to the photograph region is "1". Regarding binarization, if the load necessary for processing pixel data belonging to the character region is "1", the load necessary for processing pixel data belonging to the photograph region is "3".

If the data processing apparatus according to the fourth conventional technique processes data such as image data whose load changes among processings, the load of MPU 121 and the load of MPU 122 are different depending upon the kind of data, and therefore the stand-by time before MPU 121 receives request signal ACK from MPU 122 and the stand-by time before MPU 122 receives data DATA are long, which disadvantageously lowers the processing speed.

SUMMARY OF THE INVENTION

The present invention was made in order to solve the above-mentioned problems, and it is one object of the present invention to devise the way of controlling asynchronous processing, and to provide a data processing system capable of processing data at a high speed even if the load changes depending upon data to be processed.

Another object of the present invention is to provide a data processing system capable of processing data at a high speed by reducing the entire stand-by time (waiting time) in which no operation is executed by a plurality of processing portions.

In order to achieve the above-described objects, a data processing system according to one aspect of the present invention includes a plurality of processors for executing a series of processings to data to be processed in a prescribed order, and a controller for determining the progress of a processing in each of the plurality of processors and changing a processing executed by each of the plurality of processors if there is a delayed processing, and processings by each of the processors are executed asynchronously.

According to another aspect of the present invention, a data processing system includes a plurality of processors for executing a series of processings to data to be processed in a prescribed order, and a controller for changing a processing executed by each of the plurality of processors based on the attribute of the data to be processed, and processings by a plurality of processors are executed asynchronously.

According to yet another aspect of the present invention, a data processing system includes a plurality of processors for executing a series of processings to data to be processed in a prescribed order, a memory for storing data processed by each of the plurality of processors, and a controller for determining the progress of a processing by each of the plurality of processors, controlling the plurality of processors such that data processed by each of the plurality of processors is transmitted to a succeeding processor without through the memory if there is no delayed processing, and if there is a delayed processing, data processed by a processor executing a processing preceding to the delayed processing is stored in the memory, and processings by the plurality of processors are executed asynchronously.

According to a still further aspect of the present invention, a data processing system includes a plurality of processors for executing a series of processings to data to be processed in a prescribed order, a memory for storing data processed by each of the plurality of processors, and a controller for, if one of the plurality of processors has no data to be processed and data that has been processed by the processor exists in the memory, instructing the one of the plurality of processors to execute a processing succeeding to a processing that has been executed by the processor and processings by the plurality of processors are executed asynchronously.

According to yet another aspect of the present invention, a data processing system includes a plurality of processors for executing a series of processings to data to be processed in a prescribed order, processings by the plurality of processors are executed asynchronously, and the plurality of processors include a first processor capable of executing a specified processing and a processing preceding to the specified processing among the series of processings, and a second processor capable of executing the specified processing and a processing succeeding to the specified processing.

According to yet another aspect of the present invention, a data processing system includes first and second processors for dividing a series of processings and executing the same to data to be processed in a prescribed order, processings by the plurality of processors are executed asynchronously, and at least a part of the series of processings can be executed by any of the first and second processors.

According to these aspects of the invention, the loads of the plurality of processors can be equalized even if the loads of the plurality of processors vary because of difference in data to be processed. As a result, data can be processed at a high speed, and a data processing system capable of high performance can be provided.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 5A and 5B are diagrams for use in illustration of pixel data used for MTF correction;

FIG. 12 is a block diagram showing processing executed by each of MPUs when an MPU having a large load is detected by the data flow control portion according to the second embodiment;

FIG. 29 is a block diagram for use in illustration of processing executed by a preceding MPU and a succeeding MPU when pixel data after SH correction is stored in an intermediate buffer memory after a processing by an MPU executing SH correction is completed according to the sixth embodiment;

FIG. 30 is a block diagram for use in illustration of data input/output between MPUs in a data processing system according to a seventh embodiment of the present invention;

FIG. 34 is a diagram showing the state of each of MPUs in comparison with a data processing apparatus according to the fourth conventional technique in processing input data when the load required for processings 1 to 5 is always smaller than the load required for processings 6 to 10;

FIG. 35 is a diagram showing the state of each of MPUs in comparison with a data processing apparatus according to the fourth conventional technique in processing input data when the load required for processings 1 to 5 is always larger than the load required for processings 6 to 10;

FIG. 36 is a diagram showing loads for processings 1 to 6 for each of patterns determined based on the attribute of pixel data to be processed and a magnification to be changed;

FIG. 40 is a diagram showing a load in each of processings for each kind of pixel data to be processed;

FIG. 47 is a diagram showing change with time in the operation states of a preceding MPU and a succeeding MPU in an asynchronous data processing apparatus according to the fourth conventional technique.

DESCRIPTION OF THE PREFERRED EMBODIMENTS

Figure 1:
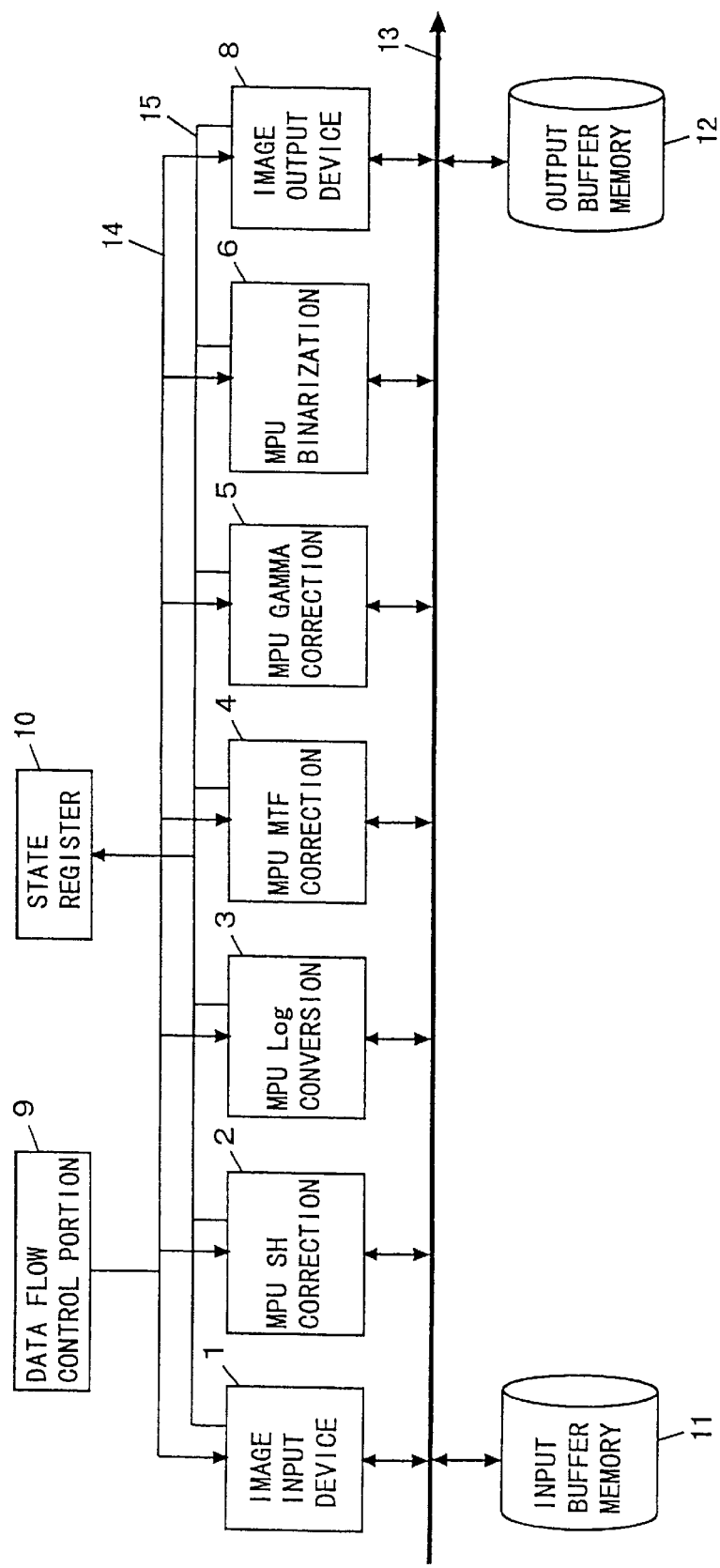
FIG. 1 is a block diagram showing the general configuration of a data processing apparatus of a first embodiment according to the present invention.

Embodiments of the present invention will be now described in conjunction with the accompanying drawings, in which the same reference characters denote the same or corresponding portions.

First Embodiment

FIG. 1 is a block diagram showing the general configuration of a data processing apparatus of a first embodiment according to the present invention. Referring to FIG. 1, the data processing apparatus of the first embodiment includes an image input device 1 to input image data, MPUs 2 to 6 to execute various processings to input image data on a pixel data piece basis, an image output device 8 to output the processed image data to a recording medium such as paper, a state register 10 to monitor the operating states of image input device 1, MPUs 2 to 6 and image output device 8 (hereinafter referred to as "MPUs etc. 1 to 8"), a data flow control portion 9 to control the operations of MPUs etc. 1 to 8 by referring to state register 10, an input buffer memory 11 to temporarily store image data input from image input device 1, and an output buffer memory 12 to temporarily store image data output from image output device 8.

MPUs 2 to 6 are microprocessing units, and the contents of processings by MPUs 2 to 6 are determined based on an instruction from data flow control portion 9, and processings to be executed by MPUs 2 to 6 are determined by loading a processing program stored in a ROM provided inside data flow control portion 9. In an initialization state, e.g., when the power supply of the data processing apparatus is turned on, or one page of image data is input, data flow control portion 9 instructs MPU 2 to execute SH correction, MPU 3 to execute Log conversion, MPU 4 to execute MTF correction, MPU 5 to execute gamma correction, MPU 6 to execute binarization, and each program is loaded at MPUs 2 to 6. Note that the contents of these 5 processings, SH correction, Log conversion, MTF correction, gamma correction and binarization are the same as the processings described in conjunction with the first conventional technique, and therefore the description is not repeated here.

Image input device 1 and image output device 8 are the same as image input device 71 and image output device 77, respectively described in conjunction with the first conventional technique, and therefore the description is not repeated here.

MPUs etc. 1 to 8 are connected to data flow control portion 9 through a system bus 14 and connected to state register 10 through a system bus 15. MPUs etc. 1 to 8 are connected with one another through an image data bus 13, and pixel data can be exchanged among MPUs etc. 1 to 8 and be input/output to/from input buffer memory 11 and output buffer memory 12.

In the data processing apparatus shown in FIG. 1, a document is read by image input device 1 and image data is stored in input buffer memory 11 on a pixel data piece basis. MPU 2 sequentially reads out pixel data pieces stored in input buffer memory 11 in the order in which these data pieces have been read using image input device 1 and subjects the data pieces to SH correction. The pixel data after the SH correction by MPU 2 is transmitted to MPU 3. MPU 3 executes Log conversion to the pixel data received from MPU 2 and transmits the resultant pixel data to MPU 4. Thus, the pixel data is sequentially transmitted among MPUs 2 to 6, and subjected to SH correction, Log conversion, MTF correction, gamma correction and binarization. The pixel data after the binarization by MPU 6 is stored in output buffer memory 12. Image output device 8 stores the processed pixel data in output buffer memory 12 and also outputs the data to a display device for display or outputs the data onto a recording medium such as paper for printing.

Figure 2:
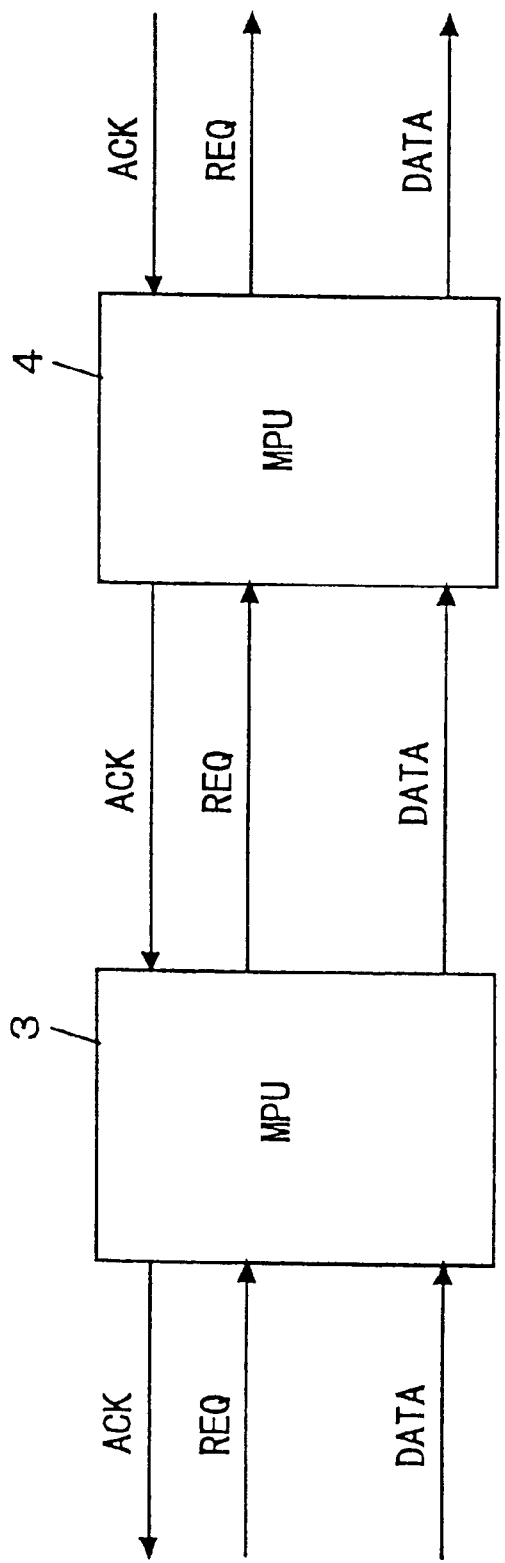
FIG. 2 is a diagram for use in illustration of the procedure of transmitting pixel data between an MPU executing a preceding processing and an MPU executing a succeeding processing.

FIG. 2 is a diagram for use in illustration of the procedure of transmitting data between an MPU executing a preceding processing and an MPU executing a succeeding processing. In FIG. 2, the procedure of transmission between MPUs 3 and 4 is shown by way of illustration. When a processing is completed in MPU 3, signal REQ to request MPU 4 to receive pixel data DATA is transmitted to MPU 4. After receiving signal REQ to request reception of the data from MPU 3, MPU 4 transmits signal ACK to respond to the request of reception of data to MPU 3 when a processing being presently executed by MPU 4 is completed. When signal ACK to respond to the request of reception of data is received from MPU 4, MPU 3 transmits pixel data DATA to MPU 4. Thus, pixel data DATA is transmitted between MPUs 3 and 4, while MPUs 3 and 4 execute respective processings asynchronously.

Among MPUs 2 to 6, pixel data DATA is transmitted in the above procedure, and processings are sequentially executed by MPUs 2 to 6. However, for some pixel data, time periods required for processings at MPUs 2 to 6 are not equal. For example, for certain pixel data, MTF correction takes long, and the load of MPU 4 therefor could be larger. As a result, MPU 4 forms a bottleneck and the data processing speed of the data processing apparatus as a whole may be lowered.

In order to avoid this problem, in a data processing apparatus of this embodiment, state register 10 monitors the processing loads of MPUs 2 to 6, and data flow control portion 9 instructs an MPU executing a processing preceding to an MPU having an increased processing load to execute a processing being executed by the MPU having the increased load. This will be described in detail.

Figure 3:
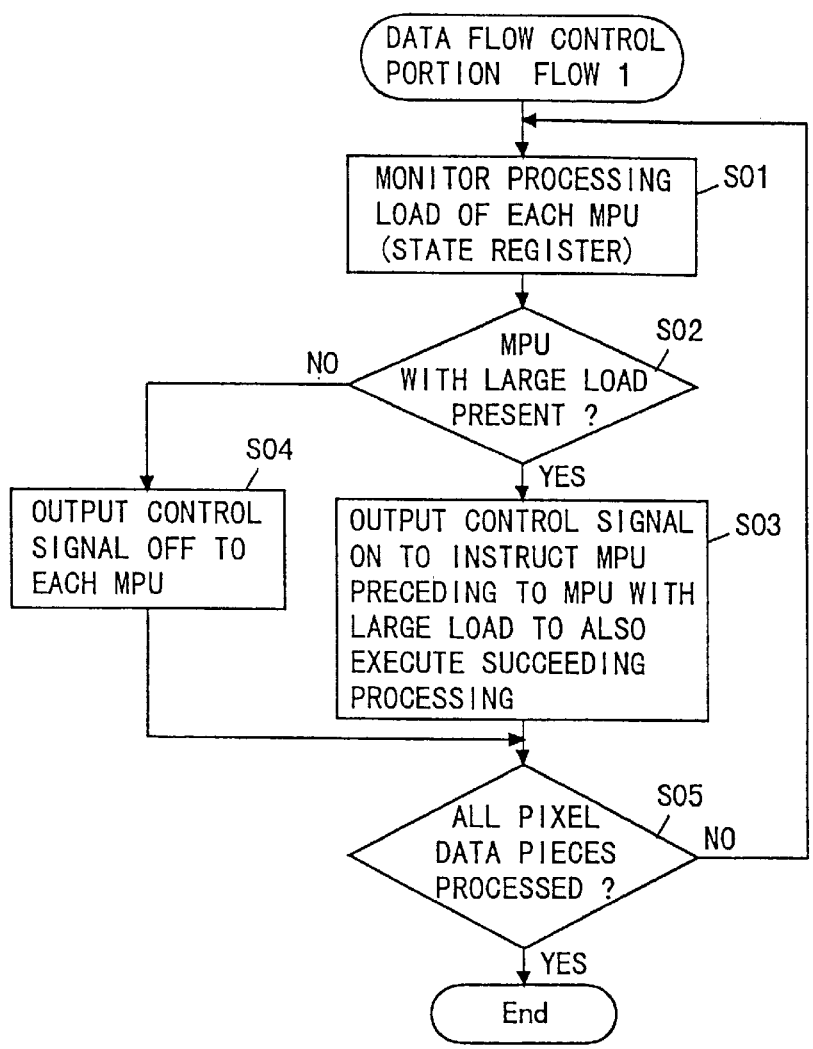
FIG. 3 is a flow chart for use in illustration the flow of processing executed by a data flow control portion according to the first embodiment.

FIG. 3 is a flow chart for use in illustration of the flow of processing executed by data flow control portion 9. Referring to FIG. 3, data flow control portion 9 monitors the processing loads of MPUs 2 to 6 by referring to state register 10 (step S01). State register 10 stores time taken for processing pixel data and the address of processed pixel data transmitted from each of MPUs 2 to 6, and data flow control portion 9 gets hold of the load of each of MPUs 2 to 6 by referring to the content of state register 10.

As a result, if there is an MPU having a large processing load (YES in step S02), a control signal ON is output to an MPU executing a processing preceding to the MPU having the large load to also execute the processing being executed by the MPU having the large load in addition to the presently executing processing (step S03). For example, referring to FIG. 1, if the load of MPU 4 to execute MTF correction becomes large, data flow control portion 9 detects the increase in the load of MPU 4 based on the condition of state register 10 and outputs a control signal to MPU 3 executing Log conversion, i.e., the processing preceding to MTF correction to also execute MTF correction in addition to the Log conversion which MPU 3 is presently executing. Thus, MPU 3 will execute MTF correction in addition to Log conversion.

If there is no such MPU having a large processing load (NO in step S02), a control signal OFF to instruct each of MPUs 2 to 6 to execute an processing in the initial state is output (step S04).

It is then determined whether or not all the pixel data pieces have been processed (step S05), and if there is pixel data yet to be processed, the above processing is repeated, while if all the pixel data pieces have been processed, the processing is completed.

Thus, a processing being executed by an MPU having an increased load is executed by an MPU executing a processing preceding to the processing in parallel, and the loads can be distributed, so that the data processing speed of the data processing apparatus as a whole may be improved.

When an MPU having a large load is determined by data flow control portion 9 (step S02 in FIG. 3), the address of data to be processed by each of MPUs 2 to 6 is referred to.

Figure 4:
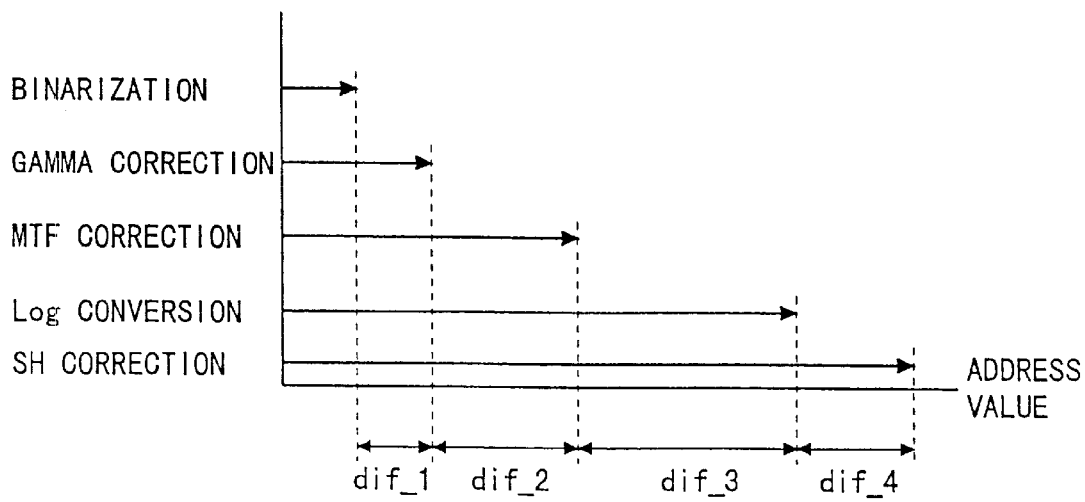
FIG. 4 is a diagram for use in illustration of the addresses of pixel data to be processed by an MPU and the differences.

FIG. 4 is a diagram showing the difference between the address values of pixel data pieces processed by each of MPUs. Image data input to image input device 1 has an address value for each of pixel data pieces, and the address value is sequentially attached in the order of input to image input device 1. This is obtained as an address value in input buffer memory 11 when image data input to image input device 1 is stored in input buffer memory 11. Each of MPUs 2 to 6 transmits the address of a pixel data piece to state register 10 every time processing of the pixel data piece is completed. Data flow control portion 9 calculates the address difference (dif_1, dif_2, dif_3, dif_4) between pixel data pieces being processed by each of MPUs 2 to 6 based on the address values of pixel data pieces being processed by each of MPUs, stored in state register 10. If the calculated address difference is smaller than a predetermined set value, it is determined that the load of a preceding MPU of the two MPUs between which address difference is smaller has increased. For example, if the address difference dif_2 between the address value processed by MPU 5 for gamma correction and the address value processed by MPU 4 for MTF correction is smaller than a predetermined threshold value reg_2, it is determined that the load of MPU 4 for MTF correction which is the preceding processing has increased.

Address difference dif_1 represents the address difference between MPU 6 for binarization and MPU 5 for gamma correction, dif_2 represents the address difference between MPU 5 for gamma correction and MPU 4 for MTF correction, dif__3 represents the address difference between MPU 4 for MTF correction and MPU 3 for Log conversion, and dif__4 represents the address difference between MPU 3 for Log conversion and MPU 2 for SH correction. If the address difference is small, it shows that the load of the preceding MPU is large. Data flow control portion 9 determines that the load of the preceding MPU has increased if the address difference is smaller than the threshold value. The threshold value is determined for each of the address differences (dif__1, dif__2, dif__3, dif__4), and stored in a ROM in data flow control portion 9.

Threshold values reg are different among the MPUs for the following reasons. For example, if a matrix operation of a plurality of pixels such as a processing using a Laplacian filter is executed in MTF correction, a corresponding amount of address difference will be necessary. FIGS. 5A and 5B are diagrams for use in illustration of pixel data when MTF correction is executed using a 3×3 filter. Referring to FIG. 5A, if MTF correction is executed using a 3×3 filter as shown in FIG. 5B, Log conversion must be completed for all the pixels within the 3×3 matrix including a pixel to be processed in the center. As a result, the MTF correction requires data for one line each before and after a line including the pixel to be processed, and therefore the address of the pixel subjected to the Log conversion preceding to the MTF correction must be different from the address of the pixel subjected to the MTF correction by the address difference equal to the number of pixels for one line +1. This must be taken into consideration to set a threshold value for the address difference between MPU 4 for MTF correction and MPU 3 for Log conversion. Therefore, threshold value reg__1 for address difference dif__1, threshold value reg__3 for dif__3 and threshold reg__4 for dif__4 need only be at least 1, preferably 1, and threshold value reg__2 for dif__2 needs only be at least the number of pixels for one line +1, preferably the number of pixels for one line +1.

Figure 6:
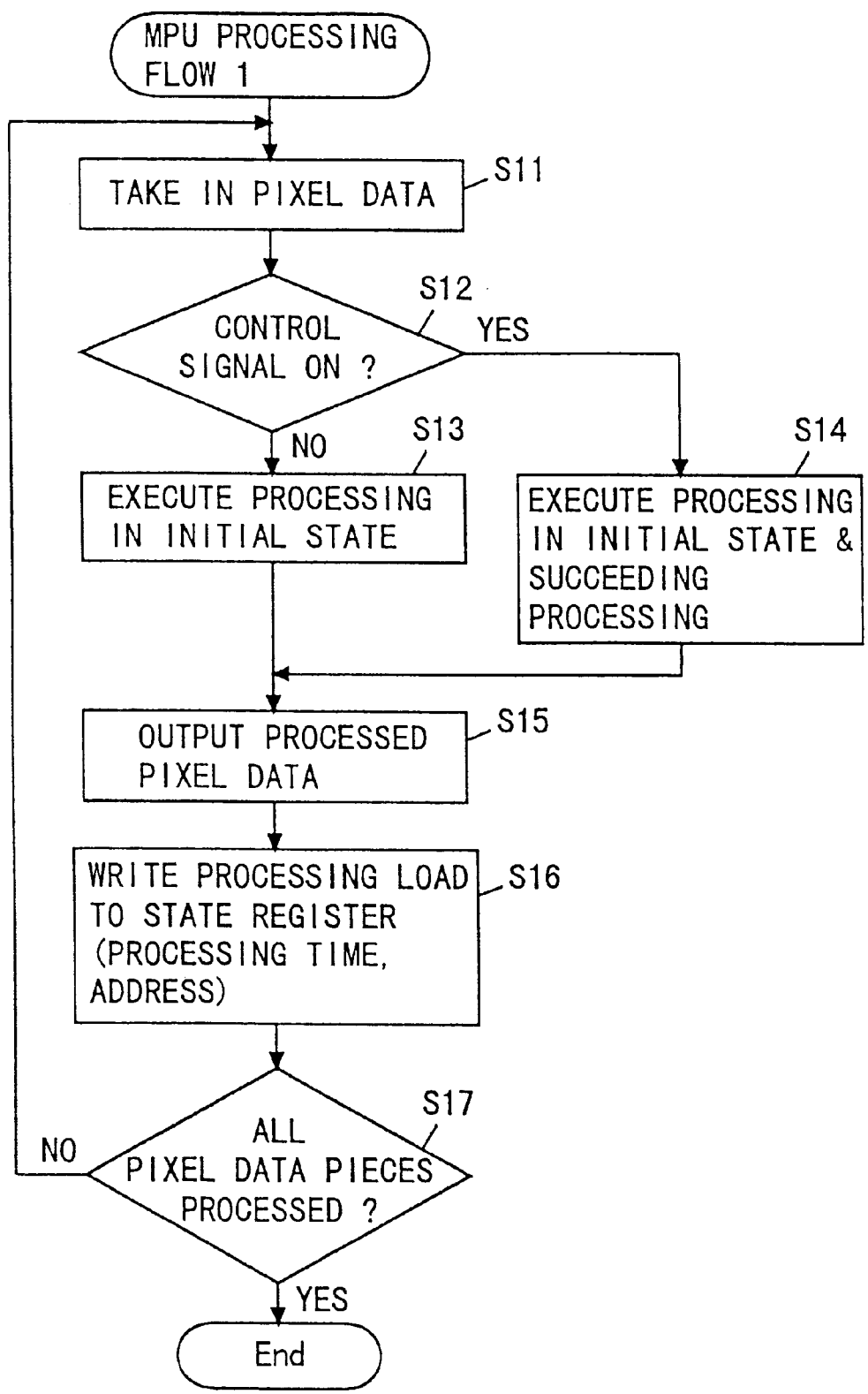
FIG. 6 is a flow chart for use in illustration of the flow of processing by each of MPUs according to the first embodiment.

FIG. 6 is a flow chart for use in illustration of the flow of processing executed by each of MPUs 2 to 6. Referring to FIG. 6, MPUs 2 to 6 take in pixel data (step S11). MPU 2 take in pixel data from input buffer memory 11, each of MPUs 3 to 6 receives pixel data from an MPU executing a corresponding preceding processing. For example, MPU 3 receives pixel data from MPU 2.

It is then determined whether or not a control signal has been received from data flow control portion 9 (step S12). Note that the control signal received here is either control signal ON or control signal OFF. If the received control signal is control signal ON (YES in step S12), each of MPUs 2 to 6 load a corresponding succeeding processing program from the ROM inside data flow control portion 9, and executes two processings, the presently executing processing (the processing in the initial state) and the succeeding processing (step S14).

If control signal ON has not been received, in other words, if control signal OFF has been received (NO in step S12), the presently executing processing (the processing in the initial state) is executed (step S13). Then, processed pixel data is output (step S15). In MPUs 2 to 5, the processed pixel data is transmitted to any of MPUs 3 to 6 executing the corresponding succeeding processings. For example, MPU 2 transmits the processed pixel data to MPU 3. MPU 6 transmits the processed pixel data to image output device 7.

Then, the address of the processed pixel data and the time or processing speed for processing the pixel data are written in state register 10 (step S16).

It is then determined if all the pixel data pieces have been processed (step S17), and if all the pixel data pieces have not been processed, the processing from steps S10 to S16 is repeated, and the processing is completed when all the pixel data pieces have been processed.

The processing in the initial state and the succeeding processing herein for example refer to Log conversion and MTF correction, respectively in MPU 3.

Figure 7:
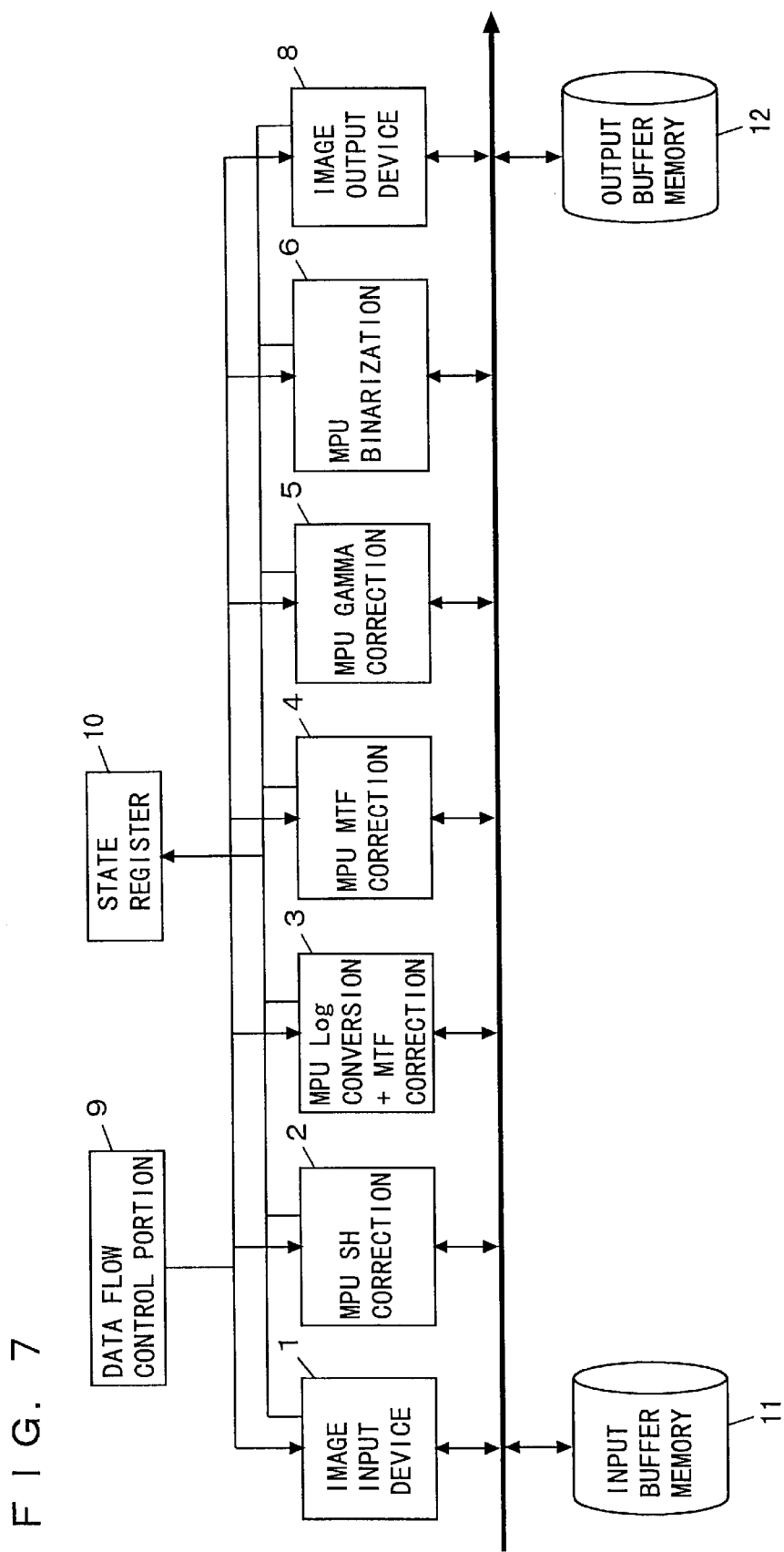
FIG. 7 is a first block diagram showing processing executed by each of MPUs when an MPU having a large load is detected by the data flow control portion.

FIG. 7 shows a processing executed by each of MPUs 2 to 6 if the load of MPU 4 is determined as large by data flow control portion 9 in the data processing apparatus of this embodiment. Referring to FIG. 7, MTF correction is executed in addition to Log conversion in MPU 3. In this state, regarding the flow of pixel data, as a first flow path, pixel data after SH correction in MPU 2 is subjected to Log conversion and MTF correction in MPU 3 and then transmitted to MPU 5 for gamma correction. As a second flow path, pixel data after SH correction is subjected to only Log conversion in MPU 3, then transmitted to MPU 4 for MTF correction, and then transmitted to MPU 5 for gamma correction.

As described above, in the data processing apparatus of this embodiment, the loads of MPUs 2 to 6 are always monitored by data flow control portion 9, and an MPU preceding to an MPU determined as having a large load executes a processing being executed by the MPU having the large load in parallel to the presently executing processing, the loads may be distributed among MPUs 2 to 6 and as a result, the data processing speed of the data processing apparatus as a whole may be improved.

In this embodiment, the loads of MPUs 2 to 6 are constantly monitored by data flow control portion 9, and an MPU executing a processing preceding to an MPU determined as having a large load executes a processing being executed by the MPU having the large load in parallel with the presently executing processing, while an MPU executing a processing succeeding to a processing executed by an MPU determined as having a large load may execute the processing being executed by the MPU having the large load in parallel with the presently executing processing. Thus, the processings executed by MPUs 2 to 6 are changed by data flow control portion 9 to distribute the loads among MPUs 2 to 6, so that the data processing speed of the data processing apparatus as a whole may be improved.

In this case, in the processing of data flow control portion 9, in step S03 in FIG. 3, control signal ON to instruct an MPU executing a processing succeeding to an MPU having a large load to execute a processing being executed by the MPU having the large load in addition to the presently executing processing is output to the MPU executing a processing succeeding to the MPU having the large load (step S03). For example, referring to FIG. 1, if the load of MPU 4 executing MTF correction has become large, data flow control portion 9 detects the increase in the load of MPU 4 based on the condition of state register 10, and outputs a control signal to instruct MPU 5 executing gamma correction succeeding to MTF correction to execute MTF correction in addition to the presently executing gamma correction. Thus, MPU 3 will execute MTF correction and gamma correction.

Meanwhile, in processings by MPUs 3 to 6, in step S13 in FIG. 6, if the received control signal is control signal ON, a program for a corresponding preceding processing is loaded from the ROM in data flow control portion 9 in step 14, and two processings, i.e., the presently executing processing (the processing in the initial state) and the preceding processing are executed (step S14).

Figure 8:
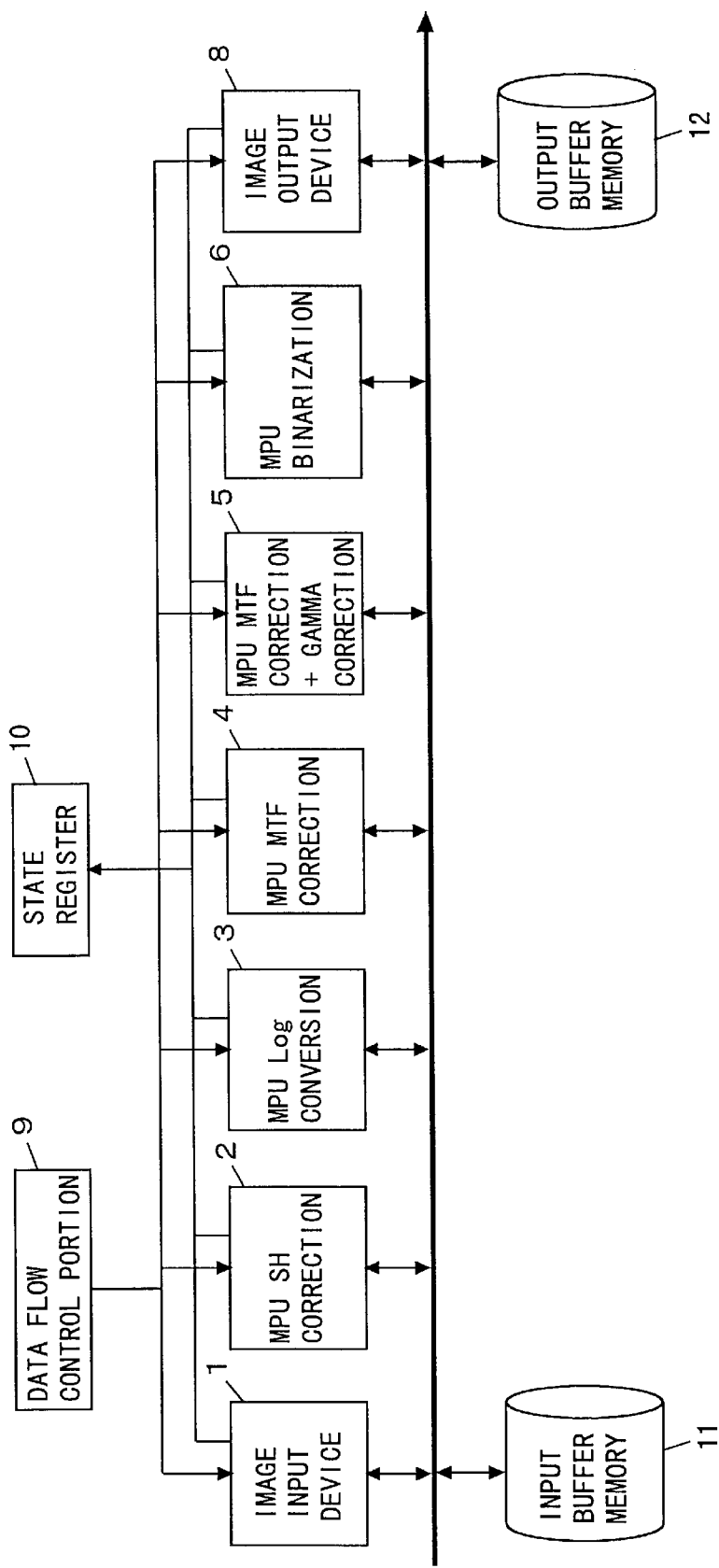
FIG. 8 is a second block diagram showing processing executed by each of MPUs when an MPU having a large load is detected by the data flow control portion.

In the data processing apparatus in this case, the processings executed by MPUs 2 to 6 if the load of MPU 4 is determined as being large by data flow control portion 9 is given in FIG. 8. Referring to FIG. 8, MPU 5 executes MTF correction and gamma correction. Regarding the flow of pixel data in this state, as a first flow path, pixel data after Log conversion in MPU 3 is subjected to MTF correction in MPU 4 followed by gamma correction in MPU 5. As a second flow path, pixel data after Log conversion in MPU 3 is transferred to MPU 5 for MTF correction and gamma correction.

Second Embodiment

Figure 9:
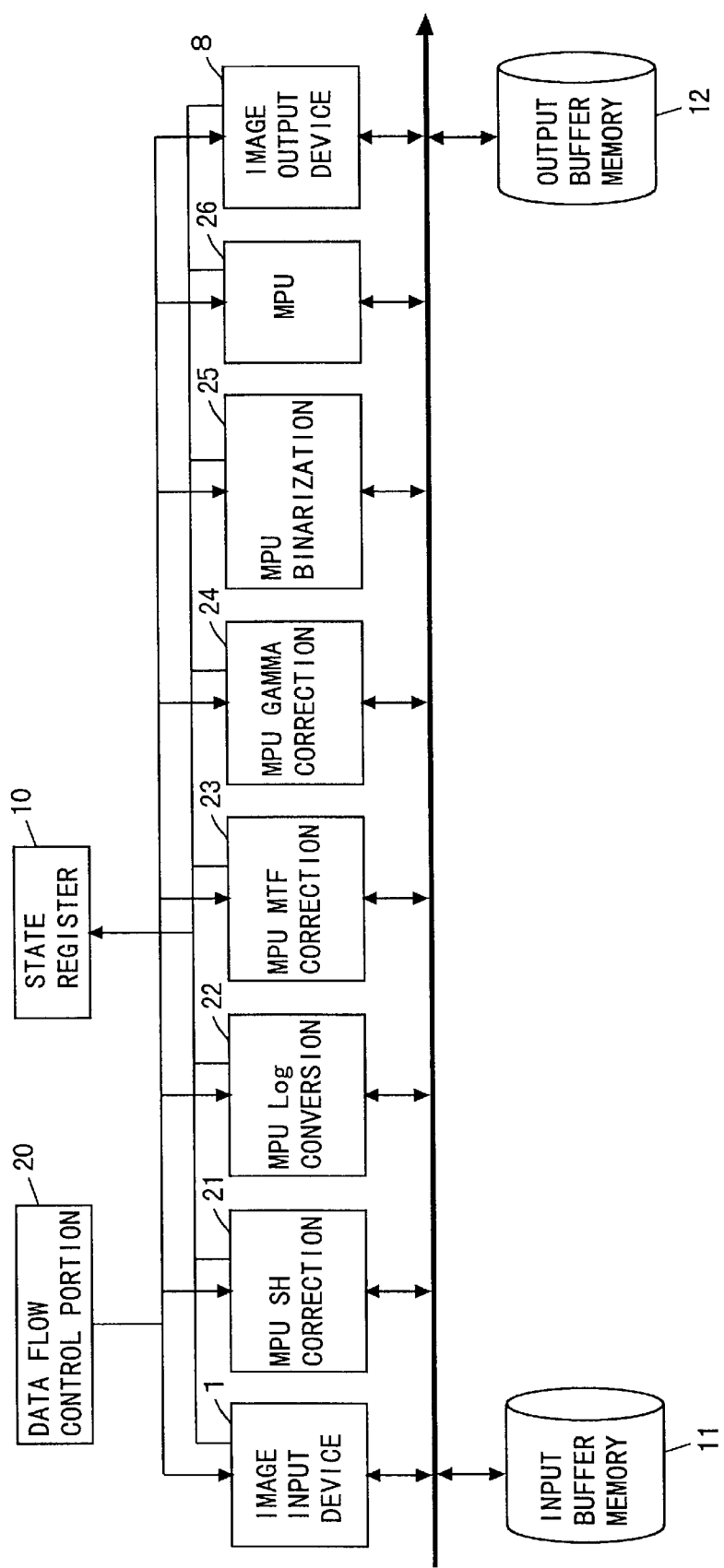
FIG. 9 is a block diagram showing the general configuration of a data processing apparatus of a second embodiment according to of the present invention.

FIG. 9 is a block diagram showing the general configuration of a data processing apparatus of a second embodiment according to the present invention. Referring to FIG. 9, the data processing apparatus of the second embodiment includes an image input device 1 to input image data, MPUs 21 to 26 to execute various processings to the input image data on a pixel data piece basis, an image output device 8 to output the processed image data onto a recording medium such as paper, a state register 10 to monitor the operation states of image input device 1, MPUs 21 to 26 and image output device 8, a data flow control portion 20 to control operations of MPUs 21 to 26 by referring to state register 10, an input buffer memory 11 to temporarily store image data input by image input device 1, and an output buffer memory 12 to temporarily store image data output from image output device 8.

MPUs 21 to 25 execute SH correction, Log conversion, MTF correction, gamma correction and binarization, respectively in the initial state. MPU 26 executes no processing in the initial state.

In the data processing apparatus of the second embodiment, a processing executed by an MPU determined by data flow control portion 20 as having a large load among MPUs 21 to 25 is executed in parallel by MPU 26.

Figure 10:
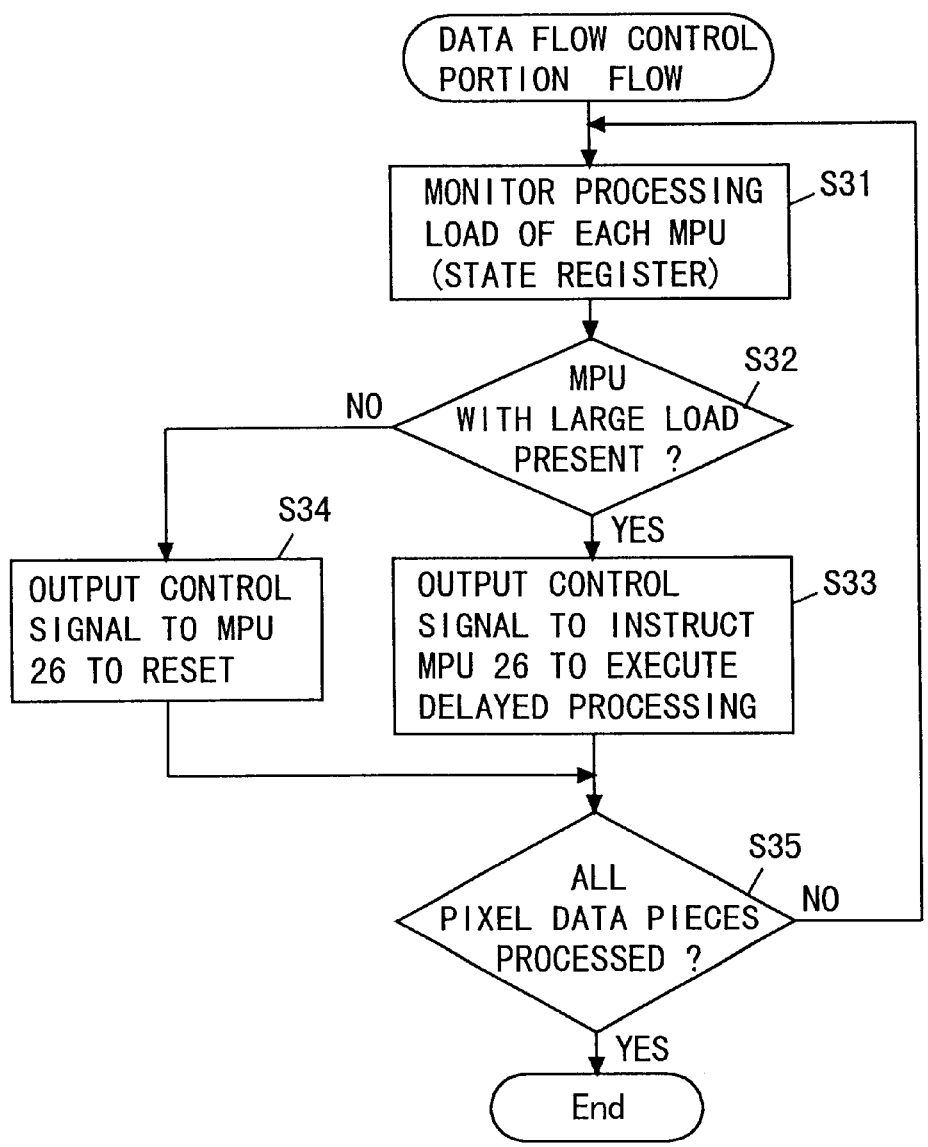
FIG. 10 is a flow chart for use in illustration of the flow of processing executed by a data flow control portion according to the second embodiment.

FIG. 10 is a flow chart for use in illustration of the flow of processing executed by data flow control portion 20 according to the second embodiment. Referring to FIG. 10, data flow control portion 20 obtains the address of pixel data to be processed by each of MPUs 21 to 25, stored in state register 10 (step S31). The address difference between the address values of pixel data pieces to be processed by each of MPUs 21 to 25 obtained from state register 10 is obtained, and an MPU having a large load is detected based on the obtained address difference (step S32). If it is determined that there is an MPU having a large load (YES in step S32), a control signal to instruct MPU 26 to execute the processing being executed by the MPU determined as having the large load is output to MPU 26 (step S33).

Meanwhile, if it is determined that there is no MPU having a large load (NO in step S32), a control signal for resetting is output to MPU 26 (step S34).

It is then determined if all the pixel data pieces have been processed (step S35), and if there is pixel data yet to be processed, the above processing is repeated while the processing is completed if all the pixel data pieces have been processed.

Figure 11:
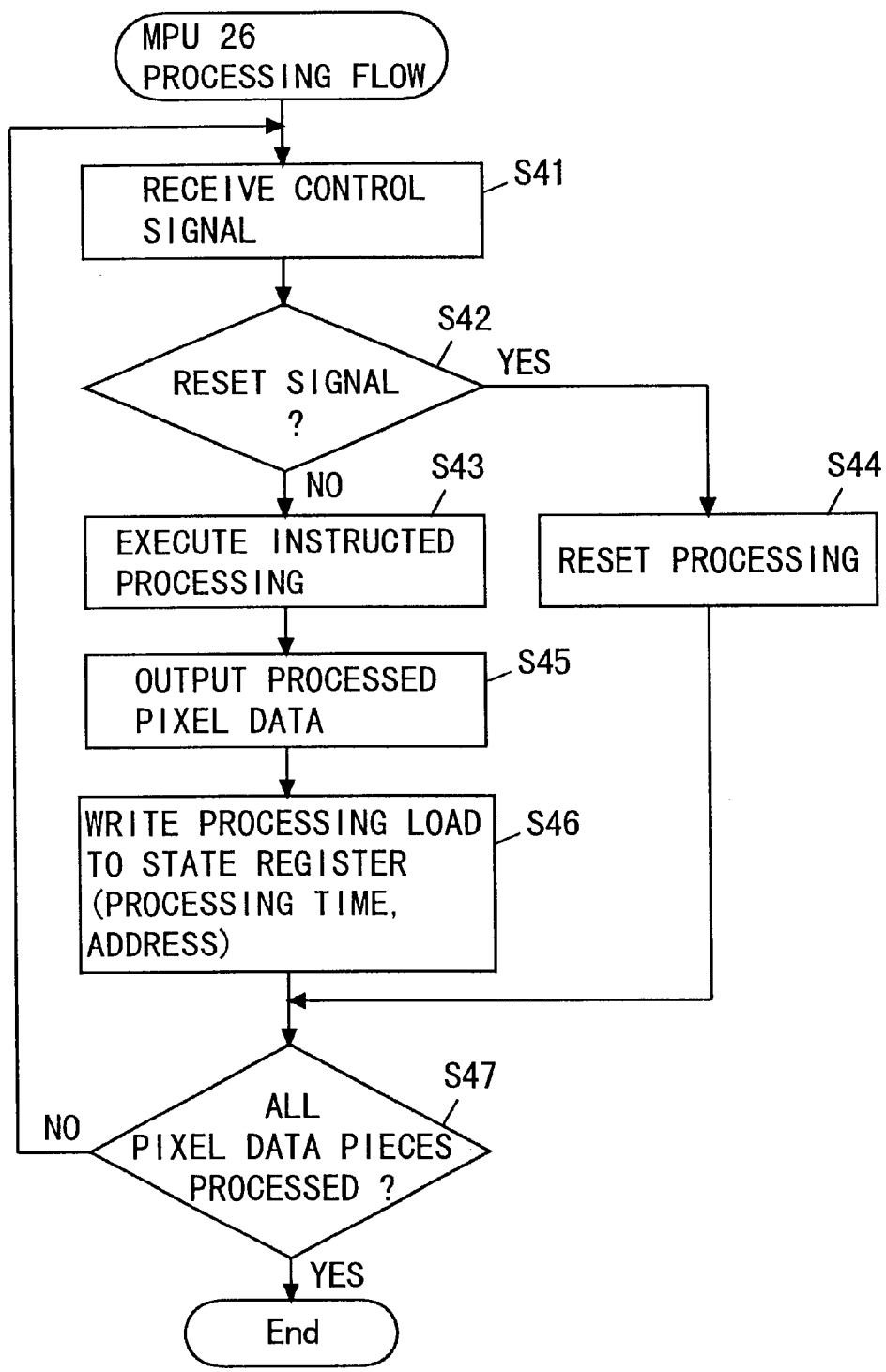
FIG. 11 is a flow chart for use in illustration of the flow of processing executed by an MPU which execute no processing in an initial state according to the second embodiment.

FIG. 11 is a flow chart for use in illustration of the flow of processing executed by MPU 26. Referring to FIG. 11, MPU 26 receives a control signal output from data flow control portion 20 (step S41). The control signal to be received here is either a control signal to instruct execution of a processing with a large load or a control signal to instruct resetting.

It is then determined whether or not the received control signal is a reset signal (step S42), and if the received control signal is a reset signal, a reset processing to stop executing any processing is executed (step S44), and the control proceeds to step S47.

Meanwhile, if it is determined that the control signal is not a reset signal, in other words, if the control signal to instruct execution of the processing with the large load has been received (NO in step S42), a program for a processing determined as having a large load is loaded from the ROM in data flow control portion 20 and the processing is executed (step S43).

The processed pixel data is output (step S45). In this case, if the processing determined as having a large load is binarization, the processed pixel data is output to image output device 8. If the processing is any other processing, the data is transferred to an MPU executing a processing succeeding to the processing with the large load. If, for example, the processing determined as having a large load is MTF correction, the data is transmitted to MPU 24 executing the succeeding processing, gamma correction.

FIG. 12 is diagram showing a processing executed by each of MPUs 21 to 26, in the case in which the load of MPU 23 executing MTF correction is determined as large by way of illustration. Referring to FIG. 12, MPU 26 receives a control signal output from data flow control portion 20 instructing execution of MTF correction, and loads a program for MTF correction from the ROM in data flow control portion 20 to execute MTF correction. There are two paths for the flow of pixel data, pixel data after Log conversion by MPU 22 is transmitted to MPU 23 in one flow path, while the data is transmitted to MPU 26 in the other flow path. The pixel data transmitted to MPU 23 or 26 is subjected to MTF correction and then transmitted to MPU 24.

As described above, the data processing apparatus of to the second embodiment is provided with MPU 26 which executes no processing in the initial state, and a processing being executed by an MPU determined by data flow control portion 20 as having a large load is executed in parallel by MPU 26 which usually executes no processing, so that the loads of MPUs 21 to 25 can be distributed among MPUs 21 to 26. As a result, the data processing speed of the data processing apparatus as a whole can be improved.

Third Embodiment

Figure 13:
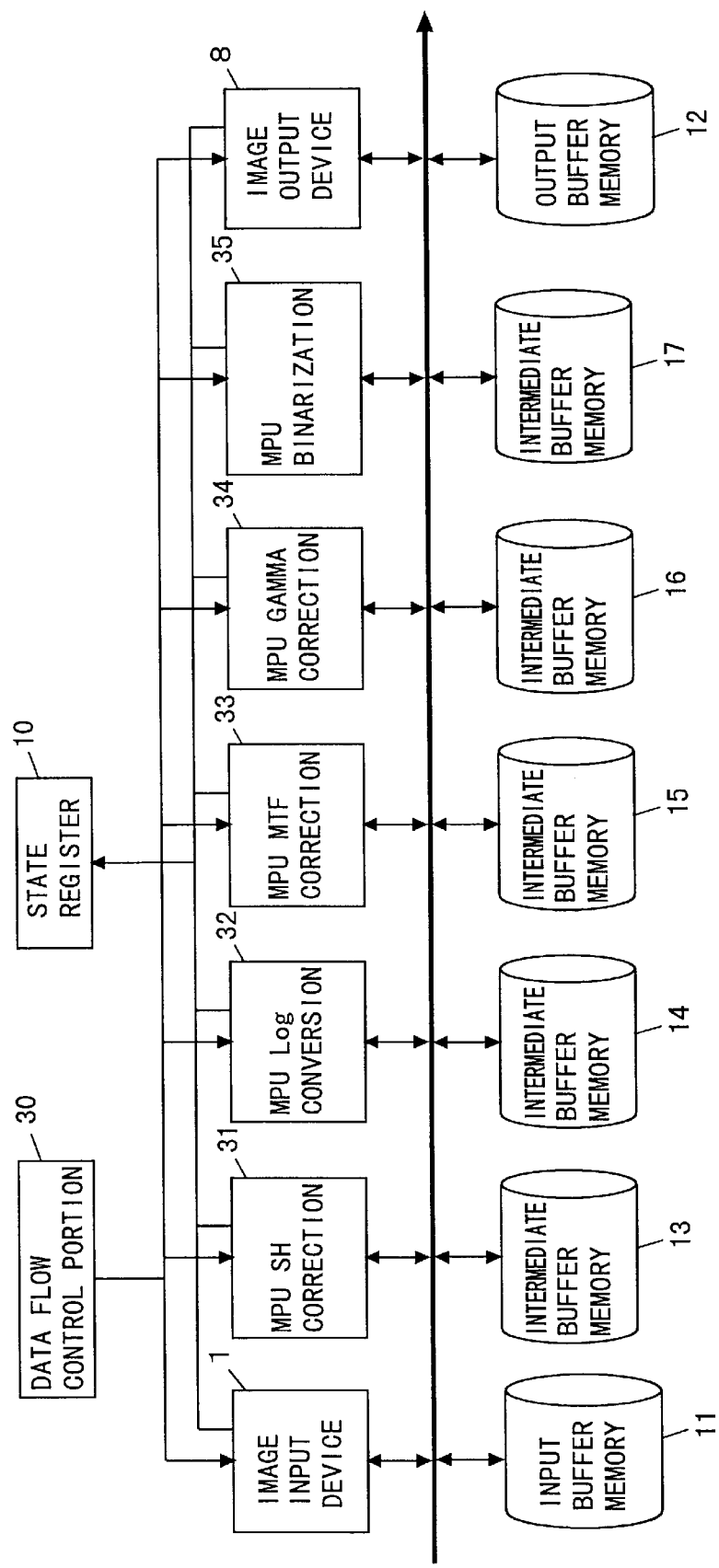
FIG. 13 is a block diagram showing the general configuration of a data processing apparatus of a third embodiment according to the present invention.

FIG. 13 is a block diagram of the general configuration of a data processing apparatus of a third embodiment according to the present invention. Referring to FIG. 13, the data processing apparatus of the third embodiment includes an image input device 1 to input image data, MPUs 31 to 35 to execute various processings to the input image data on a pixel data piece basis, an image output device 8 to output the processed image data onto a recording medium such as paper, a state register 10 to monitor the operation states of image input device 1, MPUs 31 to 35 and image output device 8, a data flow control portion 30 to control operations of MPUs 31 to 35 by referring to state register 10, an input buffer memory 11 to temporarily store image data input by image input device 1, an output buffer memory 12 to temporarily store image data output from image output device 8, and intermediate buffer memories 13 to 17 to store pixel data processed by each of MPUs 31 to 35.

The data processing apparatus of the third embodiment can temporarily store pixel data processed by MPUs 31 to 35 in corresponding intermediate buffer memories 13 to 17. In the initial state, MPU 31, MPU 32, MPU 33, MPU 34 and MPU 35 are set to execute SH correction, Log conversion, MTF correction, gamma correction, and binarization, respectively. Pixel data after SH correction is stored in intermediate buffer memory 13, pixel data after Log conversion is stored in intermediate buffer memory 14, pixel data after MTF correction is stored in intermediate buffer memory 15, pixel data after gamma correction is stored in intermediate buffer memory 16, and pixel data after binarization is stored in intermediate buffer memory 17.

Figure 14:
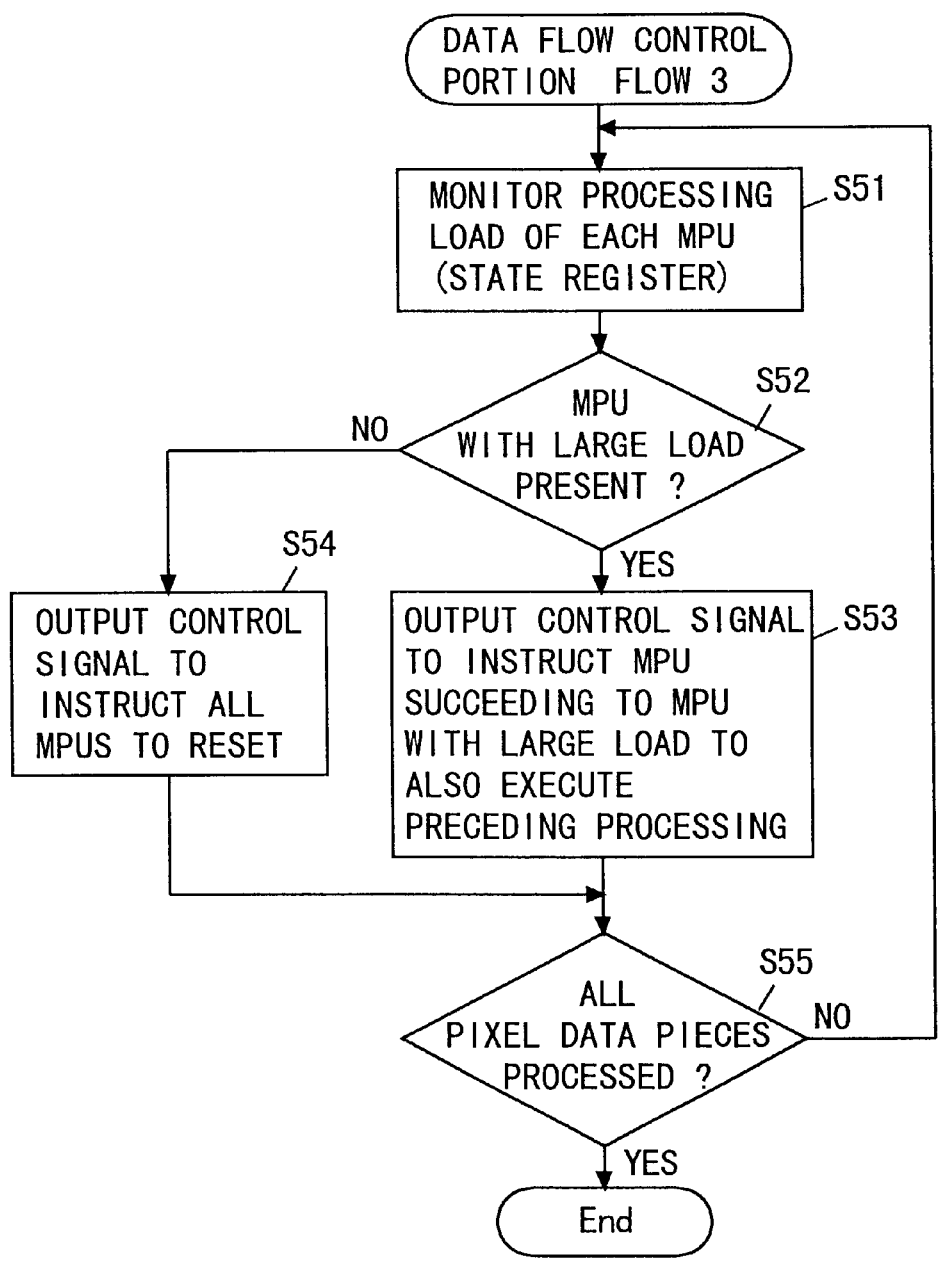
FIG. 14 is a flow chart for use in illustration the flow of processing executed by a data flow control portion according to the third embodiment.

FIG. 14 is a flow chart for use in illustration of the flow of processing executed by data flow control portion 30 according to the third embodiment. Referring to FIG. 14, data flow control portion 30 monitors the load of each of MPUs 31 to 35 based on the address value, of pixel data subjected to processings by MPUs 31 to 35 stored in state register 10 (step S51). It is determined if there is an MPU having a large load based on the obtained address value of pixel data processed by MPUs 31 to 35 (step S52).

If it is determined that there is an MPU having a large load, a control signal is output to instruct an MPU executing a succeeding processing to the processing determined as having a large load to execute the processing having the large load (step S53). Meanwhile, if it is determined that there is no MPU having a large load (NO in step S52), a control signal for resetting is output to all the MPUs (step S54).

It is then determined whether or not all the pixel data pieces have been processed (step S55), if there is pixel data yet to be processed, the above processing is repeated, and the processing is completed if all the pixel data pieces have been processed.

Figure 15:
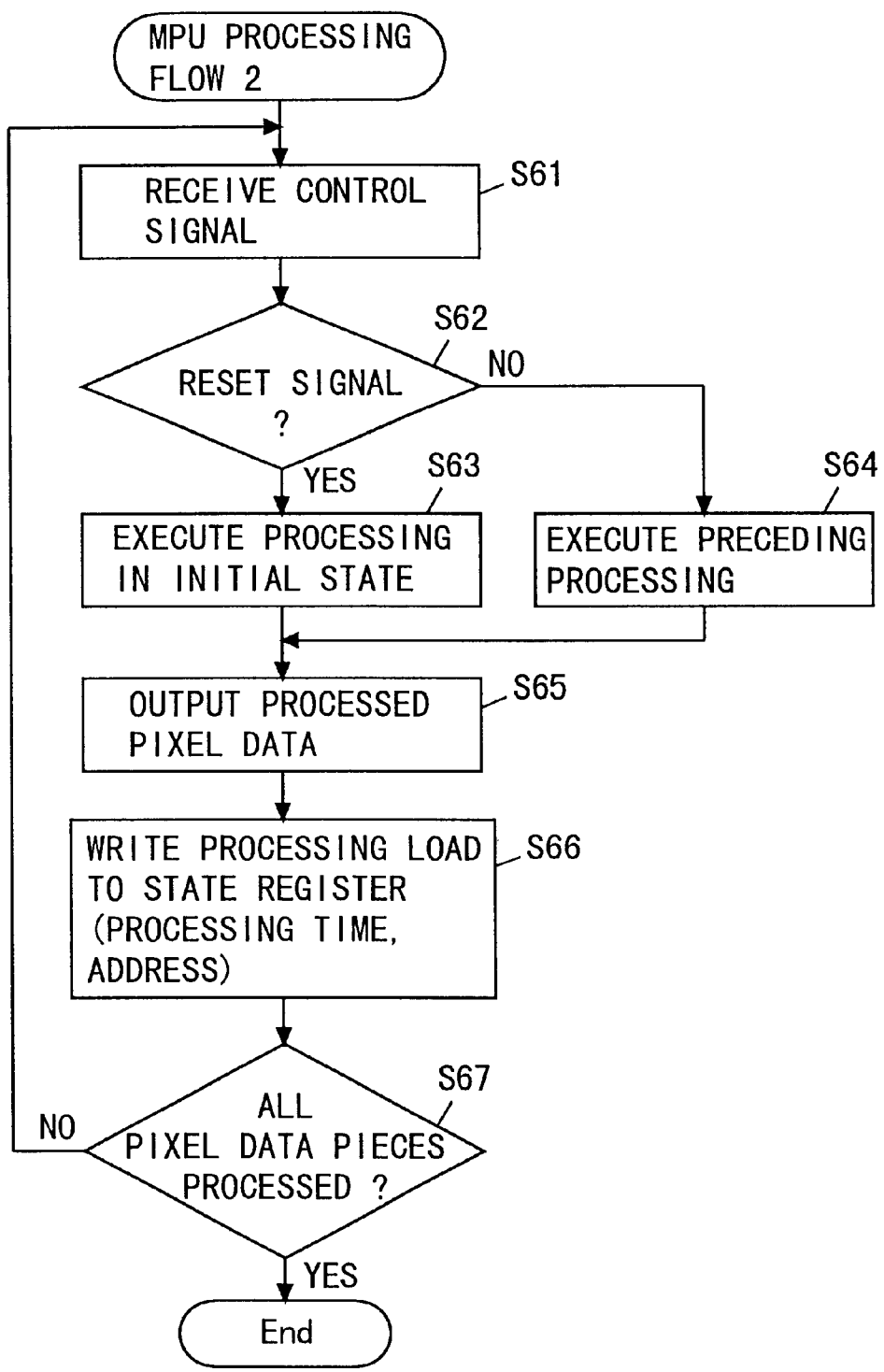
FIG. 15 is a flow chart for use in illustration of the flow of processing executed by each of MPUs according to the third embodiment.

FIG. 15 is a flow chart for use in illustration of the flow of processings executed by each of MPUs 31 to 35 according to the third embodiment. Referring to FIG. 15, MPUs 31 to 35 receive a control signal output from data flow control portion 30 (step S61). The control signal received herein is either a control signal to instruct execution of a processing determined as having a large load or a control signal for resetting.

It is then determined whether or not the control signal received in step S70 is the control signal instructing resetting (step S62). If the signal is not the control signal to instruct resetting, the signal is the control signal to instruct execution of a processing having a large load, a program for the processing having a large load is loaded from the ROM in data flow control portion 30, and the loaded program is executed (step S64).

If the received control signal is a control signal instructing resetting (YES in step S62), the processing in the initial state is executed (step S63). Herein, if a control signal instructing execution of a processing having a large load has been received while the processing is being executed, and the control signal instructing resetting is received, the execution of the processing having the large load is interrupted, and the processing in the initial state is resumed. For example, if MPU 33 executing MTF correction is determined as having a large load and the control signal is output to MPU 34 to execute MTF correction, MPU 34 stops executing gamma correction which is the processing in the initial state and executes MTF correction. Subsequently, if the load of MPU 33 decreases, data flow control portion 30 outputs a control signal to instruct resetting to MPU 34. MPU 34 receives the control signal for resetting, interrupts MTF correction and resumes gamma correction which is the processing in the initial state.

Then, processed pixel data is output (step S65). The pixel data is output to intermediate buffer memories 13 to 17. Which pixel data is to be stored by each of intermediate buffer memories 13 to 17 is determined, and if, for example, MTF correction is executed by MPU 34, pixel data after MTF correction is output to intermediate buffer memory 15.

The address of pixel data after processings by each of MPUs 31 to 35 and time required for processing the data or the processing speed are written in state register 10 (step S66). It is then determined whether or not all the pixel data pieces have been processed (step S67), and if there is pixel data yet to be processed, the above processing is repeated, and if all the pixel data pieces have been processed, the processing is completed.

Figure 16:
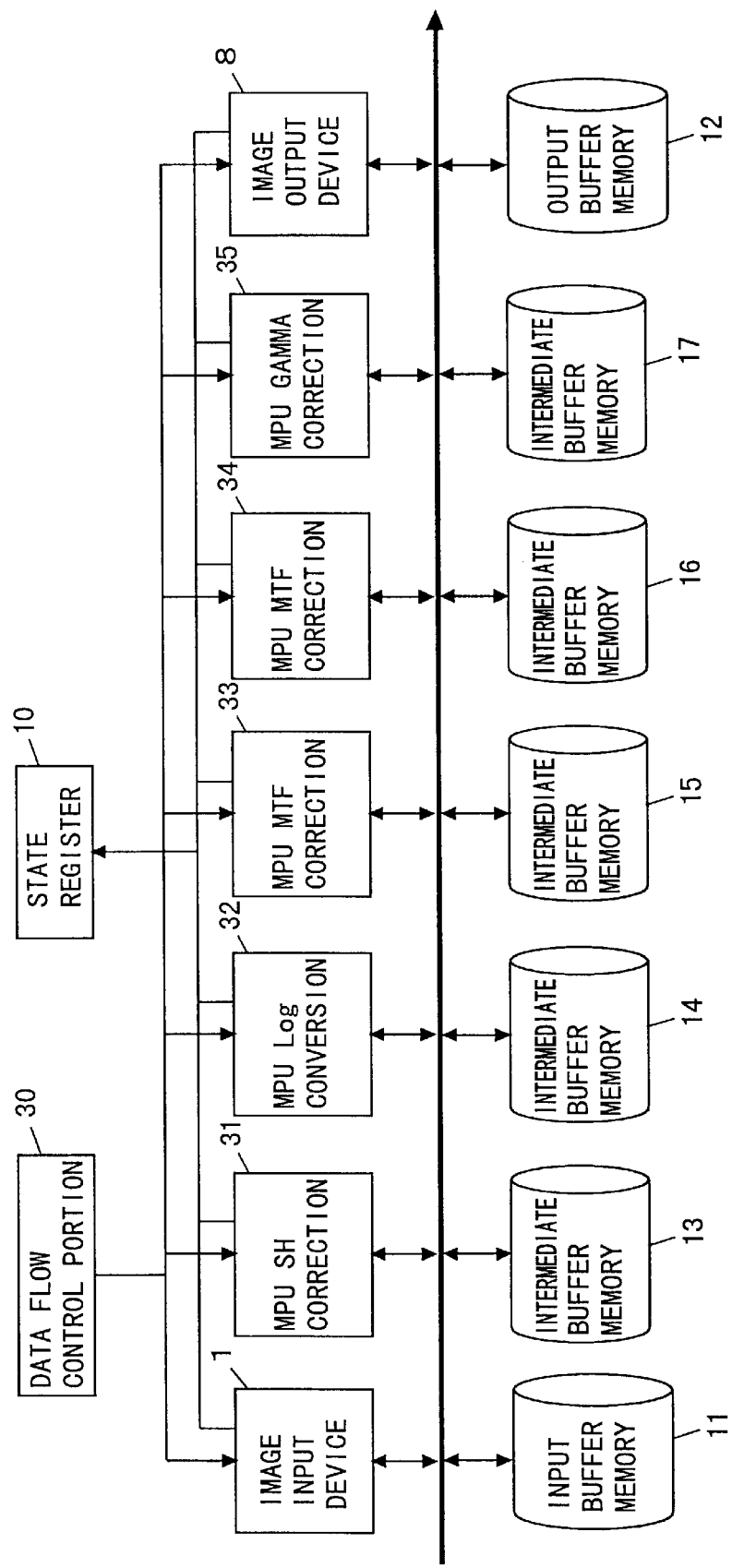
FIG. 16 is a block diagram showing the content of processing executed by each of MPUs when an MPU having a large load is detected by the data flow control portion according to the third embodiment.

FIG. 16 is a diagram showing the state of processing executed by MPUs 31 to 35 when the load of MPU 33 is determined as being large by data flow control portion 30. Referring to FIG. 16, MPU 34 receives a control signal output from data flow control portion 30 to instruct execution of a preceding processing, loads a program for MTF correction from the ROM in data flow control portion 30 and executes MTF correction. Similarly, MPU 35 receives a control signal output from data flow control portion 30 to instruct execution of a preceding processing, loads a program for gamma correction from the ROM in data flow control portion 30 and executes gamma correction. At this time, MPU 34 reads the pixel data after Log conversion from intermediate buffer memory 14, executes MTF correction and writes the pixel data after the MTF correction in intermediate buffer memory 15. MPU 35 reads the pixel data after the MTF correction from intermediate buffer memory 15, executes gamma correction and writes the pixel data after the gamma correction in intermediate buffer memory 16.

As described above, in the data processing apparatus of the third embodiment, MPUs 31 to 35 are provided with intermediate buffer memories 13 to 17 for storing pixel data after processings. If it is determined by data flow control portion 30 that there is an MPU having a large load, an MPU executing a processing succeeding to the processing with large load executes the preceding processing or the processing with large load, a more preceding processing can be completed faster, and therefore the data processing speed of the data processing apparatus as a whole can be improved. Since a more preceding processing can be completed faster, new image data, image data in the next page for example can be input faster.

Furthermore, since intermediate buffer memories 13 to 17 to store results of processings by the MPUs are provided, the difference in the processing speeds of processings among MPUs 31 to 35 executing processings asynchronously can be absorbed. If the content of a processing by each of MPUs 31 to 35 changes, the kind of pixel data stored in each of intermediate buffer memories 13 to 17 is not changed, and therefore the contents of processings executed by MPUs 31 to 35 can be easily changed.

Fourth Embodiment

Figure 17:
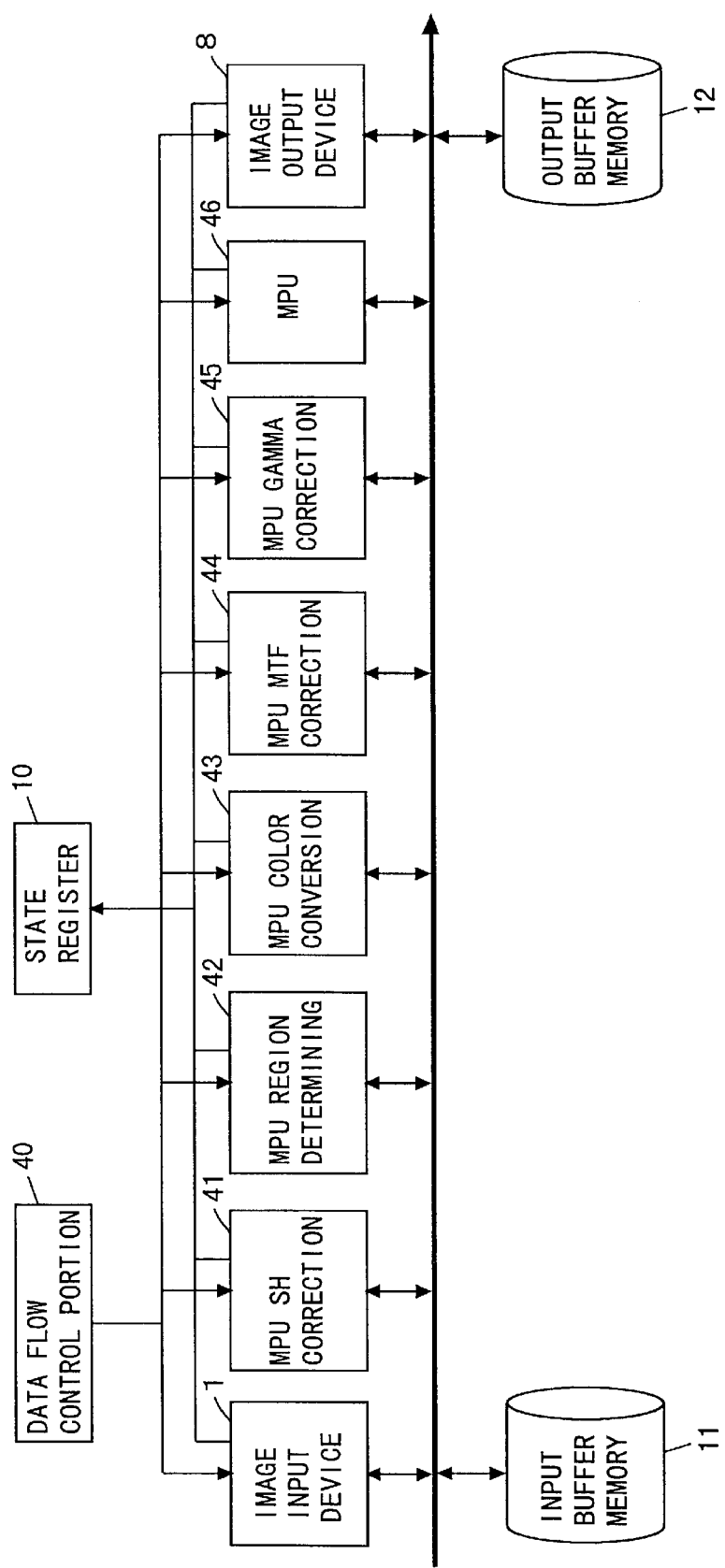
FIG. 17 is a block diagram showing the general configuration of a data processing apparatus of a fourth embodiment according to the present invention.

FIG. 17 is a block diagram showing the general configuration of a data processing apparatus of a fourth embodiment according to the present invention. Referring to FIG. 17, the data processing apparatus according to the fourth embodiment includes an image input device 1 to input image data, MPUs 41 to 46 to execute various processings to the input image data on a pixel data piece basis, an image output device 8 to output the processed image data onto a recording medium such as paper, a state register 10 to monitor the operation states of image input device 1, MPUs 41 to 46 and image output device 8, a data flow control portion 40 to control operations of MPUs 41 to 46 by referring to state register 10, an input buffer memory 11 to temporarily store image data input by image input device 1, and an output buffer memory 12 to temporarily store image data output from image output device 8.

MPUs 41 to 45 execute SH correction, region determining, color conversion, MTF correction and gamma correction, respectively in the initial state. MPU 46 executes no processing in the initial state.

In the data processing apparatus of the fourth embodiment, a processing being executed by an MPU determined by data flow control portion 40 as having a large load among MPUs 41 to 45 is executed in parallel by MPU 46. Note that the data processing apparatus of the fourth embodiment is different from the data processing apparatuses of the previously described embodiments in that color image data is processed, and region determining processing is added to the processings executed to pixel data.

The region determining processing is a processing to determine the attribute of a prescribed region by executing a prescribed processing to a plurality of pixel data pieces included in the prescribed region including the image data to be processed. The attribute of a prescribed region refers to for example a character region, line drawing region, background region or the like. In the region determining processing, using a 3×3 matrix, for example, pixel data pieces present in the matrix are compared for determination according to a known method.

By the region determining processing, time required for a succeeding processing such as MTF correction to be executed to the attribute-determined pixel data changes. For example, if the attribute of pixel data is determined as character or line drawing, time required for MTF correction is longer than time required for MTF correction to data determined as being background. As a result, the load of an MPU executing the MTF correction increases. Therefore, the loads of MPUs executing succeeding processings (Log conversion, MTF correction, gamma correction and binarization) can be estimated depending upon the result of region determining processing.

The data processing apparatus of the fourth embodiment changes processings executed by MPUs 41 to 46 depending upon the attribute of pixel data determined by the region determining processing.

Figure 18:
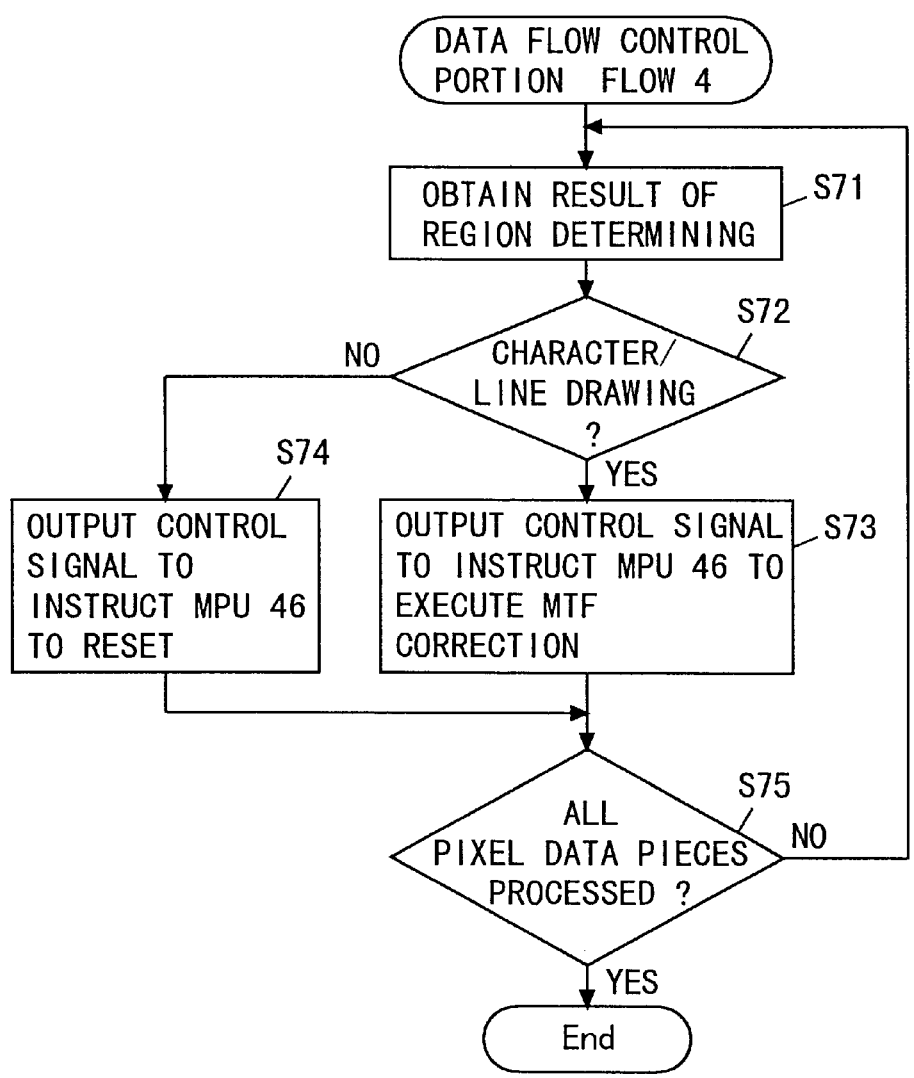
FIG. 18 is a flow chart for use in illustration of the flow of processing executed by a data flow control portion according to the fourth embodiment.

FIG. 18 is a flow chart for use in illustration of processing executed by data flow control portion 40 according to the fourth embodiment. Referring to FIG. 18, data flow control portion 40 obtains a result of region determining processing executed by MPU 42 (step S71). Based on the obtained result of region determining processing to pixel data, it is determined whether the pixel data has a character attribute or a line drawing attribute (step S72). If it is determined that the data has a character attribute or a line drawing attribute, a control signal to instruct MPU 46 to execute MTF correction is output (step S73). Meanwhile, if it is not determined that the data has a character attribute or a line drawing attribute (NO in step S72), a control signal for resetting is output to MPU 46 (step S74). Then, it is determined if all the pixel data pieces have been processed (step S75), and if there is pixel data yet to be processed, the above described processing is repeated, and the processing is completed if all the pixel data pieces have been processed.

Figure 19:
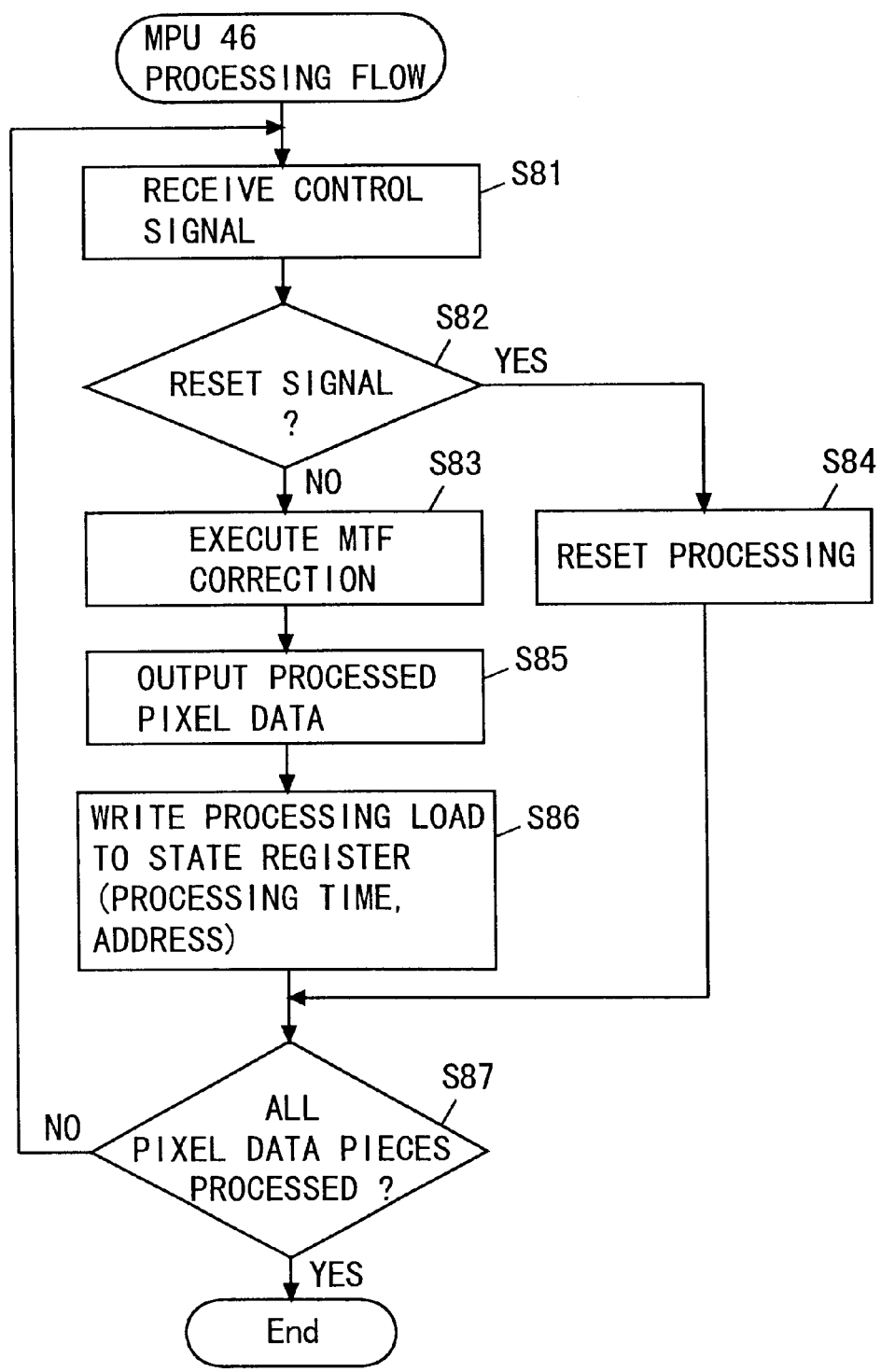
FIG. 19 is a flow chart for use in illustration of the flow of processing executed by an MPU which executes no processing in an initial state according to the fourth embodiment.

FIG. 19 is a flow chart for use in illustration the flow of processing executed by MPU 46 according to the fourth embodiment. Referring to FIG. 19, MPU 46 receives a control signal output from data flow control portion 40 (step S81). The control signal received here is either a control signal instructing execution of MTF correction or a control signal instructing resetting.

It is then determined whether or not the received control signal is a reset signal (step S82), if the received control signal is a reset signal, a reset processing for execution of no processing is performed (step S84), and the control proceeds to step S87.

Meanwhile, if the received control signal is determined as not being a reset signal, in other words, if a control signal instructing execution of a processing having a large load is received (NO in step S82), a program for MTF correction is loaded from the ROM in data flow control portion 40, and the processing is executed (step S83) and the processed pixel data is output (step S85). In this case, the pixel data is transmitted to MPU 45 executing a processing succeeding to MTF correction. Then, the address of the pixel data after the processing at MPU 46 and the time or processing speed required for the processing of the pixel data are written into state register 10 (step S86).

It is then determined whether or not all the pixel data pieces have been processed (step S87), and if there is pixel data yet to be processed, the above processing is repeated, while if all the pixel data pieces have been processed, the processing is completed.

Figure 20:
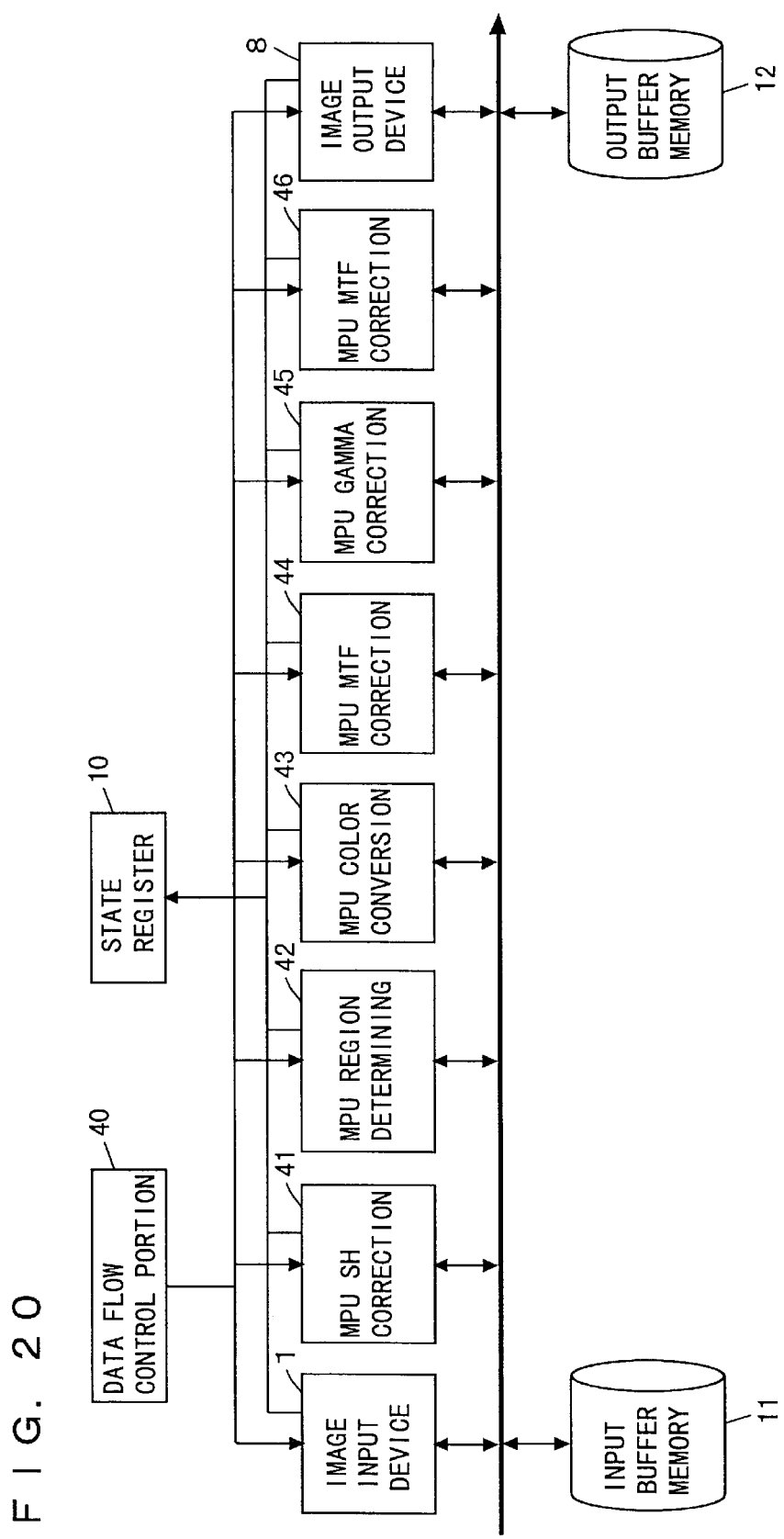
FIG. 20 is a block diagram showing processing executed by each of MPUs when the attribute of pixel data to be processed is determined as a character attribute or a line drawing attribute by an MPU executing a region determining processing according to the fourth embodiment.

FIG. 20 is a diagram showing a processing executed by MPU 46 if pixel data to be processed is determined as having a character attribute or a line drawing attribute by MPU 42 executing a region determining processing. Referring to FIG. 20, MPU 46 receives a control signal to instruct execution of MTF correction output from data flow control portion 40 and executes MTF correction. There are two flow paths for pixel data in this case, pixel data after color conversion at MPU 43 is transmitted to MPU 44 in one path and pixel data transmitted to MPU 46 in the other path. The pixel data transmitted to MPU 44 or 46 is subjected to MTF correction and then transmitted to MPU 45 executing gamma correction.

Note that if the pixel data is determined as having a character or line drawing attribute by region determining processing, pixel data pieces around the pixel data usually have the same attribute. As a result, a processing executed by each of MPUs 41 to 46 shown in FIG. 20 continues as long as pixel data to be processed is determined as having a character or line drawing attribute by MPU 42 executing region determining processing. If pixel data is determined as not having a character or line drawing attribute, MPUs 41 to 46 execute the processing in the initial state. More specifically, MPU 46 will execute no processing.

As described above, in the data processing apparatus according to the fourth embodiment, if pixel data is determined as having a character or line drawing attribute by MPU 42 executing a region determining processing, MPU 46 which executes no processing in the initial state executes MTF correction expected to have a large load, the loads of MPUs 41 to 45 may be distributed among MPUs 41 to 46. As result, processings executed by MPUs 41 to 46 can be, dynamically changed depending upon the attribute of data input to the data processing apparatus, so that data may be processed at a high speed.

Fifth Embodiment

Figure 21:
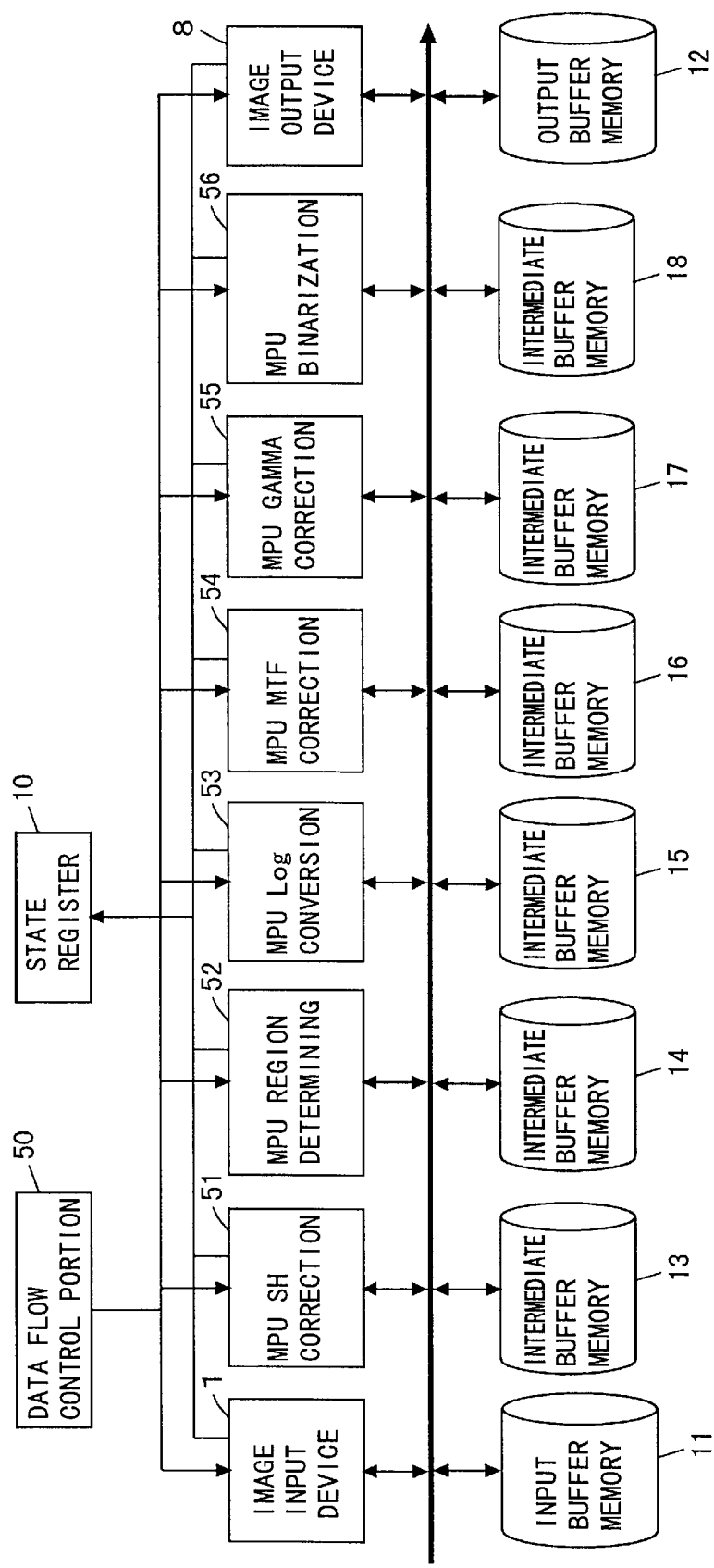
FIG. 21 is a block diagram showing the general configuration of a data processing apparatus of a fifth embodiment according to the present invention.

FIG. 21 is a block diagram showing the general configuration of a data processing apparatus of a fifth embodiment according to the present invention. Referring to FIG. 21, the data processing apparatus of the fifth embodiment includes an image input device 1 to input image data, MPUs 51 to 56 to execute various processings to the input image data on a pixel data piece basis, an image output device 8 to output the processed image data onto a recording medium such as paper, a state register 10 to monitor the operation states of image input device 1, MPUs 51 to 56 and image output device 8, a data flow control portion 50 to control operations of MPUs 51 to 56 by referring to state register 10, an input buffer memory 11 to temporarily store image data input by image input device 1, an output buffer memory 12 to temporarily store image data output from image output device 8 and intermediate buffer memories 13 to 18 to store pixel data processed by MPUs 51 to 56.

In the data processing apparatus of the fifth embodiment, pixel data processed by MPUs 51 to 56 can be temporarily stored in corresponding intermediate buffer memories 13 to 18. In the initial state, MPUs 51 to 56 are set to execute SH correction, region determining, Log conversion, MTF correction, gamma correction and binarization, respectively.

Pixel data after SH correction is stored in intermediate buffer memory 13, pixel data after region determining is stored in intermediate buffer memory 14, pixel data after Log conversion is stored in intermediate buffer memory 15, pixel data after MTF correction is stored in intermediate buffer memory 16, pixel data after gamma correction is stored in intermediate buffer memory 17, and pixel data after binarization is stored in intermediate buffer memory 18.

Since the region determining processing has been described in conjunction with the fourth embodiment, the description is not repeated here. In the data processing apparatus of the fifth embodiment, the loads of MPUs executing processings succeeding to region determining processing (Log conversion, MTF correction, gamma correction and binarization) are estimated based on a result of region determining processing in order to dynamically change processings executed by MPUs 51 to 56.

Figure 22:
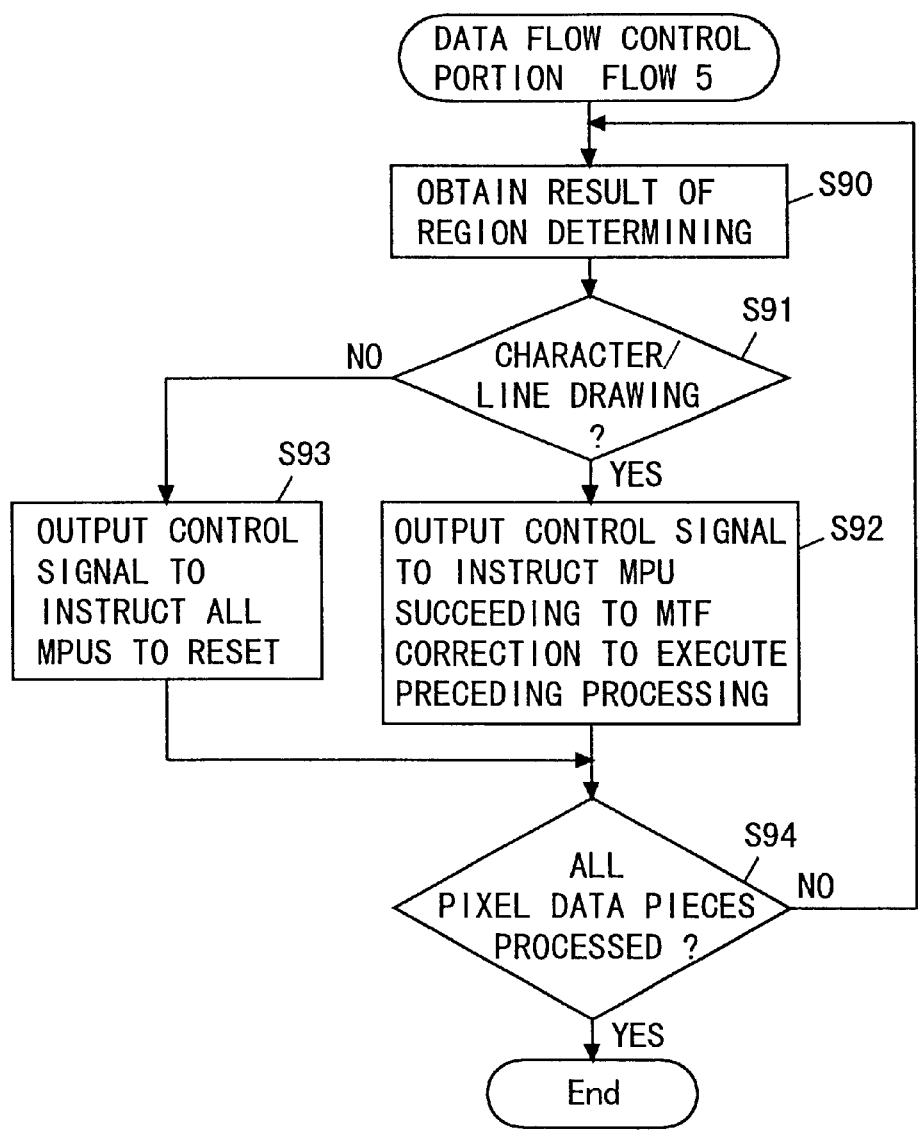
FIG. 22 is a flow chart showing the flow of processing executed by a data flow control portion according to the fifth embodiment.

FIG. 22 is a flow chart for use in illustration of the flow of processing executed by data flow control portion 50 according to the fifth embodiment. Referring to FIG. 22, data flow control portion 50 obtains a result of region determining processing executed by MPU 52 (step S90). Based on the result of region determining obtained in step S90, it is determined whether or not the processed pixel data has a character or line drawing attribute (step S91). If the pixel data is determined as having a character or line drawing attribute (YES in step S91), control signals to instruct MPUs 55 and 56 executing a processing succeeding to MTF correction (gamma correction, binarization) to execute the preceding processing is output. More specifically, a control signal to instruct execution of MTF correction preceding to gamma correction is output to MPU 55 executing gamma correction, while a control signal to instruct execution of gamma correction preceding to binarization is output to MPU 56 executing binarization.

Meanwhile, if it is not determined that pixel data has a character or line drawing attribute (NO in step S91), a control signal to instruct resetting is output to MPUs 55 and 56 (step S93).

It is then determined if all the pixel data pieces have been processed (step S94), and if there is pixel data yet to be processed, the above processing is repeated, while if all the pixel data pieces have been processed, the processing is completed.

Figure 23:
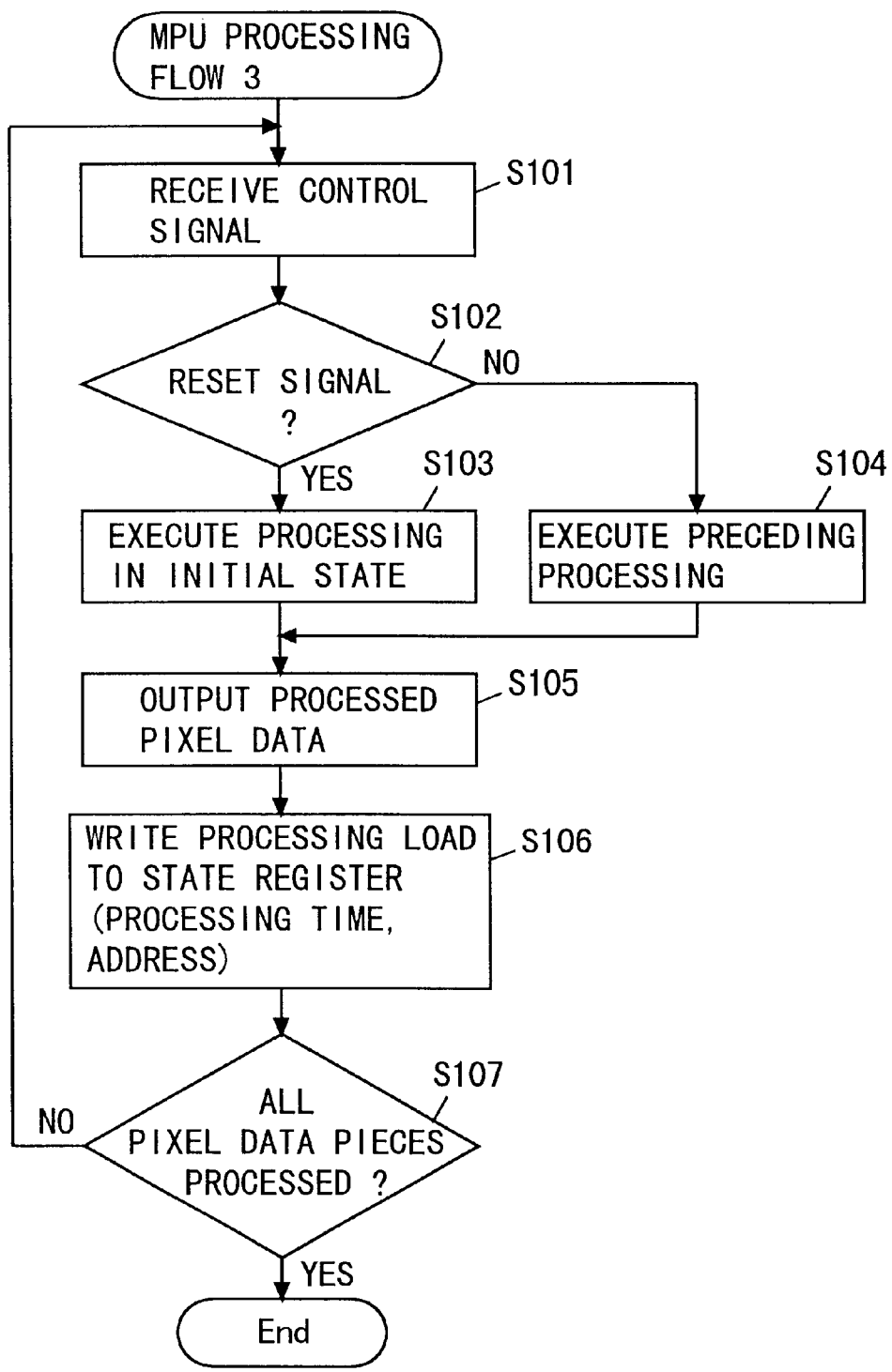
FIG. 23 is a flow chart for use in illustration of the flow of processing executed by MPUs according to the fifth embodiment.

FIG. 23 is a flow chart for use in illustration of the flow of processing executed by each of MPUs 51 to 56 according to the fifth embodiment. Referring to FIG. 23, MPUs 55 and 56 receive a control signal output from data flow control portion 50 (step S101). The control signal received here is either a control signal to instruct execution of a preceding processing or a control signal to instruct resetting.

If the received control signal is not a control signal instructing resetting (NO in step S102), the received control signal is a control signal to instruct execution of a preceding processing, MPUs 55 and 56 load a program for a preceding processing from the ROM in data flow control portion 50 and execute the preceding processing (step S104). MPU 55 loads a program for MTF correction while MPU 56 loads a program for gamma correction. Meanwhile, if the received control signal is a control signal to instruct resetting (YES in step S102), a resetting processing to execute processings in the initial state is executed (step S103).

When the processing is completed, processed pixel data is output (step S106). MPUs 55 and 56 write pixel data in intermediate buffer memory 16 during execution of MTF correction, in intermediate buffer memory 17 during execution of gamma correction, and in intermediate buffer memory 18 during execution of binarization.

The address of pixel data after the processings by MPUs 55 and 56 and time required for processing the pixel data or the processing speed are written in state register 10 (step S106). It is then determined whether or not all the pixel data pieces have been processed (step S107), and if there is pixel data yet to be processed, the above processing is repeated, while if all the pixel data pieces have been processed, the processing is completed.

In the data processing apparatus of this embodiment, programs for processings in the initial state are loaded in MPUs 51 to 56, and processing is executed on a pixel data piece basis. Regarding MPUs 55 and 56, programs for the processings in the initial state are initially loaded from the ROM in data flow control portion 50 and executed, while if a control signal to instruct execution of a preceding processing is received from data flow control portion 50, a program for the preceding processing is loaded from the ROM in data flow control portion 50, and the program is executed.

Figure 24:
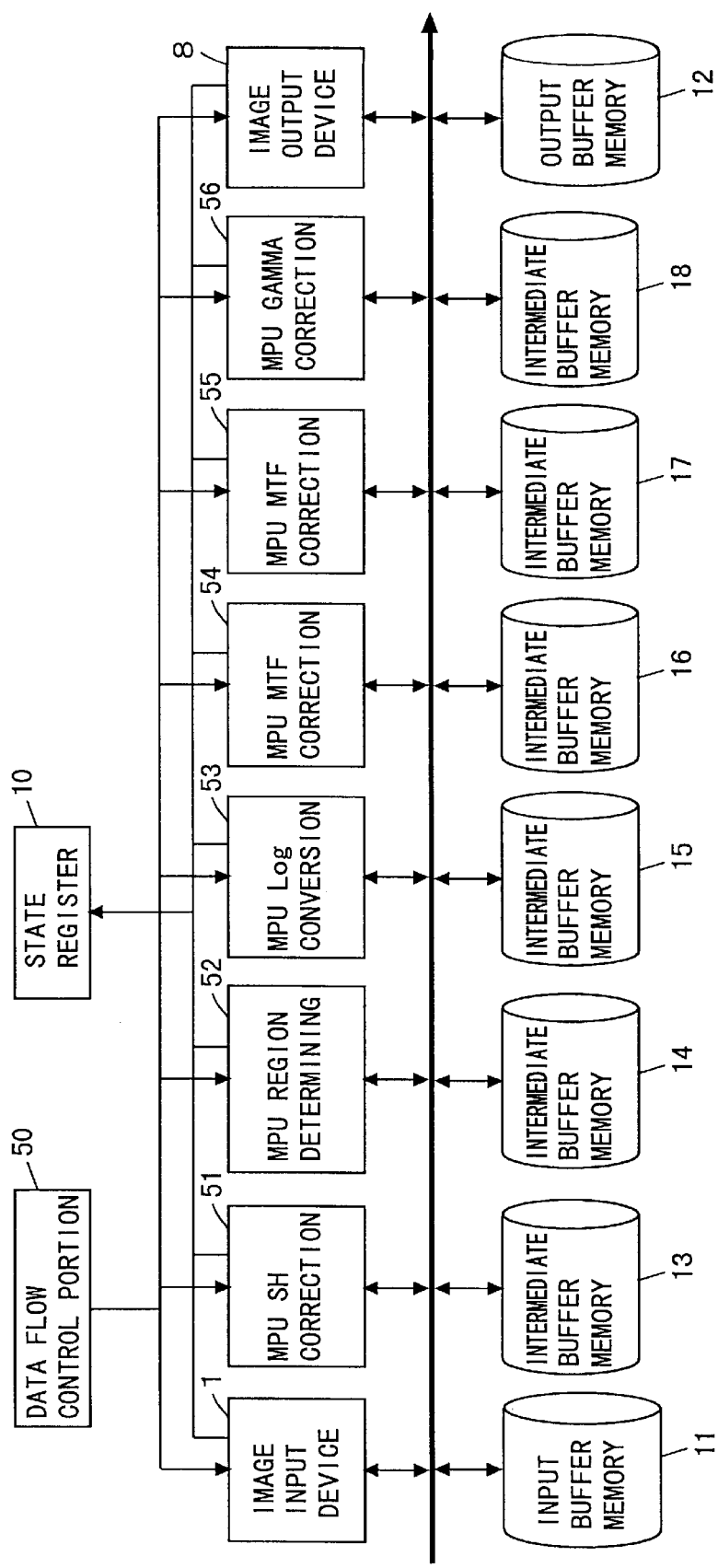
FIG. 24 is a block diagram showing processing executed by each of MPUs when the attribute of pixel data is determined as a character attribute or a line drawing attribute by an MPU executing a region determining processing.

FIG. 24 is a diagram showing processings executed by MPUs 51 to 56 if pixel data is determined as having a character or line drawing attribute by data flow control portion 50 based on the result of processing in MPU 52. Referring to FIG. 24, MTF correction is executed by MPU 55, and gamma correction is executed by MPU 56. At this time, in MPU 55, pixel data to be processed is read out from intermediate buffer memory 15, and data after MTF correction is written in intermediate buffer memory 16. In MPU 56, pixel data to be processed is read out from intermediate buffer memory 16, and pixel data after gamma correction is written in intermediate buffer memory 17.

Thus, in the data processing apparatus of the fifth embodiment, it is determined whether or not pixel data has a character or line drawing attribute by MPU 52 executing region determining processing, and a result of determination is transmitted to data flow control portion 50. Data flow control portion 50 outputs control signals to instruct MPU 55 to execute MTF correction and MPU 56 to execute gamma correction if it is determined that the pixel data has a character or line drawing attribute based on the result of determination transmitted from MPU 52. If it is determined that the pixel data does not have a character or line drawing attribute, a signal to instruct resetting is output to MPUs 55 and 56, gamma correction is executed by MPU 55 and binarization is executed by MPU 56.

As described above, in the data processing apparatus of the fifth embodiment, the loads of MPUs executing succeeding processings are estimated by determining the attribute of pixel data to be processed and processings executed by MPUs are dynamically changed depending upon the estimated loads, so that the data processing speed of the data processing apparatus as a whole may be improved.

Since intermediate buffer memories 13 to 18 to store a result of processing executed by each of MPUs are provided, the difference in the processing speeds among MPUs 51 to 56 asynchronously executing processings can be absorbed. If the contents of processings executed by MPUs 51 to 56 are changed, the kind of pixel data stored in each of intermediate buffer memories 13 to 18 is not changed, and therefore the contents of processings executed by MPUs 51 to 56 may be readily changed.

Sixth Embodiment

Figure 25:
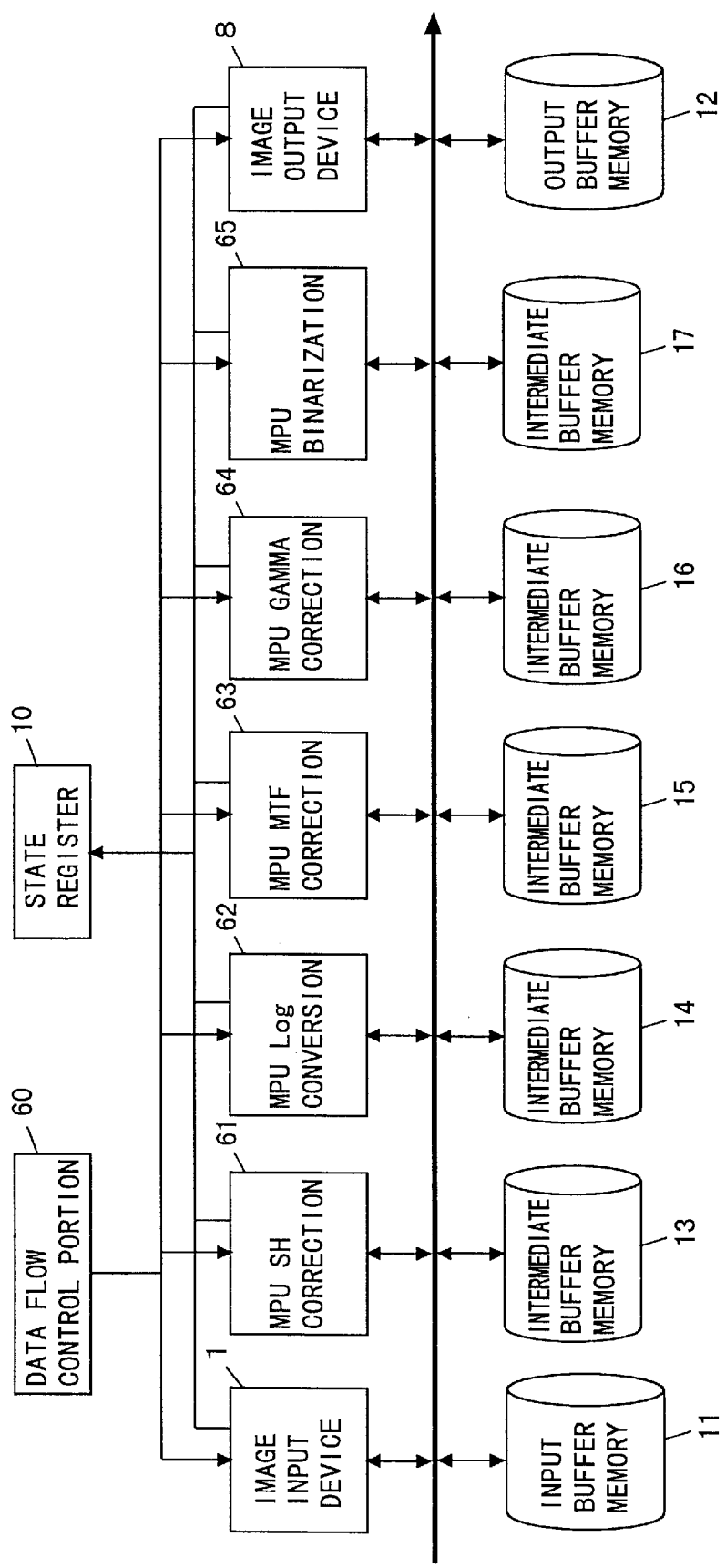
FIG. 25 is a block diagram showing the general configuration of a data processing apparatus of a sixth embodiment according to the present invention.

FIG. 25 is a block diagram showing the general configuration of a data processing apparatus of a sixth embodiment according to the present invention. Referring to FIG. 25, the data processing apparatus of the sixth embodiment includes an image input device 1 to input image data, MPUs 61 to 65 to execute various processings to the input image data on a pixel data piece basis, an image output device 8 to output the processed image data onto a recording medium such as paper, a state register 10 to monitor the operation states of image input device 1, MPUs 61 to 65 and image output device 8, a data flow control portion 60 to control operations of MPUs 61 to 65 by referring to state register 10, an input buffer memory 11 to temporarily store image data input by image input device 1, and an output buffer memory 12 to temporarily store image data output from image output device 8 and intermediate buffer memories 13 to 17 to store pixel data processed by MPUs 61 to 65.

In the data processing apparatus of the sixth embodiment, pixel data processed by MPUs 61 to 65 can be temporarily stored in corresponding intermediate buffer memories 13 to 17. In the initial state, MPUs 61 to 65 are set to execute SH correction, Log conversion, MTF correction, gamma correction and binarization, respectively.

Pixel data after SH correction is stored in intermediate buffer memory 13, pixel data after Log conversion is stored in intermediate buffer memory 14, pixel data after MTF correction is stored in intermediate buffer memory 15, pixel data after gamma correction is stored in intermediate buffer memory 16, and pixel data after binarization is stored in intermediate buffer memory 17.

Figure 26:
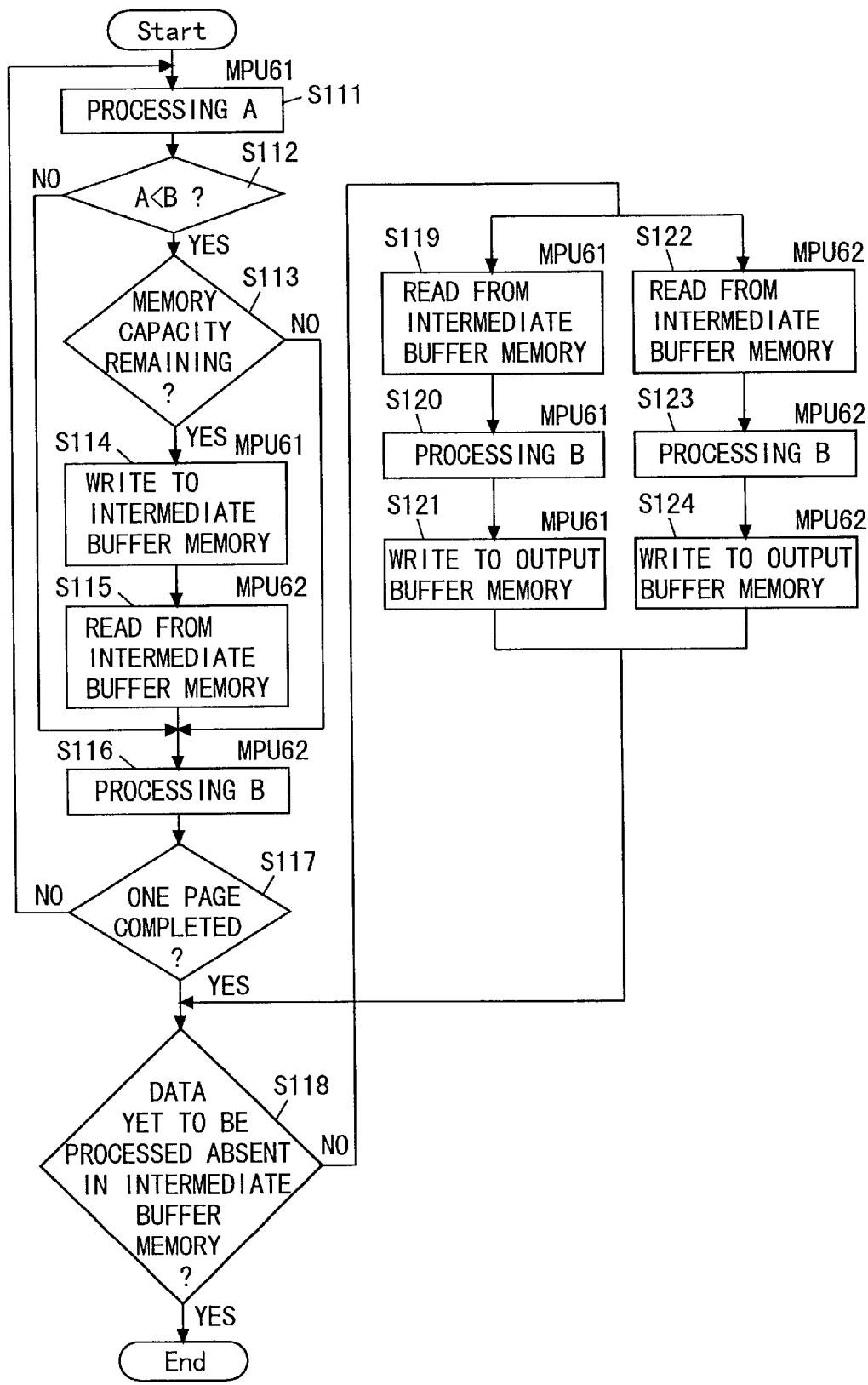
FIG. 26 is a flow chart for use in illustration of processing executed by MPUs and giving over of data according to the sixth embodiment.

FIG. 26 is a flow chart for use in illustration the flow of processings executed by MPUs 61 to 65 according to the sixth embodiment. For ease of illustration, the processings by MPUs 61 and 62 which exchange data with one anther are described at the same time. MPUs 61 and 62 actually execute processings asynchronously.

Referring to FIG. 26, MPU 61 executes SH correction processing A) on a pixel data piece basis (step S111). At this time, in data flow control portion 60, the loads of MPUs 61 and 62 are monitored, and the load of SH correction executed by MPU 61 and the load of Log conversion (processing B) executed by MPU 62 are compared (step S112). If the load of SH conversion is smaller than the load of Log conversion, it is determined whether or not there is a storage capacity remaining in intermediate buffer memory 13 (step S113). If there is still a storage capacity in intermediate buffer memory 13 (YES in step S113), pixel data after SH correction executed by MPU 61 is written in intermediate buffer memory 13 (step S114). The pixel data stored in intermediate buffer memory 13 is read by MPU 62 executing the next processing, Log conversion (step S115), and Log conversion is executed by MPU 62 (step S116).

Meanwhile, if the load of SH correction is not smaller than the load of Log conversion (NO in step S112), pixel data after SH correction executed by MPU 61 is directly transferred to MPU 62, and the Log conversion is performed by MPU 62 (step S116).

It is then determined if all the pixel data pieces for one page have been processed (step S117), if there is pixel data yet to be processed, the above processing is repeated, and if all the pixel data pieces have been processed, it is determined if pixel data after SH correction executed by MPU 61 has been stored in intermediate buffer memory 13 (step S118). If the pixel data after SH correction is stored in intermediate buffer memory 13 (NO in step S118), data flow control portion 60 outputs a control signal to instruct MPU 61 to execute Log conversion, and MPU 61 responds to reception of the control signal to load a program for Log conversion from the ROM in data flow control portion 60 and executes the Log conversion (steps S119 and S120). At this time, the same Log conversion processing is executed in MPUs 61 and 62 in parallel.

MPU 61 reads out pixel data from intermediate buffer memory 13 (step S119) and executes Log conversion to the data (step S120), and then pixel data after the Log conversion is stored in intermediate buffer memory 14 (step S121).

In parallel to the Log conversion executed by MPU 61, pixel data is read out from intermediate buffer memory 13 by MPU 62 (step S122), and subjected to Log conversion (step S123), and the pixel data after the Log conversion is written into intermediate buffer memory 14 (step S124).

Thus, the same Log conversion processing is executed in parallel by MPUs 61 and 62, and the parallel processing continues until there is no longer pixel data stored in intermediate buffer memory 13.

Figure 27:
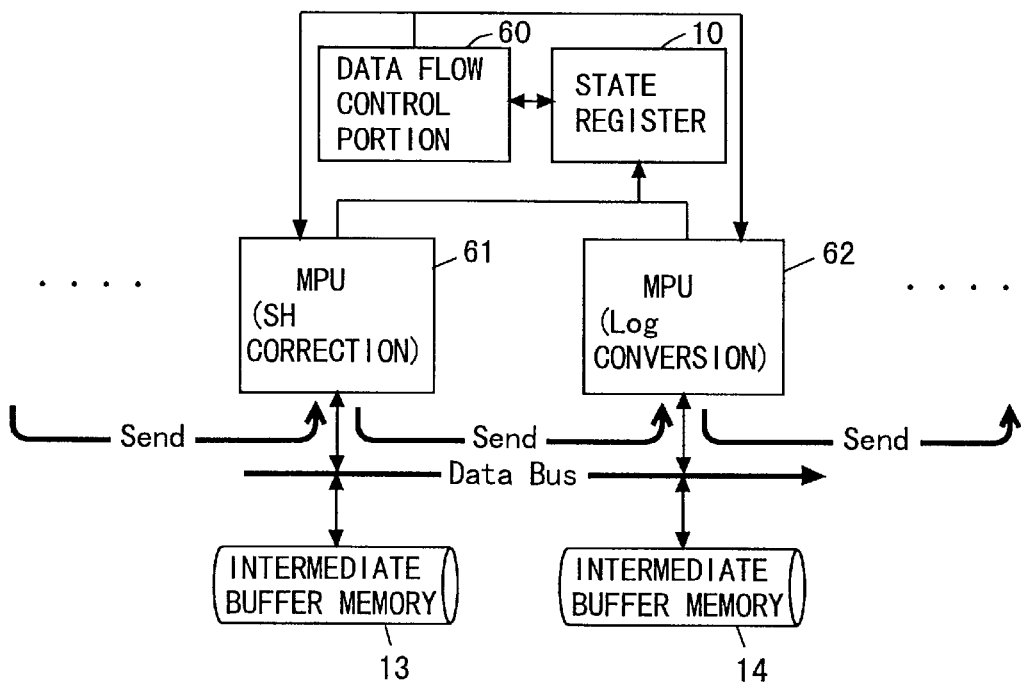
FIG. 27 is a block diagram for use in illustration of transmission of data when the load of a preceding MPU is equal to or greater than the load of a succeeding MPU according to the sixth embodiment.

FIG. 27 is a diagram for use in illustration of transmission of data between MPUs 61 and 62 when the load of MPU 61 is equal to or larger than the load of MPU 62. Referring to FIG. 27, pixel data after SH correction by MPU 61 is directly transmitted to MPU 62 without being stored in intermediate buffer memory 13. This is because MPU 62 has been waiting after completion of a processing when processing to one pixel data piece by MPU 61 is completed, since MPU 61 has a larger load.

Figure 28:
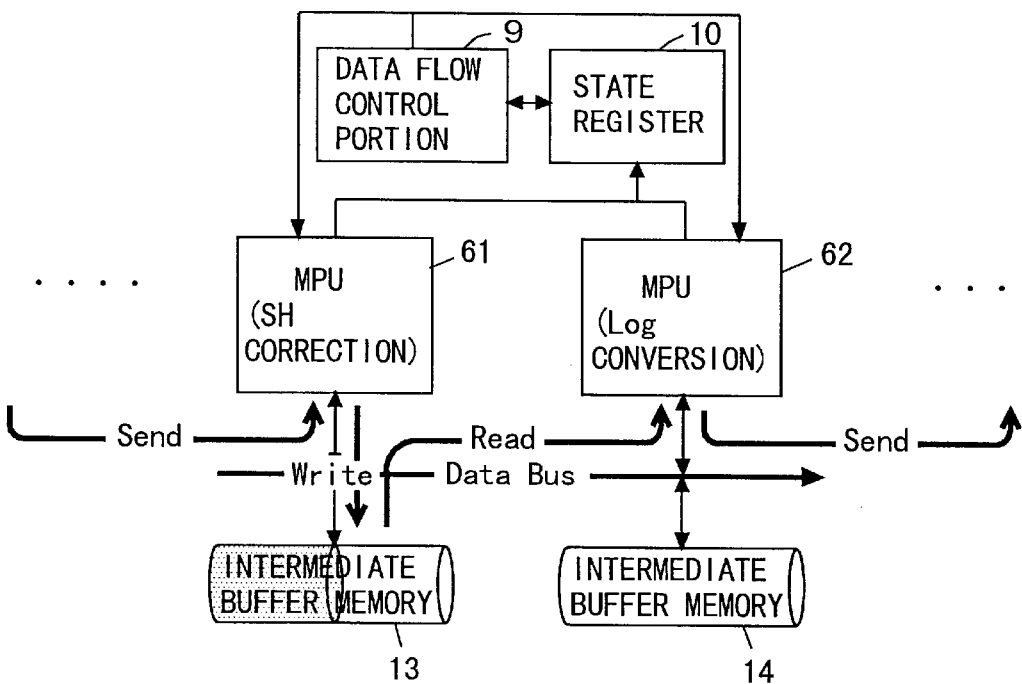
FIG. 28 is a block diagram for use in illustration of transmission of data when the load of a preceding MPU is smaller than the load of a succeeding MPU according to the sixth embodiment.

FIG. 28 is a diagram for use in illustration of transmission of data between MPUs 61 and 62 when the load of MPU 61 is smaller than the load of MPU 62. Referring to FIG. 28, pixel data after SH correction by MPU 61 is stored in intermediate buffer memory 13 without being directly transmitted to MPU 62. Thus, MPU 61 executing SH correction with a smaller load can execute the SH correction without taking synchronism with the processing by MPU 62.

FIG. 29 is a diagram showing processings executed by MPUs 61 and 62 and the flow of data when SH correction is completed in MPU 61 and pixel data after SH correction is stored in intermediate buffer memory 13. Referring to FIG. 29, as described above, when SH correction is completed in MPU 61, and pixel data after the SH correction is stored in intermediate buffer memory 13, the same Log conversion processing is executed in parallel at MPUs 61 and 62. In MPU 61, data is read out from intermediate buffer memory 13, Log conversion is executed and pixel data subjected to Log conversion is written into intermediate buffer memory 14. In MPU 62, data is read out from intermediate buffer memory 13, and after Log conversion, data after the processing is transmitted to the next MPU.

As described above, the data processing apparatus of the sixth embodiment, intermediate buffer memories 13 to 17 to store pixel data after processings are provided for MPUs 61 to 65, and if the load of an MPU executing a succeeding processing is larger, pixel data after the processing is not directly transmitted to the succeeding processing, but stored in intermediate buffer memory 13 to 17. If a preceding processing has been executed to all the pixel data pieces and there is still pixel data in intermediate buffer memories 13 to 17, pixel data stored in intermediate buffer memories 13 to 17 are subjected to a succeeding processing in parallel using two MPUs so that a more preceding processing can be completed faster, and the data processing speed of the data processing apparatus as a whole may be improved. Since a more preceding processing may be completed faster, new image data such as image data in the next page can be input faster.

Furthermore, since intermediate buffer memories 13 to 17 to store a result of a processing by each of the MPUs are provided, the difference in the processing speeds among MPUs 61 to 65 executing processings asynchronously may be absorbed. If there is change in the contents of processings executed by MPUs 61 to 65, the kind of pixel data stored in intermediate buffer memories 13 to 17 is not changed, so that the contents of processings executed by MPUs 61 to 65 can be easily changed.

Note that the above described MPUs may be replaced with a plurality of devices. Regarding the processings executed by the above described data flow control portion, state register and each of MPUs, the procedure shown in FIGS. 3, 10, 14, 18 and 22 for the data flow control portion, and the procedure shown in FIGS. 6, 11, 15, 19, 23 and 26 for the MPUs may be described in programs to allow a computer to execute these procedures. If the processings executed by the data flow control portion, state register, and each of MPUs are described in programs, the invention is applicable to a computer readable recording medium recorded with the programs.

Seventh Embodiment

FIG. 30 is a block diagram for use in illustration of data input/output among MPUs in a data processing system of a seventh embodiment according to the present invention. Referring to FIG. 30, 10 processings, i.e., processings 1 to 10 are executed to one data piece by MPUs 101 and 102. MPU 101 can execute processings 1 to 8, while MPU 102 can execute processings 3 to 10. Thus, 6 processings i.e., processings 3 to 8 can be executed by both MPUs 101 and 102. The processings (processings 3 to 8) which can be executed by both MPUs 101 and 102 are called specified processings. When MPU 101 transmits data DATA to MPU 102, control signals including a request signal ACK and a transmission signal REQ are transmitted/received between MPUs 101 and 102.

MPU 101 necessarily executes to one data piece processings (processings 1 and 2) except for an unnecessary processing which result from excluding the specified processings (processings 3 to 8) from processings executable by MPU 101 (processings 1 to 8). Similarly, MPU 102 necessarily executes to one data piece processings (processings 9 and 10) except for an unnecessary processing which result from excluding the specified processings (processings 3 to 8) from processings executable by MPU 102 (processings 3 to 10). Which MPU executes the specified processings (processings 3 to 8) is determined by means of transmission/reception of control signals (ACK, REQ) between the MPUs.

Figure 31:
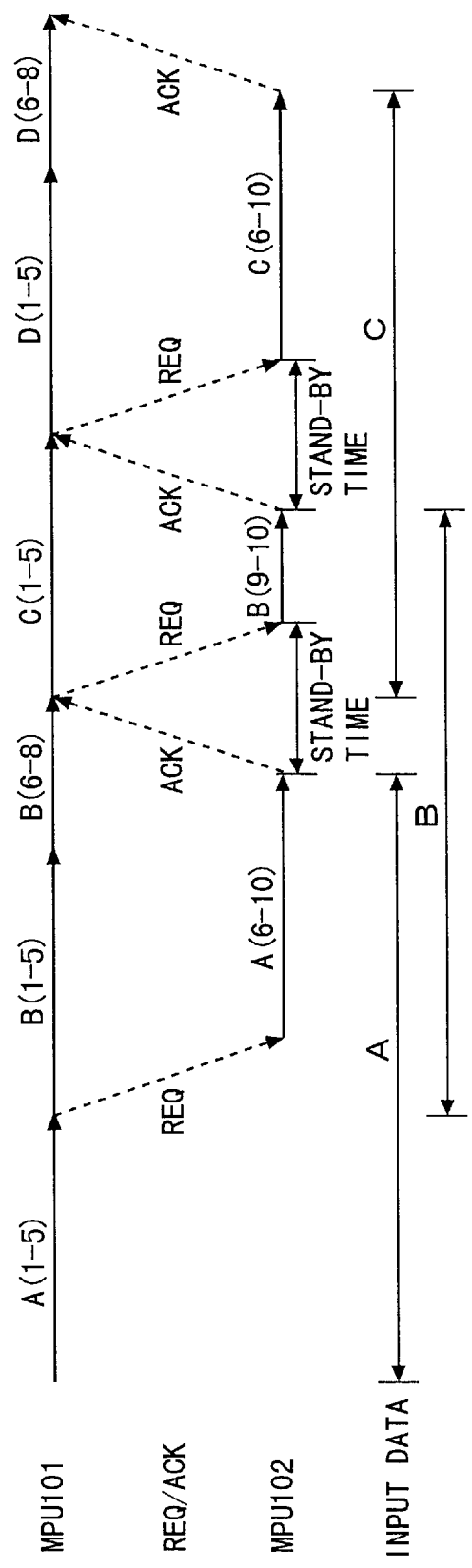
FIG. 31 is a chart showing change in operating states of a preceding MPU and a succeeding MPU in the data processing system according to the seventh embodiment.

FIG. 31 is a chart showing change with time in the operation states of MPUs 101 and 102 according to this embodiment. Referring to FIG. 31, MPU 101 executes processings 1 to 5 to input data A (A (1–5)), then transmits transmission signal REQ and input data A after processings 1 to 5 to MPU 102, and executes processings 1 to 5 to the next input data B. Because request signal ACK has not been received from MPU 102 at the time when the execution of processing 5 to input data B is completed, the specified processings are subsequently executed to input data B. When a processing being executed at the time of receiving request signal ACK processing 8 in the figure) is completed, transmission signal REQ is transmitted to MPU 102, and input data B after processings 1 to 8 is transmitted to MPU 102. Then, processings 1 to 5 are executed to the next input data C.

Meanwhile, when MPU 102 receives transmission signal REQ and input data A after processings 1 to 5 from MPU 101, MPU 102 executes processings after processing 5 (processings 6 to 10) to input data A (A (6–10)), transmits request signal ACK to MPU 101 when the execution of processing 10 to input data A is completed, and stands by until transmission signal REQ and the next input data B are transmitted from MPU 101. When input data B after processings 1 to 8 is received from MPU 101, MPU 102 executes processings after processing 8 (processings 9 and 10) to input data B ((9–10)), and transmits request signal ACK to MPU 101. Input data is processed and transmitted between MPUs 101 and 102 similarly thereafter.

As can be seen from the states of MPUs 101 and 102 changing with time as shown in FIG. 31, there is no stand-by time in MPU 101. Stand-by time exists for MPU 102, but the total stand-by time both in MPUs 101 and 102 decreases as compared to that of the conventional data processing apparatus (see FIG. 47). Input data is each processed in a shorter period of time than input data processed by the conventional data processing apparatus.

Figure 32:
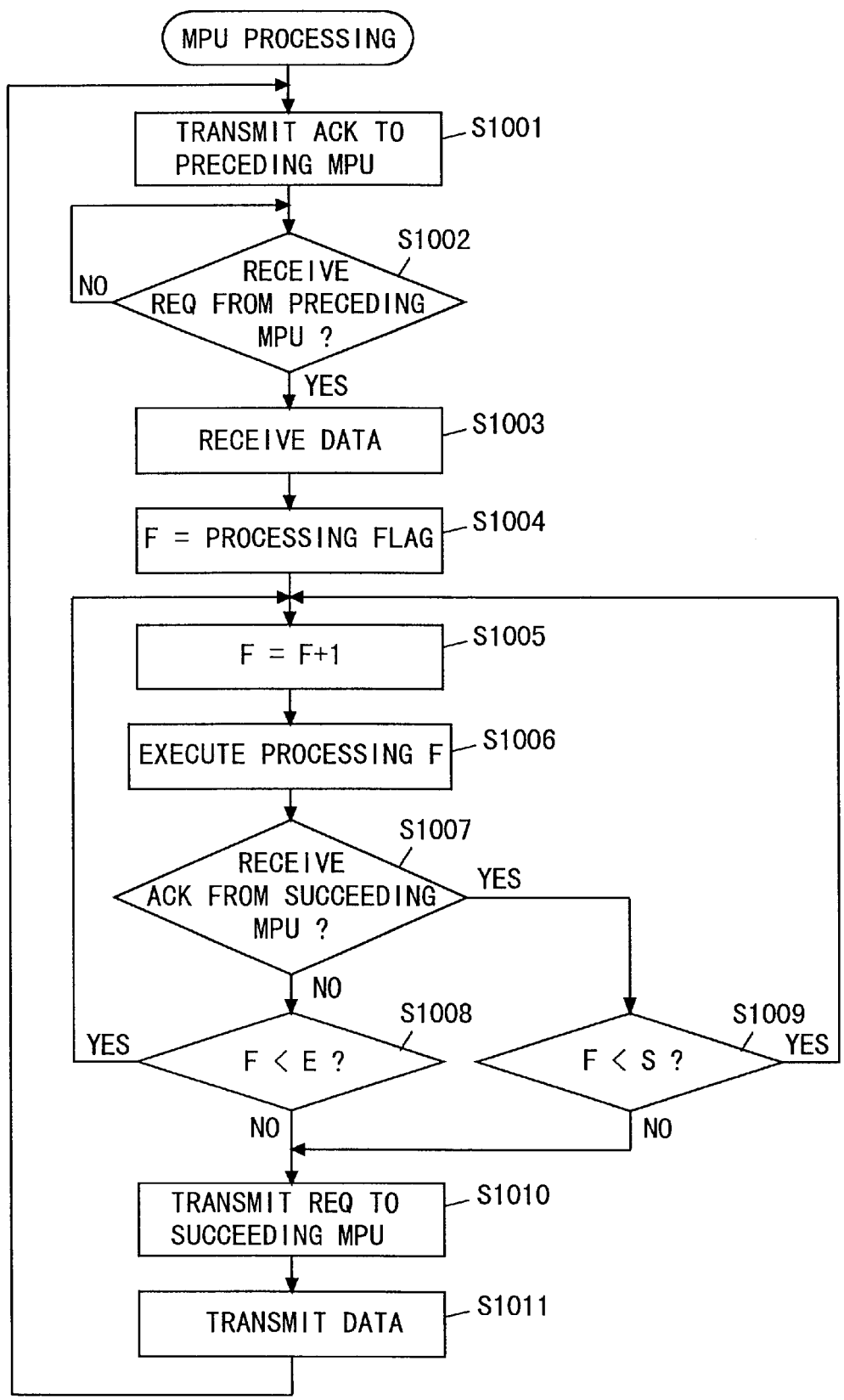
FIG. 32 is a flow chart for use in illustration of the flow of processing by MPUs in the data processing system according to the seventh embodiment.

FIG. 32 is a flow chart for use in illustration of the flow of processing by each of MPUs according to this embodiment. Referring to FIG. 32, an MPU transmits request signal ACK to request transmission of data DATA to a preceding MPU (step S1001). Then, the MPU stands by until transmission signal REQ transmitted from the preceding MPU is received (step S1002). Transmission signal REQ transmitted from the preceding MPU is a control signal to instruct transmission of data DATA after the succeeding MPU receives transmission signal REQ. When transmission signal REQ is received, data DATA is transmitted from the preceding MPU and received (step S1003).

Figure 33:
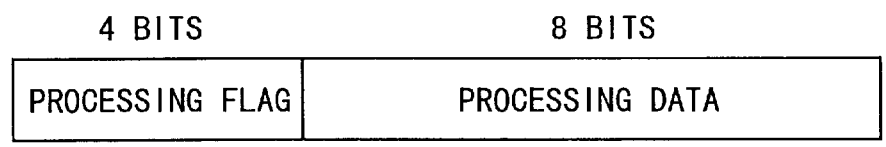
FIG. 33 is a diagram showing a data format for data transmitted between a preceding MPU and a succeeding MPU according to the seventh embodiment.

Data DATA transmitted from the preceding MPU will be now described. FIG. 33 is a diagram showing a format of data DATA. Data DATA consists of a 4-bit processing flag and 8-bit processing data. The processing flag represents the last processing executed by an MPU which transmits data DATA and consists of 4 bits because the number of processings according to this embodiment is 10. The bit number is determined depending upon the number of processings executed by the data processing system, the 4 bits can be used for a data processing system executing 16 processings. The processing data is data to be subjected to processings, and data subjected to a processing written in the processing flag is written. In the case of the data processing system processing image data, the bit number of pixel data forming the image data, i.e., 8 may be employed. The bit number of processing data is determined depending upon data to be processed by the data processing system, and is not limited to 8.

Referring back to FIG. 32, the processing flag is read from the received data DATA, and the read processing flag is set to a variable F (step S1004). Since the processing flag is used as the processing number for the last processing executed by the preceding MPU here, it is simply substituted for variable F.

Then, "1" is added to variable F (step S1005). This is because an MPU which has received data DATA (the succeeding MPU) executes the next processing and thereafter to the last processing executed by the MPU which has transmitted data DATA (the preceding MPU).

Then, the processing data in received data DATA is read out, and the F-th processing is executed to the read out processing data (step S1006).

It is then determined whether or not request signal ACK to request transmission of data from the succeeding MPU has been received (step S1007). If request signal ACK has been received from the succeeding MPU, variable F and a constant S are compared (step S1009), and if request signal ACK has not been received, variable F and a constant E are compared (step S1008). Both if variable F is smaller than constant S (YES in step S1009), and if variable F is smaller than constant E (YES in step S1008), the processing from steps S1005 to S1007 is repeated. Both if variable F is not smaller than constant S (NO in step S1009), and if variable F is not smaller than constant E (NO in step S1008), the control proceeds to step S1010.

Herein, constants S and E refer to the numbers for the first and last processings of the specified processings (processings 3 to 8). Therefore, according to this embodiment, constant S is "3", and constant E is "8". Regarding the processings executed in steps S1007, S1008 and S1009, when the processing (processing F) completed at the time of receiving request signal ACK from the succeeding MPU is not the specified processing (YES in step S1009), steps S1005 and S1006 are repeated until the completed processing becomes the specified processing. If request signal ACK has not been received from the succeeding MPU (NO in step S1007), steps S1005 and S1006 are repeated until the completed processing (processing F) becomes the last executable processing (processing 8).

In step S1010, transmission signal REQ to instruct transmission of data DATA is transmitted to succeeding MPU 102, and data DATA is transmitted after the reception of transmission signal REQ is confirmed by succeeding MPU 102 (step S1011). The above processing is repeated thereafter.

FIG. 34 is a diagram showing the state of each MPU when input data for which the load required for processings 1 to 5 is always smaller than the load required for processings 6 to 10 in comparison with the data processing apparatus according to the fourth conventional technique. In FIG. 34, (A) shows the states of MPUs 101 and 102 in the data processing system according to this embodiment. In FIG. 34, (B) shows the states of MPUs 121 and 122 in the conventional data processing apparatus. In the figure, input data pieces A, B and C . . . are input. Regarding processings executed by the MPUs, the state in which processings 1 to 5 are executed to input data A for example is denoted as A (1–5).

Referring to FIG. 34, MPU 101 executes processings 1 to 5 to input data B and then MPU 101 further executes processings 6 to 8 (B (6–8)) while MPU 102 executes processings 6 to 10 having larger loads to input data A. MPU 102 executes processings 9 and 10 because input data B has been subjected to processings up to processing 8 by MPU 101.

As can be seen from comparison between (A) and (B) in FIG. 34, in the data processing system according to this embodiment, even if the load required for processings 1 to 5 is always smaller than the load required for processings 6 to 10, MPU 101 with a small load executes the specified processings rather than MPU 102 having a large load, and therefore the stand-by time for MPUs 101 and 102 are shorter than the conventional data processing apparatus. As a result, the data processing speed is improved. The time required from the start to the end of processings to each input data is also reduced.

FIG. 35 is a diagram showing the state of each MPU when input data for which the load required for processings 1 to 5 is always larger than the load required for processings 6 to 10 in comparison with the data processing apparatus according to the fourth conventional technique. In FIG. 35, (A) shows the states of MPUs 101 and 102, while (B) shows the states of MPUs 121 and 122 in the data processing apparatus according to the fourth conventional technique. MPU 122 always has a load smaller than MPU 121 and therefor transmits request signal ACK to MPU 121 when reception of input data is completed, and MPU 121 stands by until request signal ACK is received from MPU 122.

Referring to FIG. 35, to input data B, MPU 101 executes processings 1 to 4 (B (1–4)), and MPU 102 executes processings 5 to 10 (B (5), B (6–10)).

As can be seen from comparison between (A) and (B) in FIG. 35, even if the load required for processings 1 to 5 is always greater than the load required for processings 6 to 10, the stand-by time for MPUs 101 and 102 is reduced, so that the data processing speed is improved in comparison with the conventional data processing apparatus.

As described above, the specified processings (processings 3 to 8) which both MPUs 101 and 102 can execute are provided, and MPU 101 executing the preceding processing is allowed to execute a specified processing until request signal ACK from MPU 2 executing the succeeding processing is received, so that the stand-by time for MPUs 101 and 102 can be reduced and the data processing can be executed at a high speed as a result.

Eighth Embodiment

A data processing system of to an eighth embodiment is provided by applying the data processing system of the seventh embodiment to image processing. Six processings from Processings 1 to 6 are executed in the image processing. Processing 1 is SH correction (shading correction) performed in order to remove and correct reading variation (shading variation) caused by variations in the performance of photoelectric conversion elements such as CCDs when input data i.e., image data is read by the photoelectric conversion elements such as CCDs.

Processing 2 is Log conversion performed to convert data after SH correction into data in the Log relation with the data after the SH conversion.

Processing 3 is magnification-changing performed to change input image data into expanded or reduced data. Processing 4 is MTF correction and also called "sharpness correction" performed to correct the sharpness of input data using a digital filter such as a Laplacian filter.

Processing 5 is γ correction performed to correct the difference in the tone curve between a device to input image data and a device to output image data. For example, using an LUT (Look Up Table) of 256 words, 8 bits, non-linear gamma correction data is output.

Processing 6 is binarization performed to convert data after γ correction into 1-bit binary data corresponding to the brightness. The binarization may employ area-type tone binarization such as error diffusion binarization.

FIG. 36 is a diagram showing loads required processings 1 to 6 for each of patterns classified by the attributes of image data and magnifications processed by magnification-changing. Referring to FIG. 36, in pattern A, the attribute of pixel data to be processed in image data is "character", the magnification to be changed in processing 3 is "1" in the pattern, and the loads required for processings 1 to 6 in this case are sequentially "1", "1", "0", "3", "1" and "1", respectively.

In pattern B, the attribute of pixel data to be processed is "character", and the magnification to be changed in processing 3 is "4". In pattern C, the attribute of pixel data to be processed is "photograph", and the magnification to be changed in processing 3 is "1". In pattern D, the attribute of pixel data to be processed is "photograph" and the magnification to be changed in processing 3 is "4". The loads for processings 1 to 6 in patterns B to D are as shown in FIG. 36. As can be seen from the loads of the processing portions (MPUs) for each of the patterns shown in FIG. 36, in the image processing system of this embodiment, the loads required for processings 1 to 6 are different among the patterns.

In the data processing system of this embodiment, if processing 5 is a specified processing, executable processings by the preceding MPU 101 are processings 1 to 5, and executable processings by the succeeding processing MPU 102 are processings 5 and 6. The processings by the MPUs are executed according to the flow of processings shown in FIG. 32.

Figure 37:
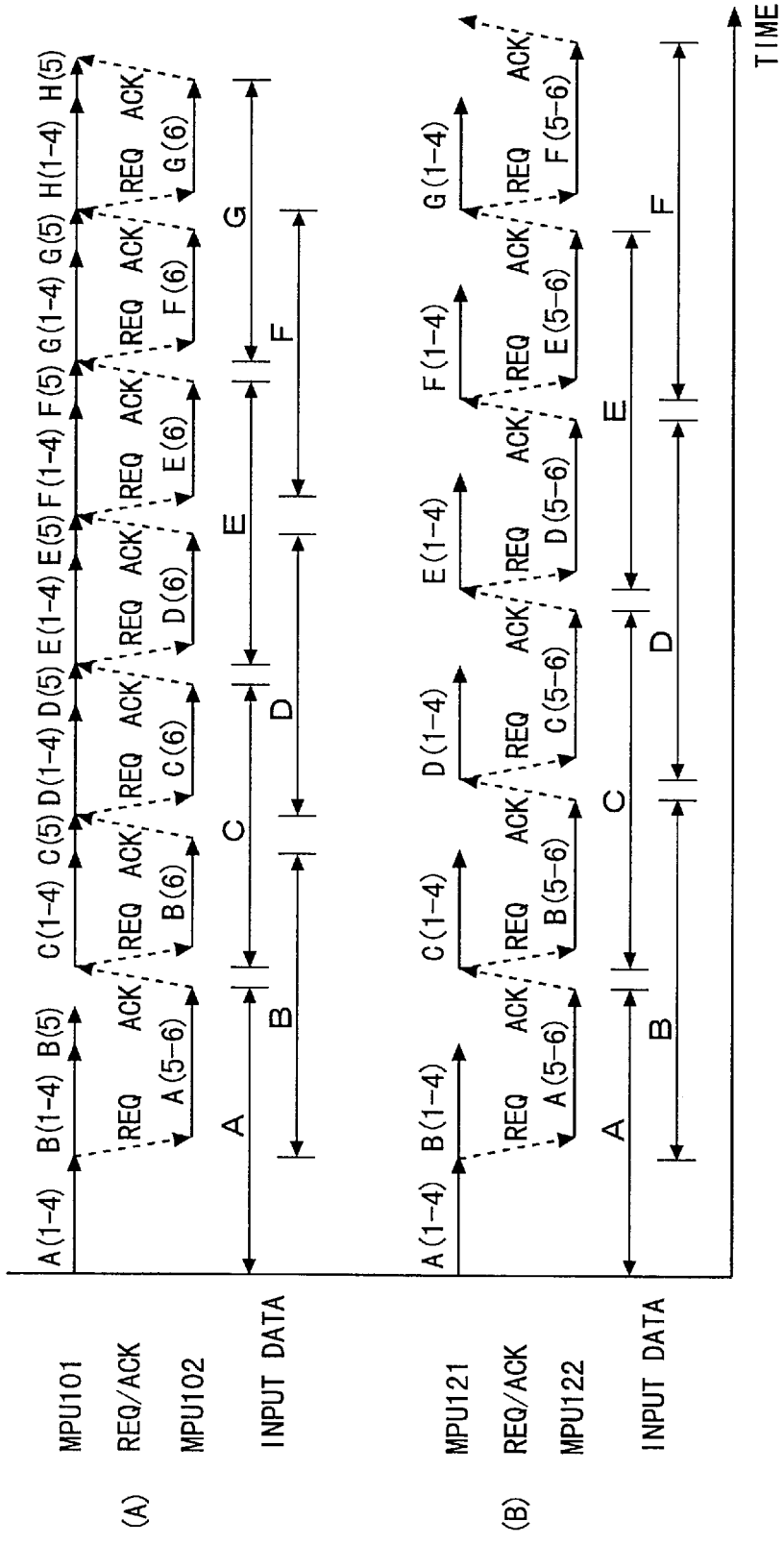
FIG. 37 is a diagram showing change with time in the operation state of MPU 1 in a data processing system according to an eighth embodiment of the present invention in comparison with an asynchronous type data processing system shown in FIG. 46.

FIG. 37 is a diagram showing change with time in the operation states of MPUs 101 and 102 in the data processing system of this embodiment in comparison with the data processing apparatus according to the fourth conventional technique. In FIG. 37, (A) shows the operation states of MPUs 101 and 102 in the data processing system of this embodiment, and (B) shows the operation states of MPUs 121 and 122 in the data processing apparatus according to the fourth conventional technique. In the data processing apparatus according to the fourth conventional technique, the preceding MPU 121 executes processings 1 to 4 and the succeeding MPU 122 executes processings 5 and 6.

Referring to FIG. 37 at (A), input data B and data input thereafter are subjected to processings 1 to 5 by MPU 101, and only processing 6 is executed by MPU 102. As a result, the stand-by time for MPUs 101 and 102 is reduced. The time from the start to the end of each processing to input data is shorter than the time in the data processing apparatus according to the fourth conventional technique.

Thus, in the data processing system of this embodiment, if the attribute of data to be processed or the content of processing is different depending upon data to be processed, the load required for each processing changes as a result, and therefore the stand-by time for MPUs 101 and 102 can be reduced, so that data can be processed at a high speed.

Ninth Embodiment

A data processing system of a ninth embodiment is provided by adding a kind determining processing to the processings executed in the data processing system of the eighth embodiment.

Figure 38:
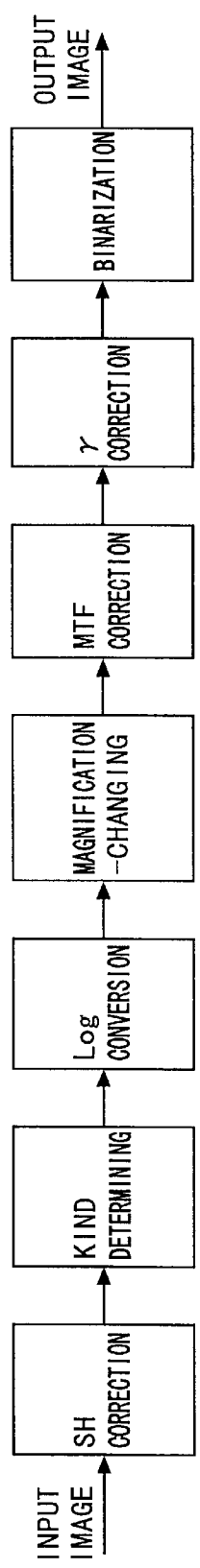
FIG. 38 is a diagram for use in illustration of processing executed by a data processing system according to a ninth embodiment of the present invention.

FIG. 38 is a diagram showing processings executed by the data processing system of the ninth embodiment. The processings executed by the data processing system of this embodiment are SH correction, kind determining, Log conversion, magnification-changing, MTF correction, γ correction, and binarization, and these processings are executed in this order.

The kind determining processing is a processing to determine the kind of pixel data to be processed. The kind of pixel data to be determined is "background" and "attribute". The kind determining processing includes background determining and attribute determining.

In the background determining, the background of pixel data to be processed is determined. Herein, the "background" refers to a background region to which the pixel data to be processed belongs, and includes "image" and "plain". The "image" refers to an area in which an image is drawn in the base in a region with a changing tone. The "plain" refers to an area in which nothing is drawn in the base in a region with no tone.

In the attribute determining, the attribute of pixel data to be processed is determined. Herein, the "attribute" refers to a region to which pixel data to be processed belongs and includes "character" and "photograph" regions. The "character" refers to a region in which a character is written. The "photograph" refers to a region in which a photograph is present.

Figures 39, 41:
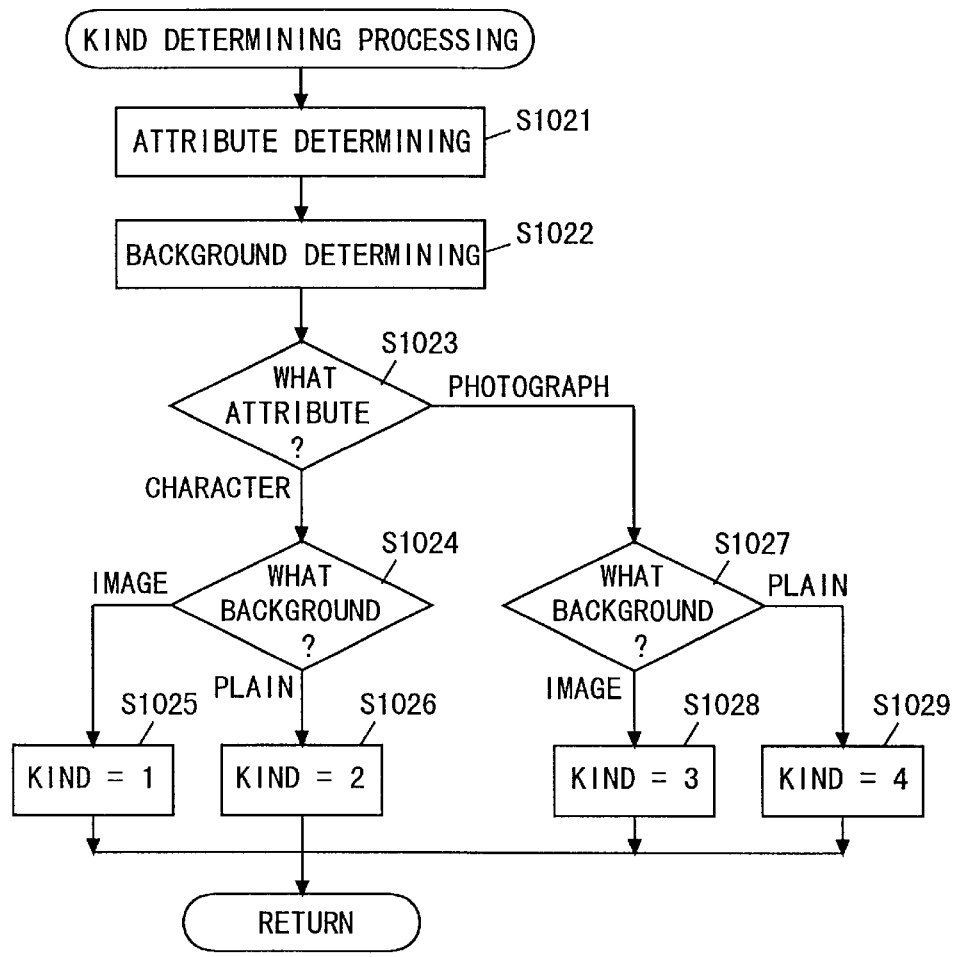
FIG. 39 is a flow chart for use in illustration of the flow of a kind determining processing.
FIG. 41 is a diagram showing a specified processing for each kind of pixel data to be processed.

FIG. 39 is a flow chart for use in illustration of the flow of processing executed in the kind determining processing. Referring to FIG. 39, in the kind determining, attribute determining (step S1021) and background determining (step S1022) are executed, and four kinds are determined based on the attribute determined in the attribute determining and the background determined in the background determining (steps S1023 to S1029). More specifically, if the attribute is character and the background is image, the kind of the pixel data is "1" (step S1025), if the attribute is character and the background is plain, the kind of pixel data is "2" (step S1026), if the attribute is photograph and the background is image, the kind of pixel data is "3" (step S1028), and if the attribute is photograph and the background is plain, the kind of pixel data is "4" (step S1029).

The kind determining processing is performed to classify pixel data to be processed into four kinds. As will be described later, the load associated with processing of pixel data is significantly different among the four kinds, and therefore if the kind of pixel data can be determined before processing, the loads for succeeding processings can be estimated.

FIG. 40 is a diagram showing the loads for processings 1 to 7 for each of the kinds determined by the kind, determining processing. Referring to FIG. 40, for each of kinds 1 to 4, the loads for processings 1 to 7 are shown. Regarding SH correction in processing 1 and kind determining in processing 2, the load is "1" regardless of the kind. Regarding the other processings, the values are between "0" to "3" as shown in the figure.

Specified processings are determined based on the kind of pixel data to be processed so that the load for processings resulting from excluding the specified processings from executable processings by MPU 101 and the load for processings resulting from excluding the specified processings from executable processings by MPU 102 are almost equal.

FIG. 41 is a diagram showing specified processings for each of the kinds of pixel data to be processed. Referring to FIG. 41, if the kind of pixel data to be processed is "1", processings 3 to 5 are specified processings and the load for a processing before the specified processings is "2", and the load for a processing after the specified processings is "2" in this case. The load for the specified processings is "4 or higher". This is because the load for the specified processings changes based on magnification in magnification-changing.

If the kind of pixel data to be processed is "2", processings 3 to 6 are specified processings. Similarly, if the kind of pixel data to be processed is "3", processings 4 to 6 are specified processings and if the kind is "4", processings 3 to 6 are specified processings.

Thus, the kind of pixel data to be processed is determined, then the load for the succeeding processings is estimated, and the specified processings which can be executed by both MPUs 101 and 102 are changed based on the estimated load. Thus changing the specified processings allows MPUs 101 and 102 to separately take care of processings corresponding to the load of pixel data to be processed, so that the stand-by time can be reduced and the data processing speed can be improved.

Figure 42:
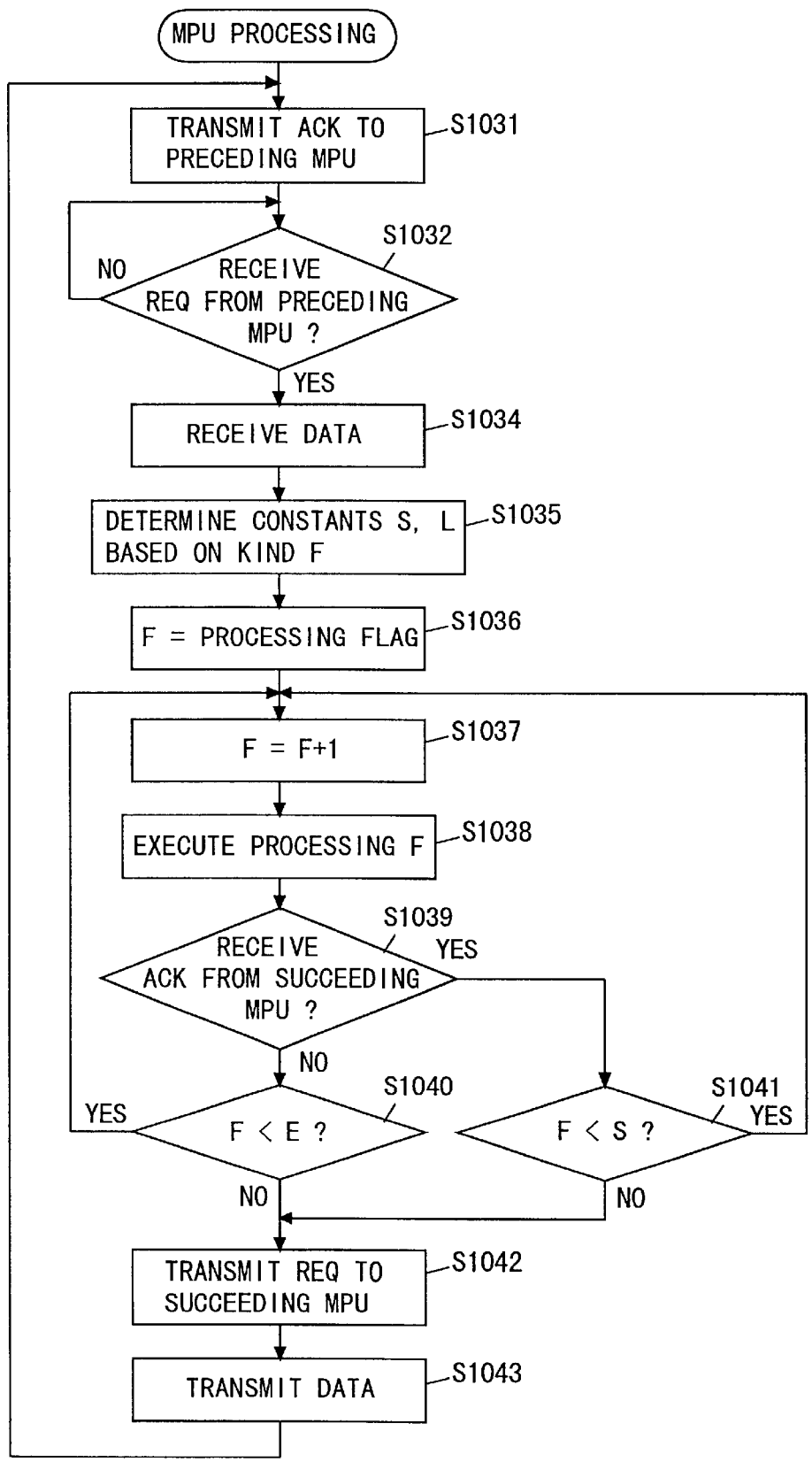
FIG. 42 is a flow chart for use in illustration of the flow of processing executed by MPUs in the data processing system according to the ninth embodiment.
Figure 44:
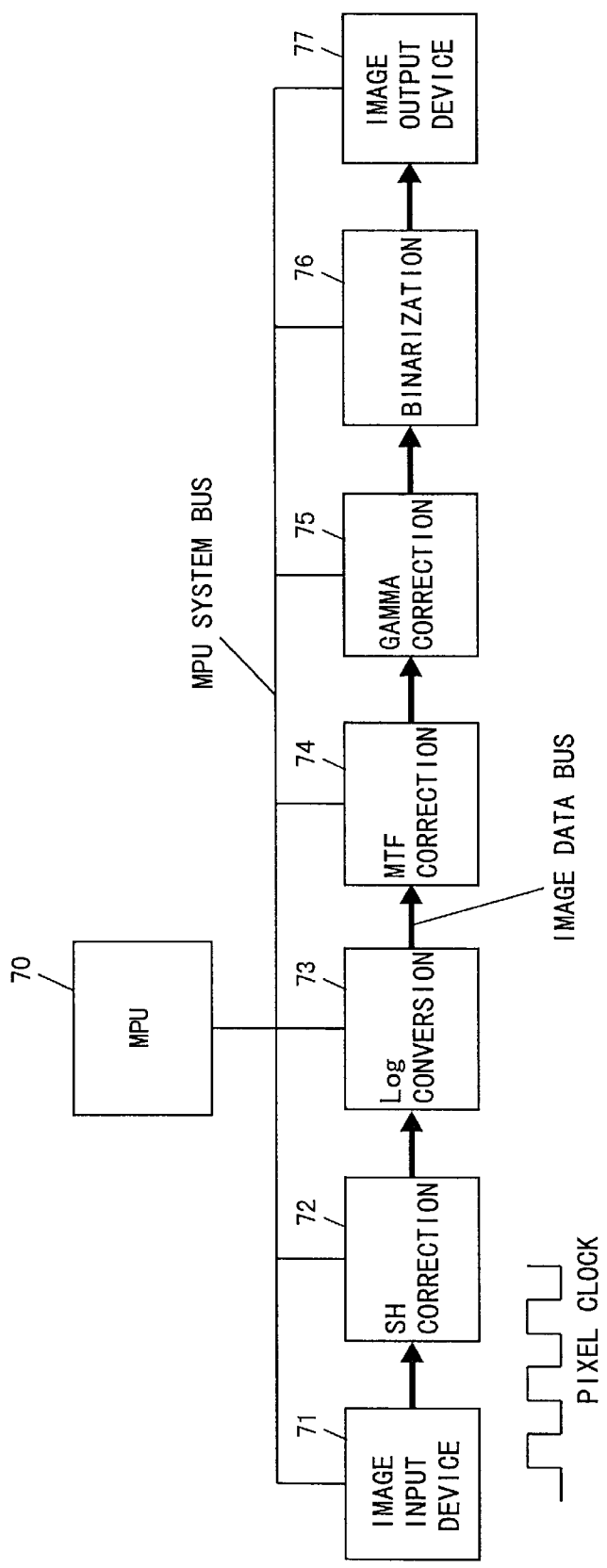
FIG. 44 is a block diagram showing the general configuration of a synchronous pipeline type data processing apparatus according to a first conventional technique.
Figure 45:
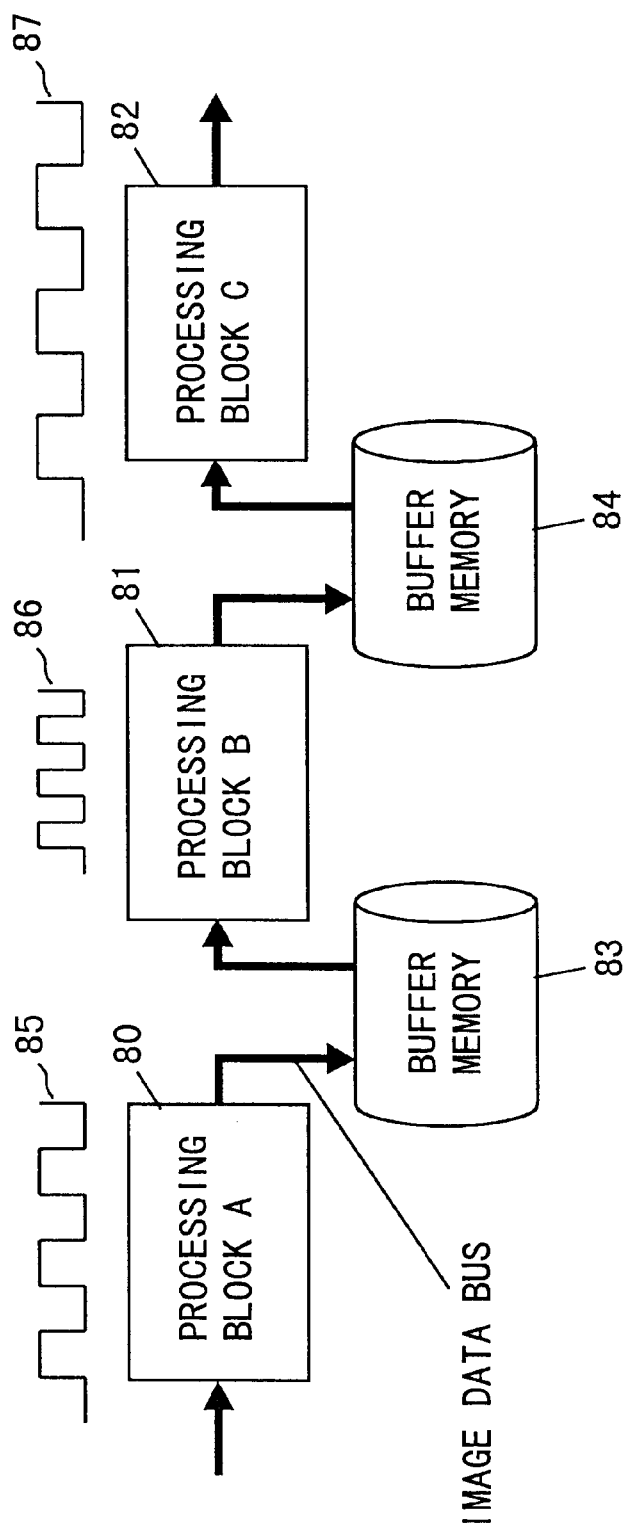
FIG. 45 is a block diagram for use in illustration of an asynchronous processing method according to a second conventional technique.
Figure 46:
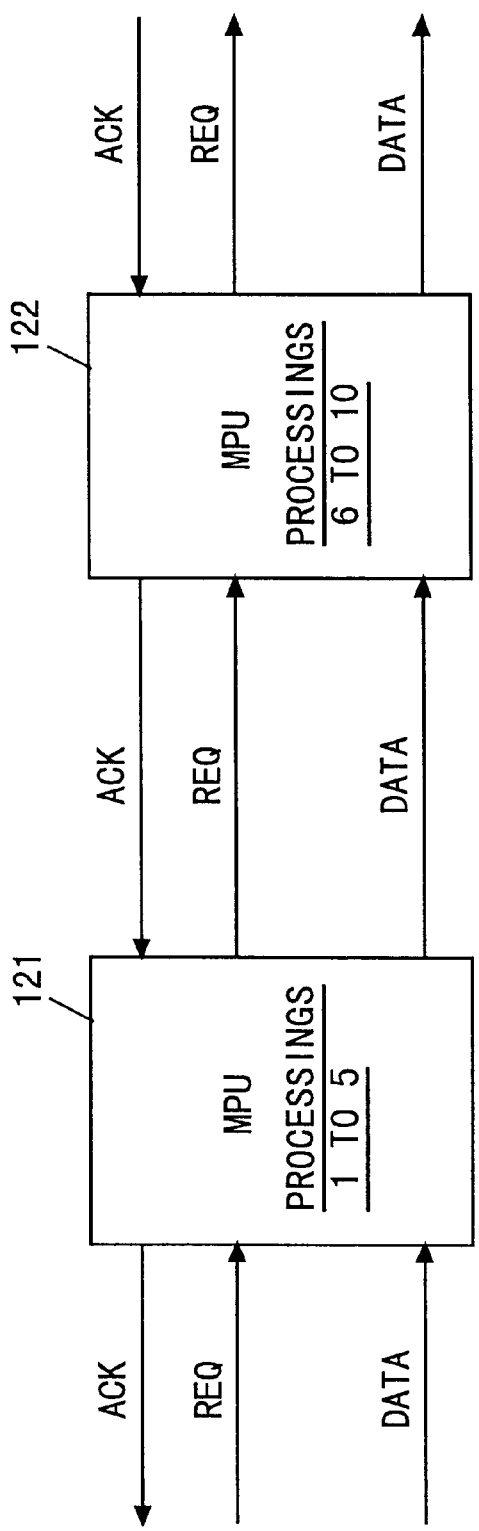
FIG. 46 is a diagram showing data input/output between MPUs in an asynchronous data processing apparatus.

FIG. 42 is a flow chart for use in illustration of the flow of processing executed by each of MPUs in the data processings system of the ninth embodiment. Referring to FIG. 42, what is different from the processing executed by the MPUs according to the seventh embodiment shown in FIG. 32 is that a processing to determine constants S and L depending upon the kind of pixel data to be processed is additionally executed in step S1035 (step S1035). The other features are the same as those in the flow of processing shown in FIG. 32, and the description is not repeated here.

The processing executed in step S1035 is performed to determine constant S representing the number of the first processing in the specified processings and constant L representing the number of the last processing in the specified processings according to the specified processings shown in FIG. 41. Constants S and L are used in steps S1040 and S1041 to compare with the number F of processing which has been executed by an MPU.

Since the kind determining is not performed in the succeeding MPU 102, it is not known what kind the pixel data to be processed has. Therefore, when data DATA is transmitted from preceding MPU 101 to succeeding MPU 102, the "kind" is transmitted as well.

Figure 43:
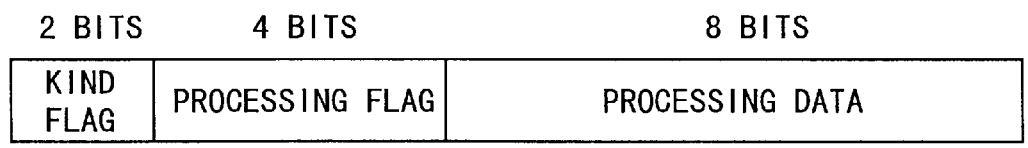
FIG. 43 is a diagram showing a data format for data DATA according to the ninth embodiment.

FIG. 43 is a diagram showing a data format of data DATA according to the ninth embodiment. Referring to FIG. 43, the data format of data DATA consists of a 2-bit kind flag, a 4-bit processing flag and 8-bit processing data. The kind flag is written with the kind determined in the kind determining of pixel data to be processed and transmitted. The bit number of the kind flag is 2, because there are 4 "kinds" according to this embodiment. If there are more than four kinds to be determined to estimate the load of succeeding processings, a larger bit number is necessary.

As described above, in the data processing system of this embodiment, in the kind determining processing, how much load pixel data to be processed will need in processings to be executed is estimated, and the specified processings are changed based on the estimated results, the stand-by time for MPUs 101 and 102 can be reduced, so that the data processing can be executed at a high speed.

Tenth Embodiment

A data processing system of a tenth embodiment is different in that a processing to be executed by preceding MPU 101 and a processing to be executed by succeeding processing MPU 102 are determined based on the kind determined by the kind determining from the data processing system of the ninth embodiment, in which specified processings are changed based on the kind determined by the kind determining processing. Referring to FIG. 40, processings executed at the left of broken line 10 in the figure are to be executed by MPU 101 and processings at the right of broken line 10 are to be executed by MPU 102. More specifically, if the kinds of pixel data pieces to be processed are "1" and "2", processings 1 to 4 are executed by MPU 101 and processings 5 to 7 are executed by MPU 102. If the kinds are "3" and "4", processings 1 to 5 are executed by MPU 101 and processings 6 and 7 are executed by MPU 102.

In this embodiment, if a specified processing is processing 5, the MPU to execute this specified processing is determined based on the kind of pixel data to be processed.

As a result, the load for pixel data to be processed can be estimated based on the kind determined in the kind determining processing, and the MPU to execute the specified processing is determined based on the estimated load, so that the stand-by time for MPUs 101 and 102 can be reduced. As a result, data processing can be executed at a high speed.

Note that in the seventh to tenth embodiments, the data processing systems have been described, but the flows in FIGS. 32 and 39 or FIG. 42 can be considered as a recording medium recorded with a program executed by a computer.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data processing system, comprising:
    a plurality of processors for executing a series of processings to data to be processed in a prescribed order; and
    a controller for determining the progress of a processing in each of said plurality of processors and changing a type of processing executed by at least one of said plurality of processors if there is a delayed processing, wherein
    processings by each of said processors are executed asynchronously.

2. The data processing system according to claim 1, wherein
    said controller detects the difference between the addresses of data processed by two processors adjacent in conjunction with said prescribed order by obtaining the address of data processed by each of said plurality of processors, and determines that a processing by the preceding processor of said adjacent two processors is delayed if said address difference is larger than a prescribed value.

3. The data processing system according to claim 1, wherein
    if there is a delayed processing, said controller instructs a processor executing a processing preceding to the delayed processing to execute said delayed processing in addition to said preceding processing.

4. The data processing system according to claim 1, wherein
    if there is a delayed processing, said controller instructs a processor executing a processing succeeding to the delayed processing to execute said delayed processing in addition to said succeeding processing.

5. The data processing system according to claim 1, further comprising a memory for storing data processed by each of said plurality of processors, wherein
if there is a delayed processing, said controller instructs a processor executing a processing succeeding to said delayed processing to execute said delayed processing in place of said succeeding processing.

6. A data processing system, comprising:
a plurality of processors for executing a series of processings to data to be processed in a prescribed order;
a sub processor executing none of said series of processings in an initial state; and
a controller for determining the progress of a processing in each of said plurality of processors and for, if there is a delayed processing, instructing said sub processor to execute said delayed processing, wherein
processings by each of said processors are executed asynchronously.

7. The data processing system according to claim 1, wherein
said data to be processed is image data, and
said plurality of processors each process said image data on a unit pixel basis.

8. A data processing system, comprising:
a plurality of processors for executing a series of processings to data to be processed in a prescribed order; and
a controller for changing a processing executed by each of said plurality of processors based on the attribute of said data to be processed, wherein
processings by said plurality of processors are executed asynchronously.

9. A data processing system, comprising:
a plurality of processors for executing a series of processings to data to be processed in a prescribed order;
a sub processor executing none of said series of processings in an initial state; and
a controller for estimating a processing having a large load among said series of processings based on the attribute of said data to be processed, and instructing said sub processor to execute said processing having the large load, wherein
processings by each of said plurality of processors are executed asynchronously.

10. The data processing system according to claim 8, further comprising a memory for storing data processed by each of said plurality of processors, wherein
said controller estimates a processing having a large load among said series of processings based on the attribute of said data to be processed and instructs a processor executing a processing succeeding to said processing estimated to have the large load to execute said processing estimated to have the large load in place of said succeeding processing.

11. The data processing system according to claim 8, wherein
said data to be processed is image data, and
said plurality of processors each process said image data on a unit pixel basis.

12. A data processing system comprising:
a plurality of processors for executing a series of processings to data to be processed in a prescribed order;
a memory for storing data processed by each of said plurality of processors; and
a controller for determining the progress of a processing by each of said plurality of processors, controlling said plurality of processors such that data processed by each of said plurality of processors is transmitted to a succeeding processor without through said memory if there is no delayed processing, and if there is a delayed processing, data processed by a processor executing a processing preceding to said delayed processing is stored in said memory, wherein
processings by said plurality of processors are executed asynchronously.

13. The data processing system according to claim 12, wherein
said data to be processed is image data, and
said plurality of processors each process said image data on a unit pixel basis.

14. A data processing system comprising:
a plurality of processors for executing a series of processings to data to be processed in a prescribed order;
a memory for storing data processed by each of said plurality of processors; and
a controller for, if one of said plurality of processors has no data to be processed and data that has been processed by said processor exists in said memory, instructing the one of said plurality of processors to execute a processing succeeding to a processing that has been executed by said processor, wherein
processings by said plurality of processors are executed asynchronously.

15. The data processing system according to claim 14, wherein
said data to be processed is image data, and
said plurality of processors each process said image data on a unit pixel basis.

16. A data processing system comprising a plurality of processors for executing a series of processings to data to be processed in a prescribed order, wherein
processings by said plurality of processors are executed asynchronously, and
said plurality of processors include a first processor capable of executing a specified processing and a processing preceding to said specified processing among said series of processings, and a second processor capable of executing said specified processing and a processing succeeding to said specified processing.

17. The data processing system according to claim 16, wherein
said first processor stops execution of said specified processing in response to a request from said second processor.

18. The data processing system according to claim 16, wherein
said second processor executes said specified processing to data which has not been subjected to said specified processing by said first processor.

19. The data processing system according to claim 16, further comprising estimating means for estimating loads required for processing said data by said first and second processors, and
said specified processing is selected from said series of processings based on estimation by said estimating means.

20. The data processing system according to claim 19, wherein
said estimating means determines the kind of said data to be processed and estimates said load based on the determined kind of said data.

21. The data processing system according to claim 16, wherein said data to be processed is image data, and said plurality of processors each process said image data on a unit pixel basis.

22. A data processing system comprising first and second processors for dividing a series of processings and executing the same to data to be processed in a prescribed order, wherein processings by said plurality of processors are executed asynchronously, and at least a part of said series of processings can be executed by any of said first and second processors.

23. The data processing system according to claim 22, wherein said first processor transmits data to be processed to said second processor without executing processings yet to be executed, if said first processor receives a signal requesting transmission of said data to be processed from said second processor.

24. The data processing system according to claim 23, wherein said first processor does not transmit data to be processed to said second processor if said first processor does not complete the processings preceding said part of processings, even when the signal requesting transmission of said data to be processed is received from said second processor.

25. The data processing system according to claim 23, wherein said first processor transmits said data to be processed to said second processor regardless of the presence/absence of reception of the signal requesting transmission of data to be processed, if said first processor completes all of said part of processings.

26. The data processing system according to claim 23, wherein said second processor executes a processing which is not executed in said first processor to said data transmitted from said first processor.

27. The data processing system according to claim 22, wherein said data to be processed is pixel data forming image data, and said part of processings is selected from said series of processings based on the loads required for processing said pixel data by said first and second processors estimated based on the attribute of said pixel data to be processed.

* * * * *